Jan. 3, 1956 T. M. BUTLER 2,729,392
CONTROL MEANS FOR CALCULATING MACHINE
Original Filed April 7, 1949 22 Sheets-Sheet 1

INVENTOR.
THOMAS M. BUTLER
BY Fuller, Crane
& Beardsley
ATTORNEYS

Jan. 3, 1956     T. M. BUTLER     2,729,392
CONTROL MEANS FOR CALCULATING MACHINE
Original Filed April 7, 1949     22 Sheets-Sheet 3
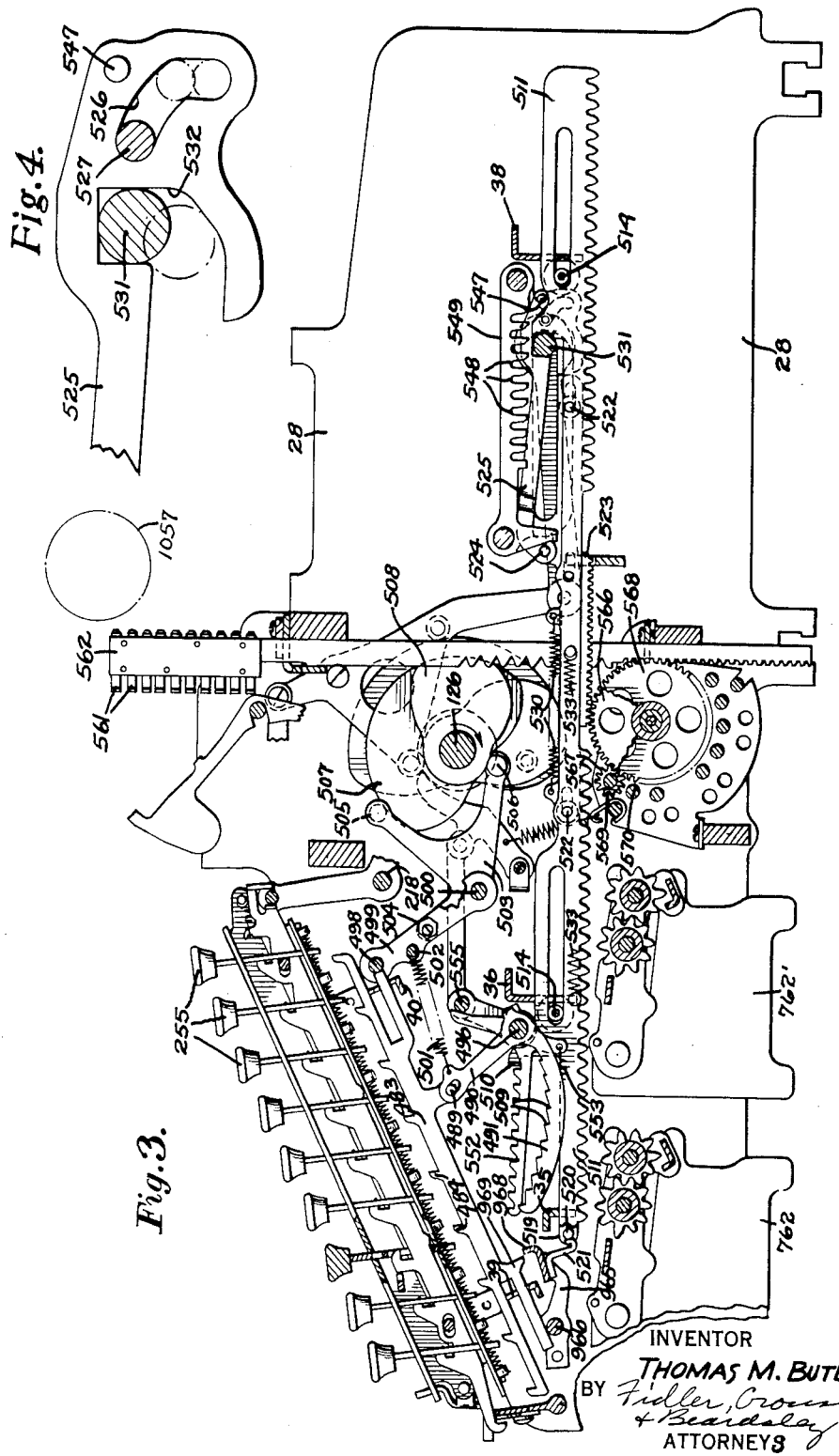
INVENTOR
*Thomas M. Butler*
BY *Fidler, Crouse & Beardsley*
ATTORNEYS Jan. 3, 1956 T. M. BUTLER 2,729,392
CONTROL MEANS FOR CALCULATING MACHINE
Original Filed April 7, 1949 22 Sheets-Sheet 4
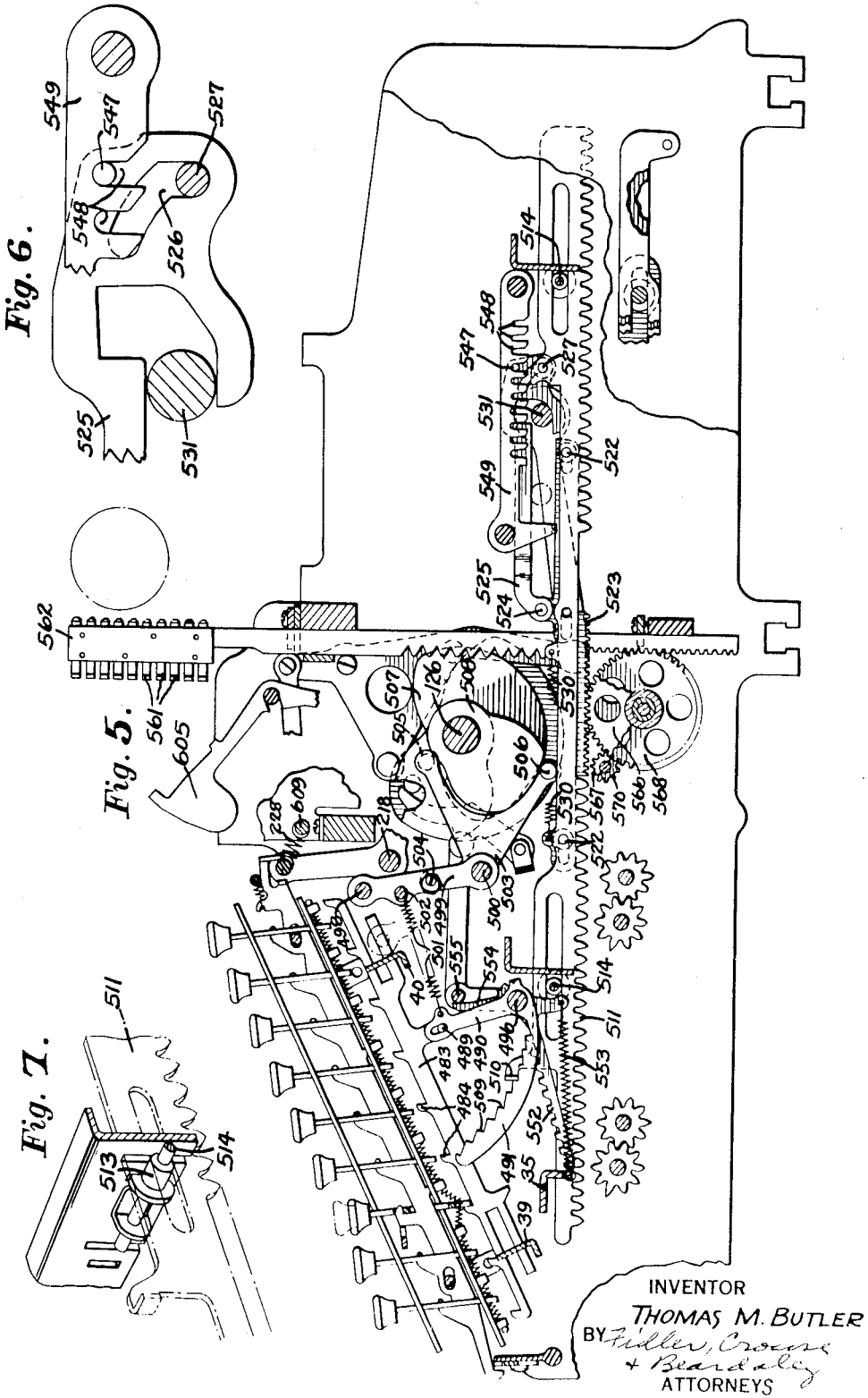
INVENTOR
THOMAS M. BUTLER
BY Fidler, Crouse
& Beardsley
ATTORNEYS

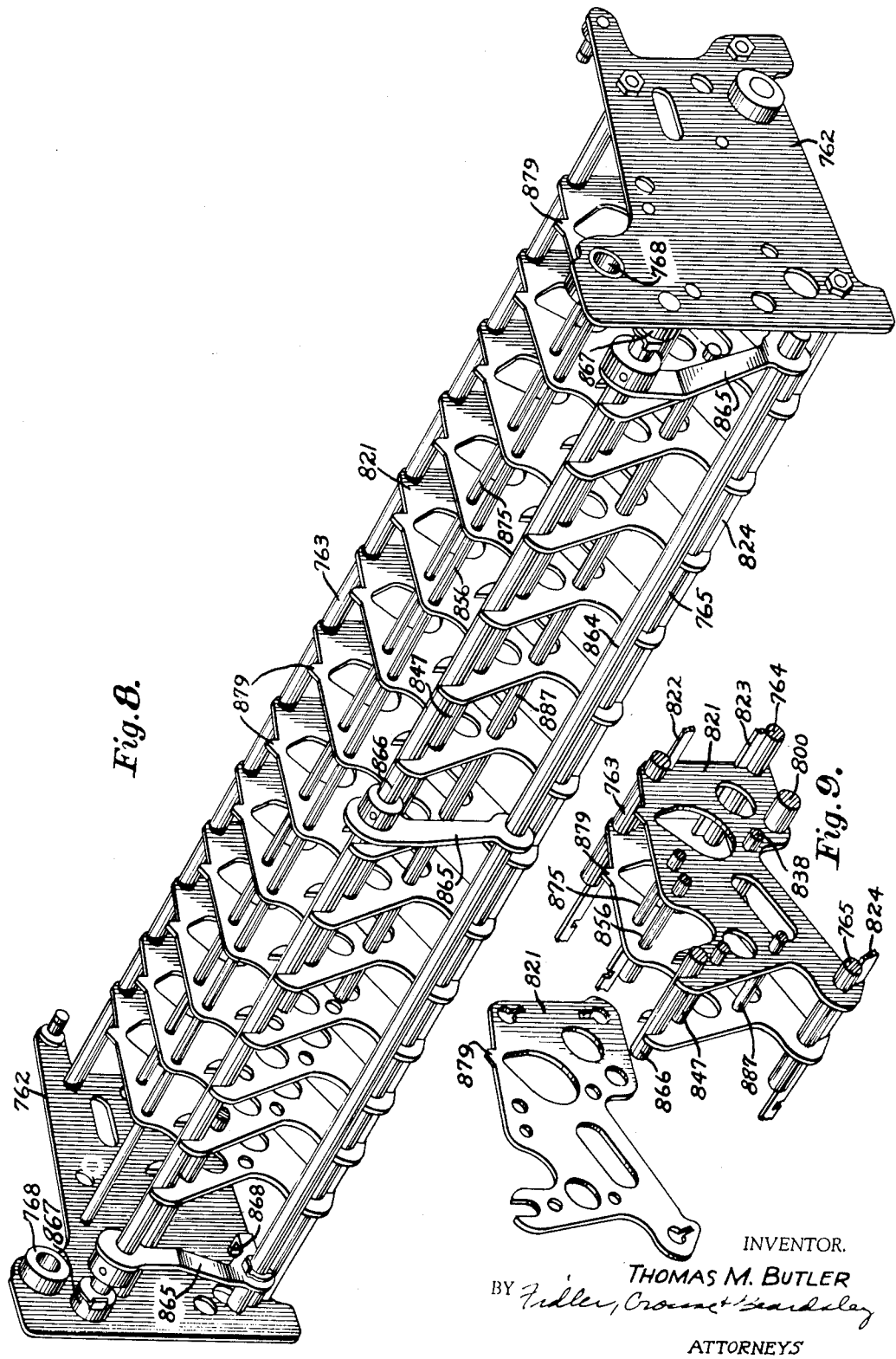

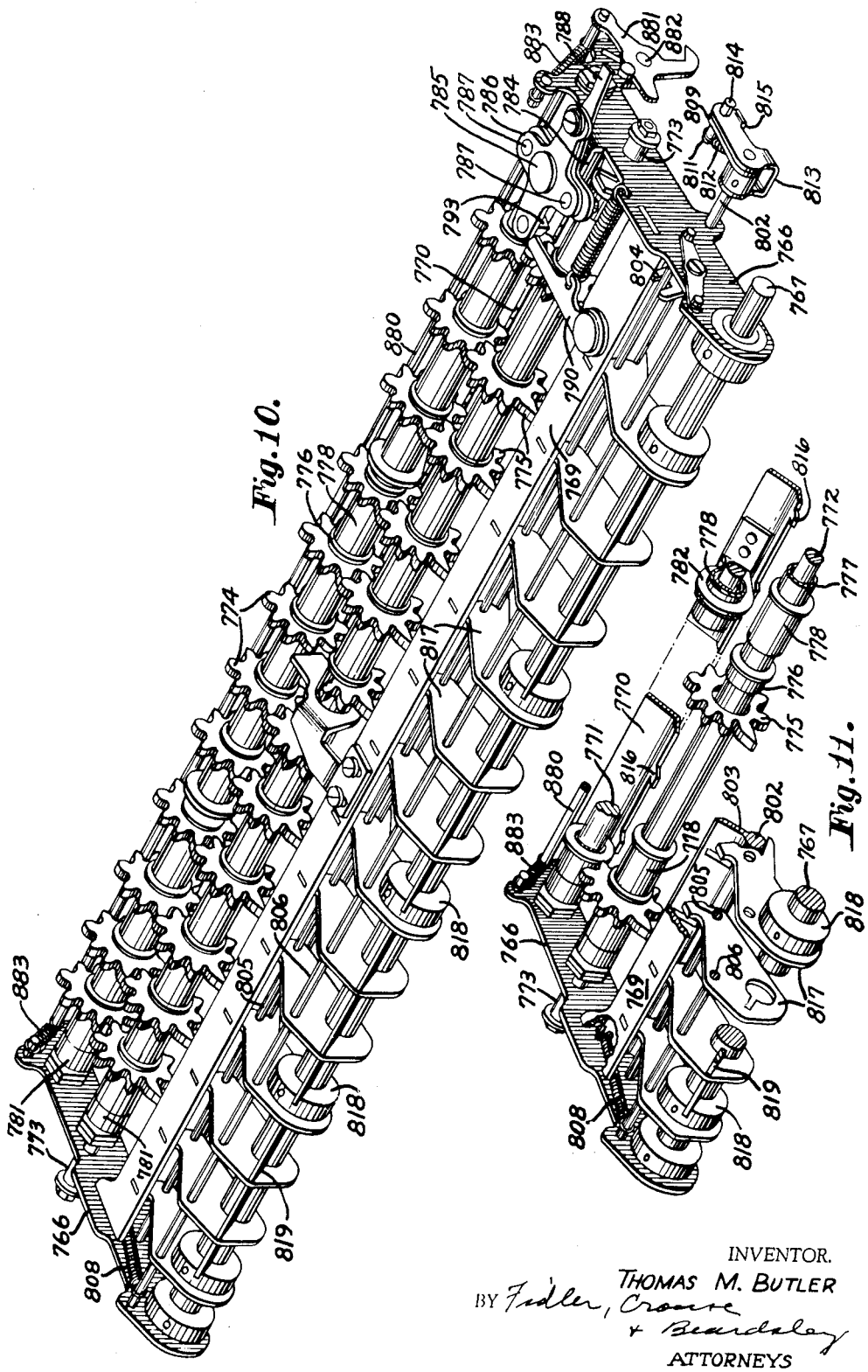

Jan. 3, 1956  T. M. BUTLER  2,729,392
CONTROL MEANS FOR CALCULATING MACHINE
Original Filed April 7, 1949  22 Sheets-Sheet 7

INVENTOR
THOMAS M. BUTLER
BY Fidler, Crocose
+ Beardsley
ATTORNEYS

Jan. 3, 1956        T. M. BUTLER        2,729,392
CONTROL MEANS FOR CALCULATING MACHINE
Original Filed April 7, 1949        22 Sheets-Sheet 8
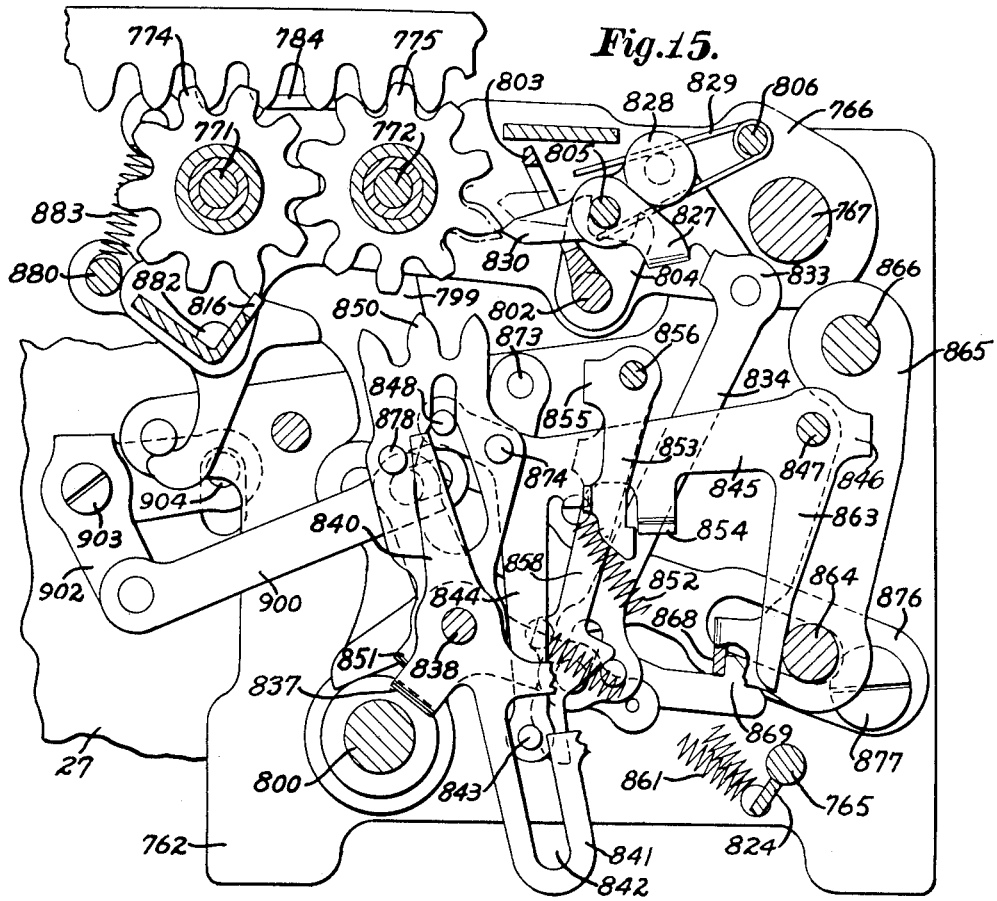
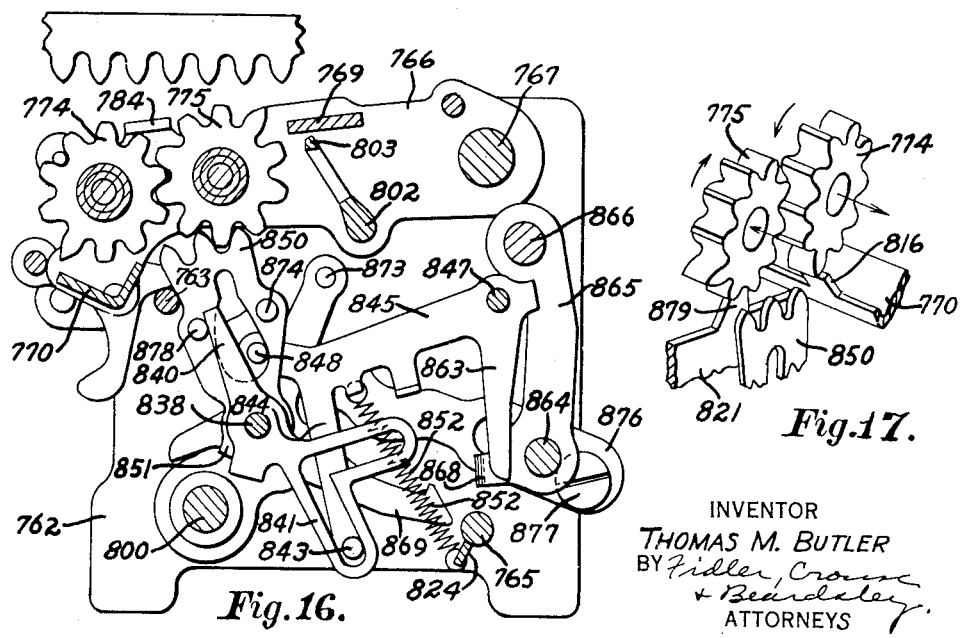
INVENTOR
THOMAS M. BUTLER
BY *Fidler, Crouse*
*& Beardsley*
ATTORNEYS

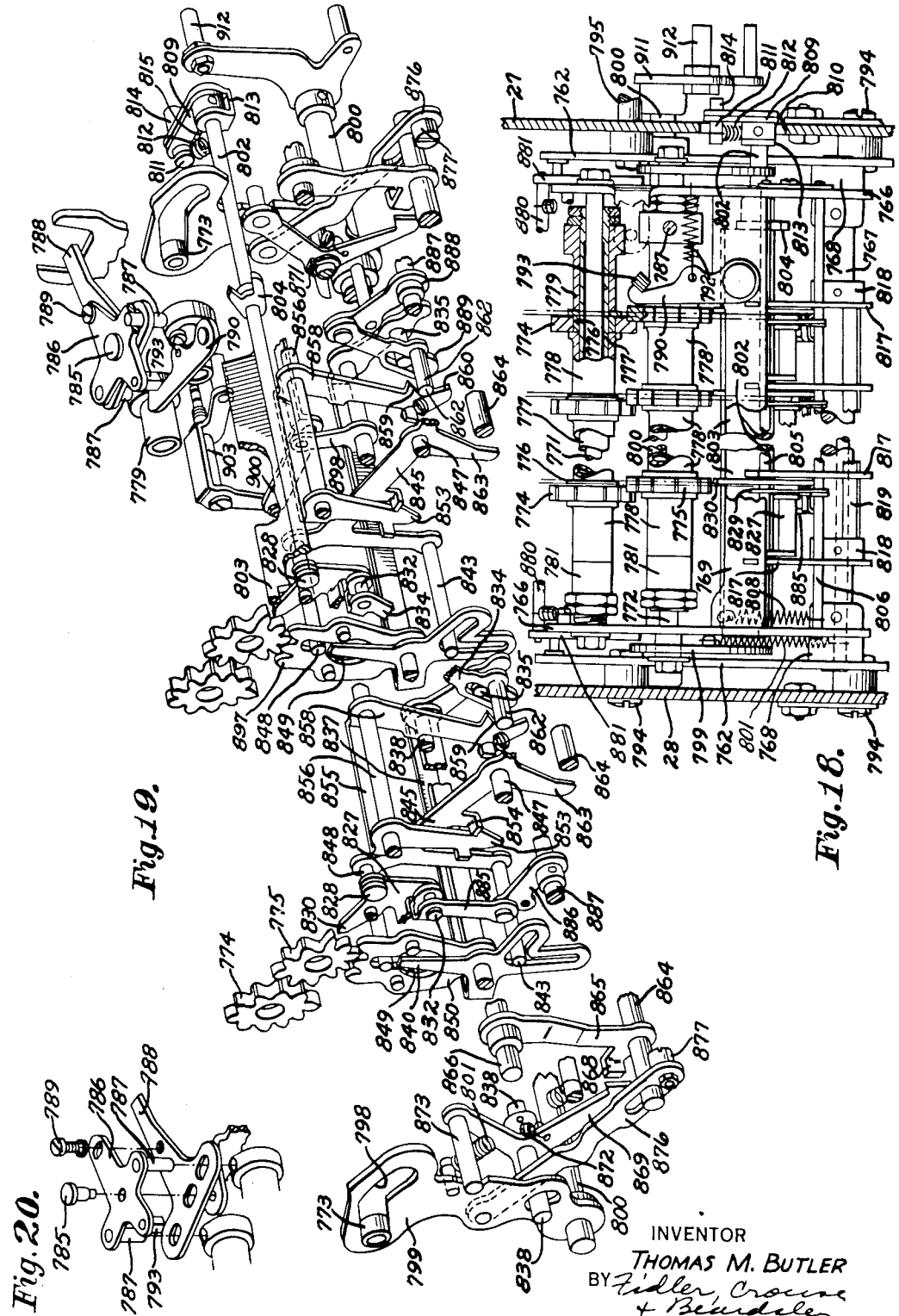

Jan. 3, 1956  T. M. BUTLER  2,729,392
CONTROL MEANS FOR CALCULATING MACHINE
Original Filed April 7, 1949  22 Sheets-Sheet 10

INVENTOR.
THOMAS M. BUTLER
ATTORNEYS

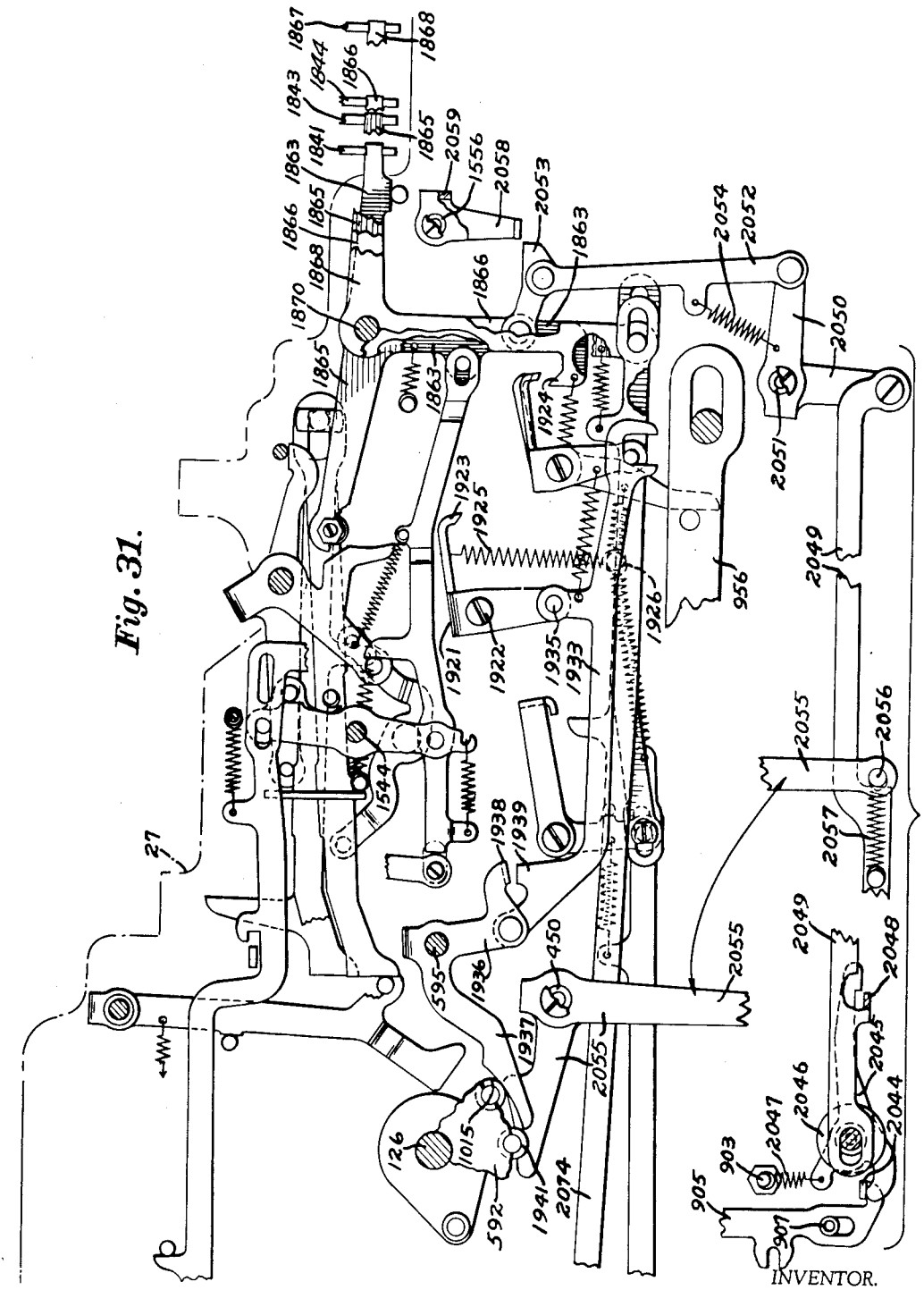

Jan. 3, 1956 — T. M. BUTLER — 2,729,392
CONTROL MEANS FOR CALCULATING MACHINE
Original Filed April 7, 1949 — 22 Sheets-Sheet 19
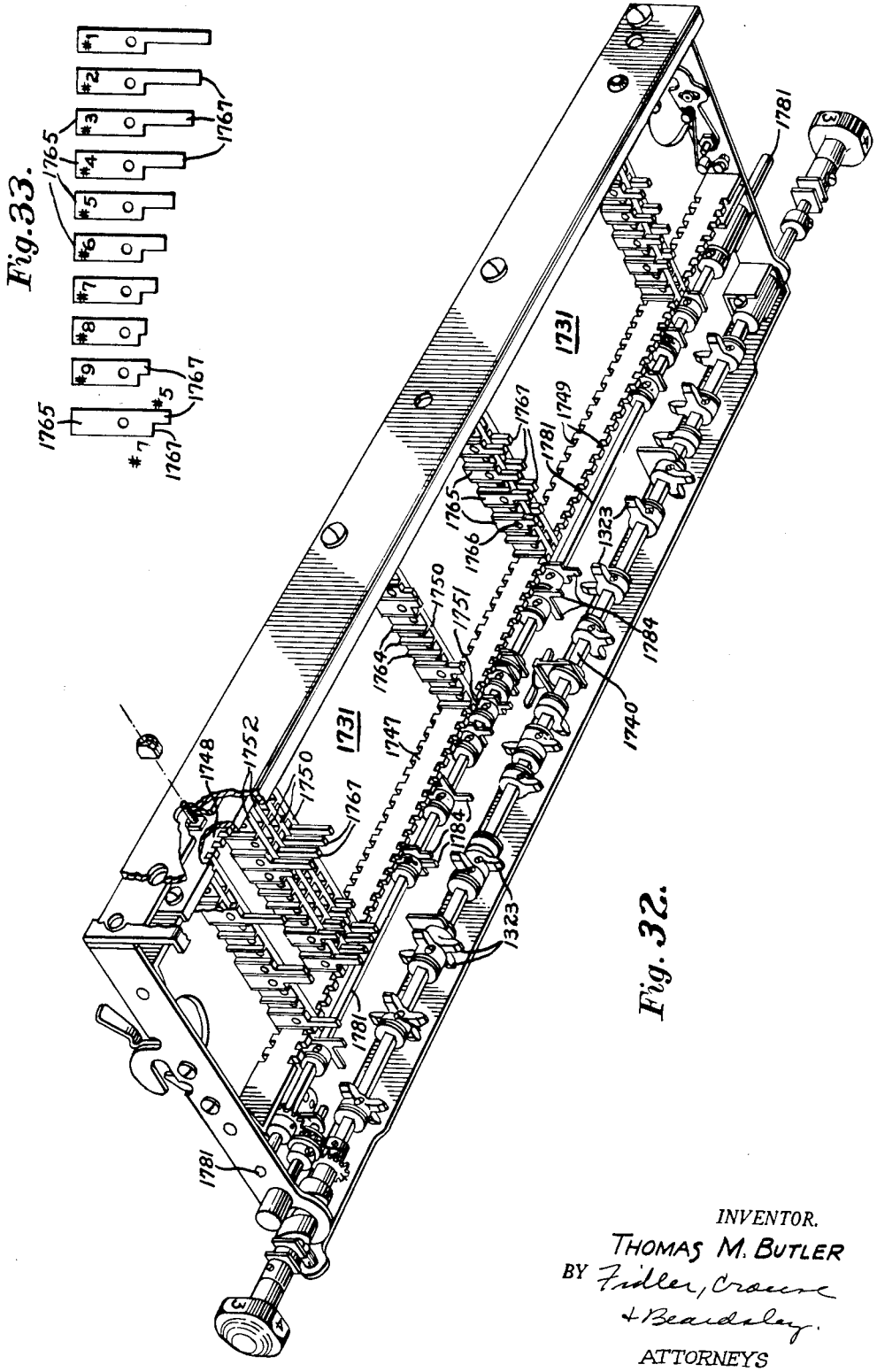
INVENTOR.
THOMAS M. BUTLER
BY Fidler, Crouse
+ Beardsley.
ATTORNEYS

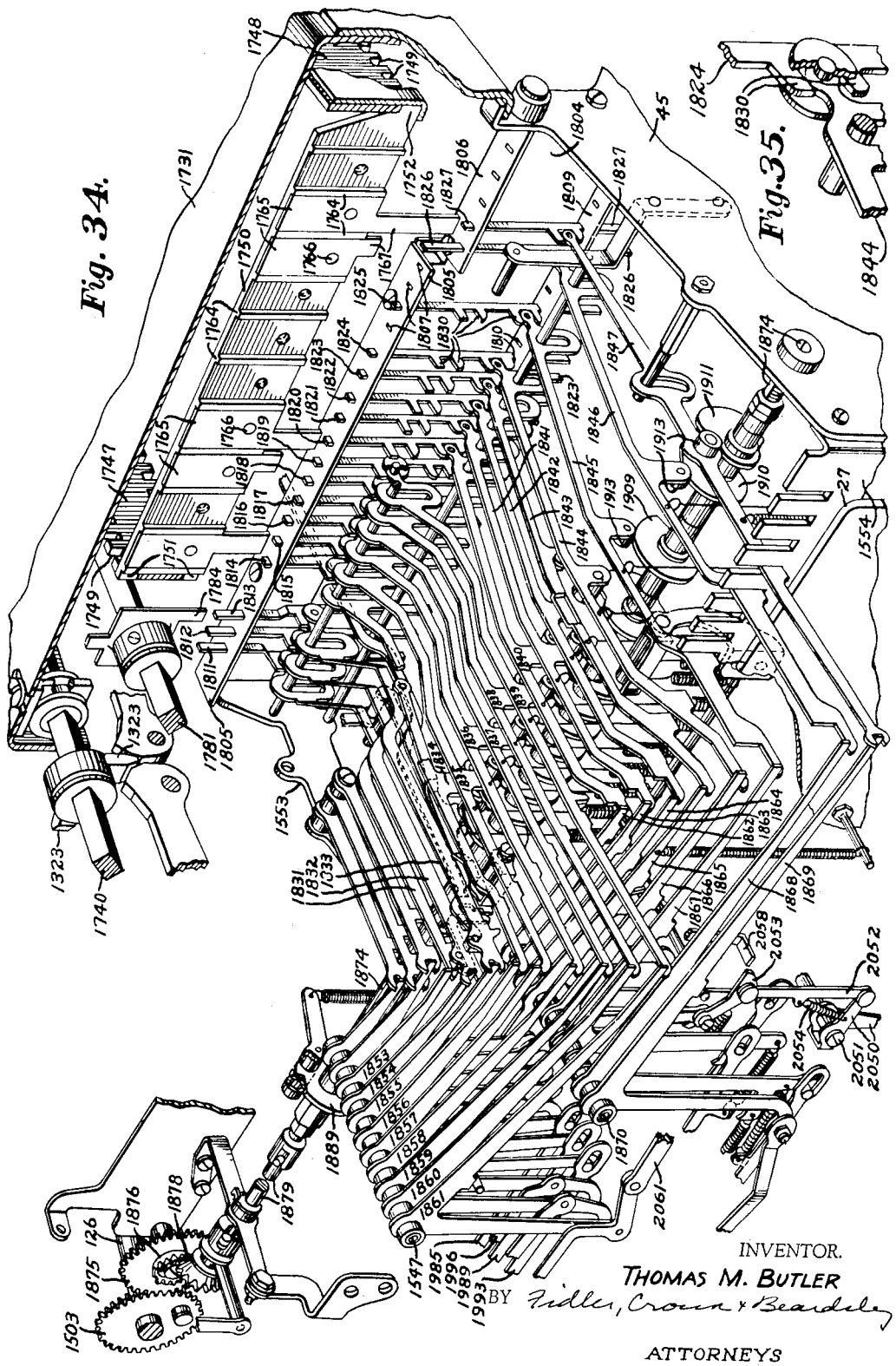

Jan. 3, 1956            T. M. BUTLER           2,729,392

CONTROL MEANS FOR CALCULATING MACHINE

Original Filed April 7, 1949           22 Sheets-Sheet 21

INVENTOR.
THOMAS M. BUTLER
BY Fidler, Crowe + Beardsley
ATTORNEYS

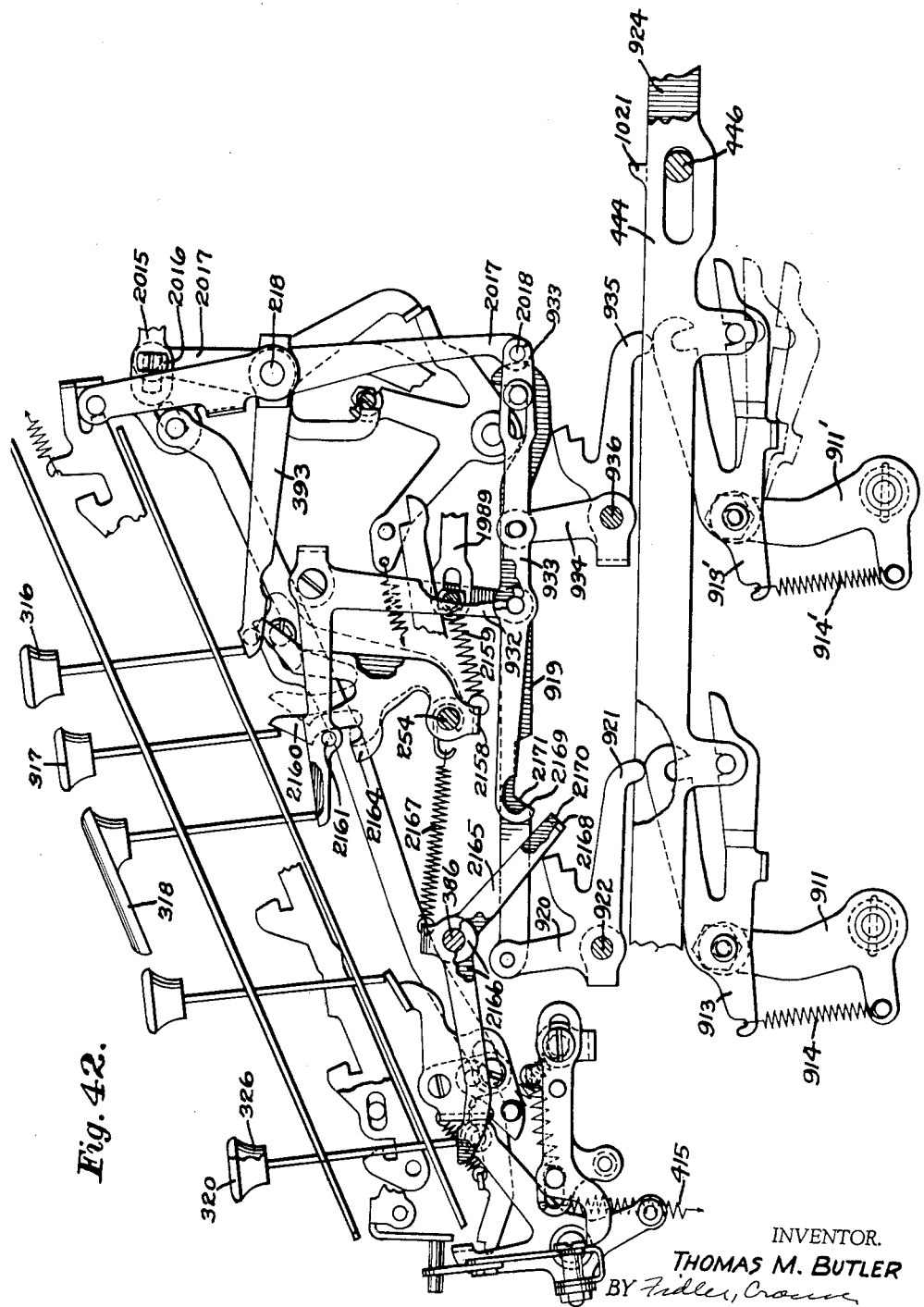

United States Patent Office 2,729,392
Patented Jan. 3, 1956

2,729,392

CONTROL MEANS FOR CALCULATING MACHINE

Thomas M. Butler, Detroit, Mich., assignor to Burroughs Corporation, Detroit, Mich., a corporation of Michigan Original application April 7, 1949, Serial No. 85,971. Divided and this application March 24, 1952, Serial No. 278,260

8 Claims. (Cl. 235—60.47)

This invention relates to improvements in computing mechanism control means for calculating machines. The present application is a division of my original application Serial No. 85,971, filed April 7, 1949, and subsequently abandoned. Other divisions and continuations-in-part of said original application are Serial No. 167,875, filed June 13, 1950, now Pat. No. 2,627,333; Serial No. 174,696, filed July 19, 1950, now Pat. No. 2,629,549; Serial No. 181,401, filed August 25, 1950, now Patent No. 2,635,732; Serial No. 196, 844, filed November 21, 1950, now Pat. No. 2,644,637; Serial No. 252,713, filed October 23, 1951, now Pat. No. 2,693,906.

An object of the present invention is to provide an accounting machine with improved means for producing a net or algebraic accumulation of debit and credit new balances.

A further object is to provide, in a calculating machine having an adding and subtracting totalizer capable of yielding directly true negative as well as positive totals, with improved means to obtain, in a second adding and subtracting totalizer, a net or algebraic accumulation of totals drawn from the first-mentioned totalizer.

A further object is to provide a control means which is governed, at least in part, by one adding and subtracting totalizer in accordance with the positive or negative condition of the latter and controlling, at least partially the adding and subtracting character of accumulating operation of another adding and subtracting totalizer.

A further object is to provide a control means governed jointly by a columnar printing control means and by adding and subtracting totalizer in accordance with the positive and negative balance condition of the latter and controlling the adding and and subtracting operation of a second adding and subtracting totalizer during cycles of operation of the machine initiated while the columnar printing control means is in a predetermined columnar condition.

A further object is to provide, in an accounting machine having a columnar recording means, an adding and subtracting totalizer capable of yielding directly true negative as well as positive totals, a total-taking control means for said totalizer governed by said recording means in accordance with the columnar condition of the latter, a second adding and subtracting totalizer, function control means to condition said second totalizer for addition or subtraction, and means governed jointly by said columnar recording means in accordance with the columnar condition of the latter and by the first-mentioned adding and subtracting totalizer in accordance with the positive or negative balance condition of the latter to place said function control means for said second totalizer in subtraction condition when said total-taking control means for said first totalizer is placed in total-taking condition while said first totalizer is in negative balance condition.

Other objects and advantages of the invention will be revealed in the following description of a preferred embodiment of the invention illustrated in the accompanying drawings in which:

Fig. 3 is a vertical longitudinal section of the machine illustrating the differential stop means and the differential actuator means controlled thereby for controlling a single order of the printing mechanism and of the totalizers, the illustrated parts being viewed from the right and numerous other elements being omitted for clearness;

Fig. 4 is an enlarged detail of a portion of Fig. 3;

Figure 12:
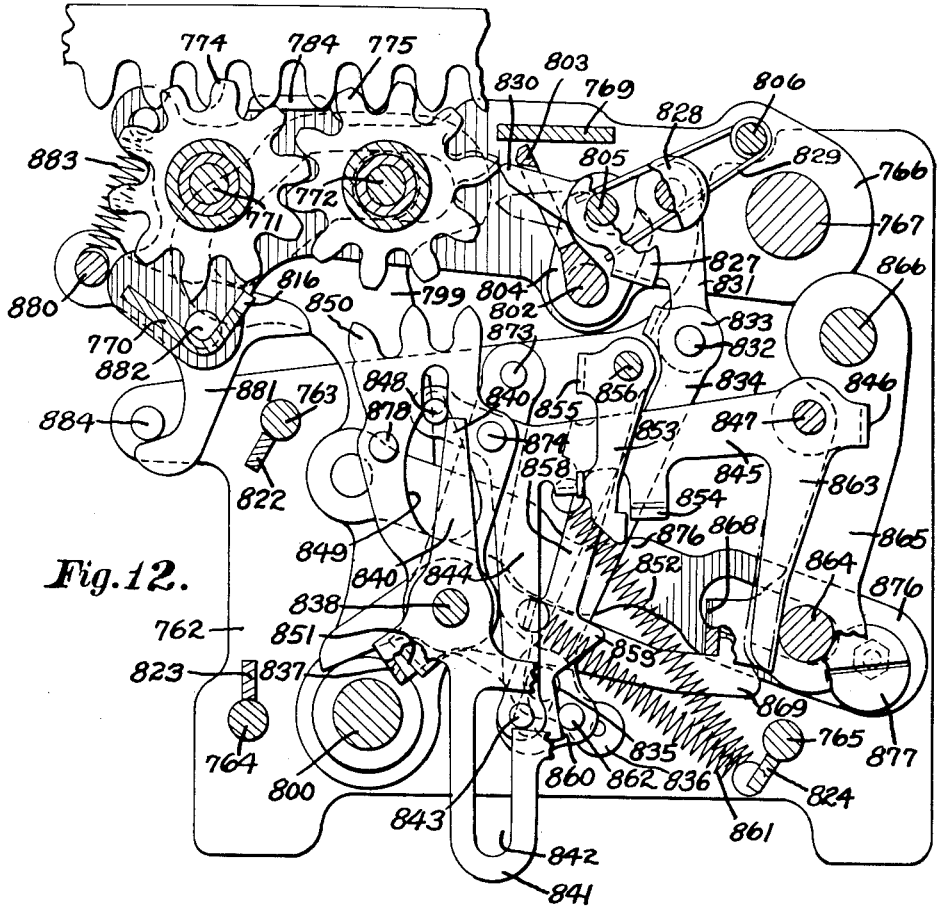
Figure 13:
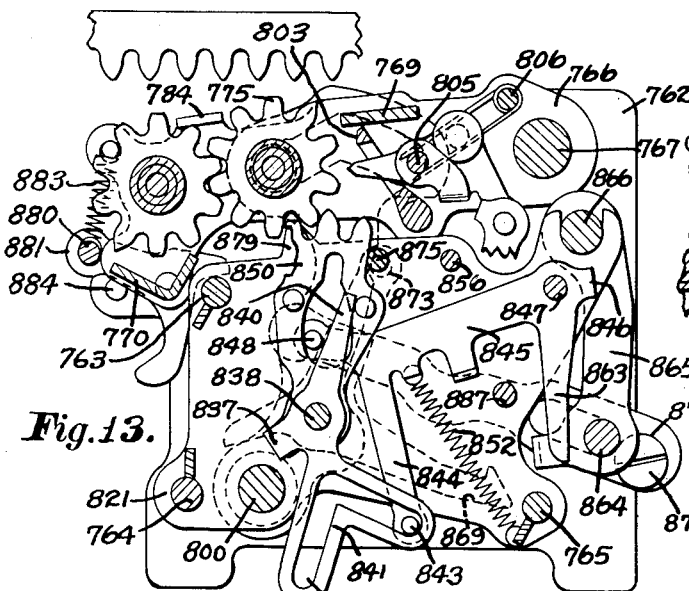
Figure 14:
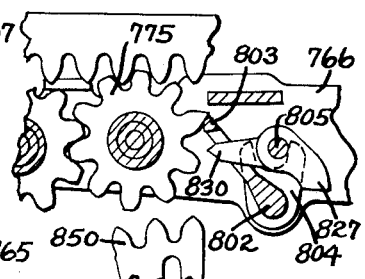
Figure 21:
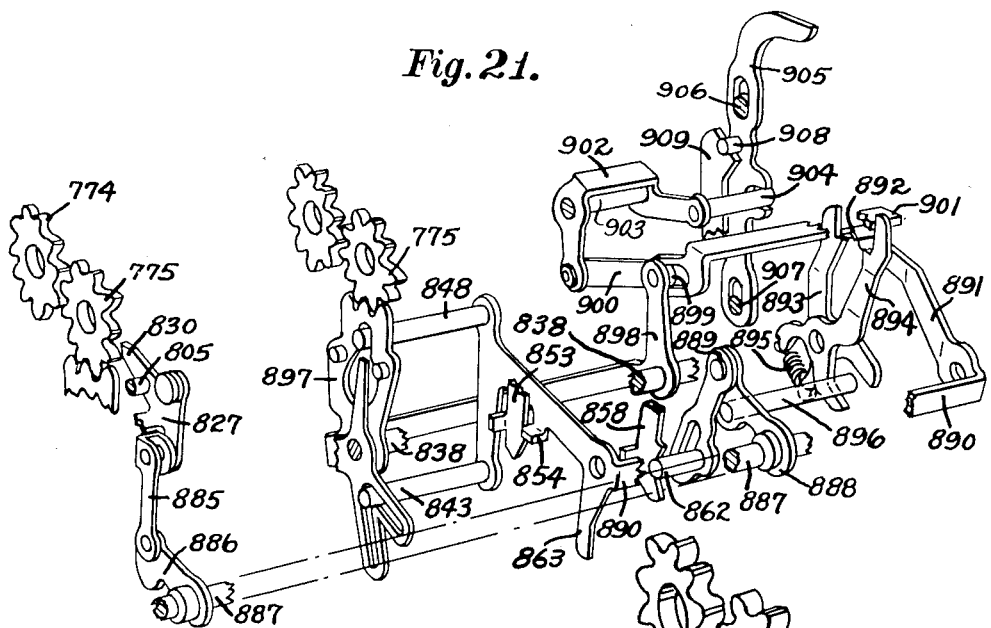
Figure 23:
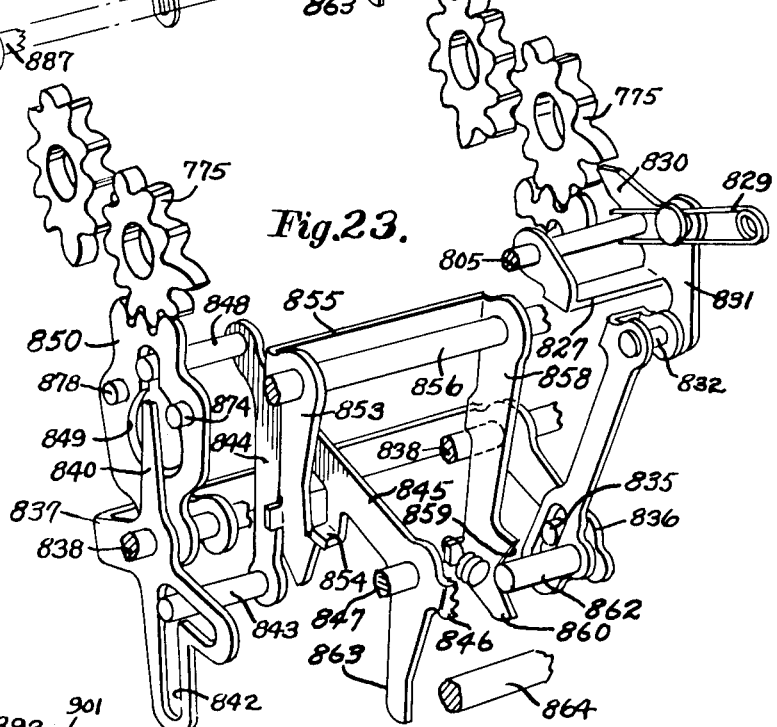
Figure 22:
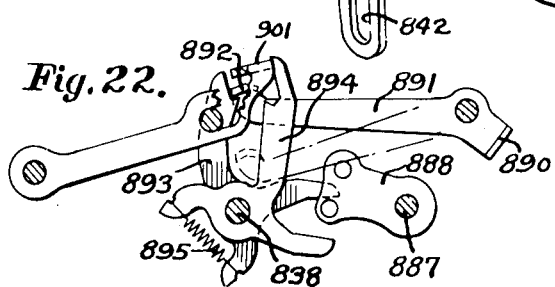
Figure 24:
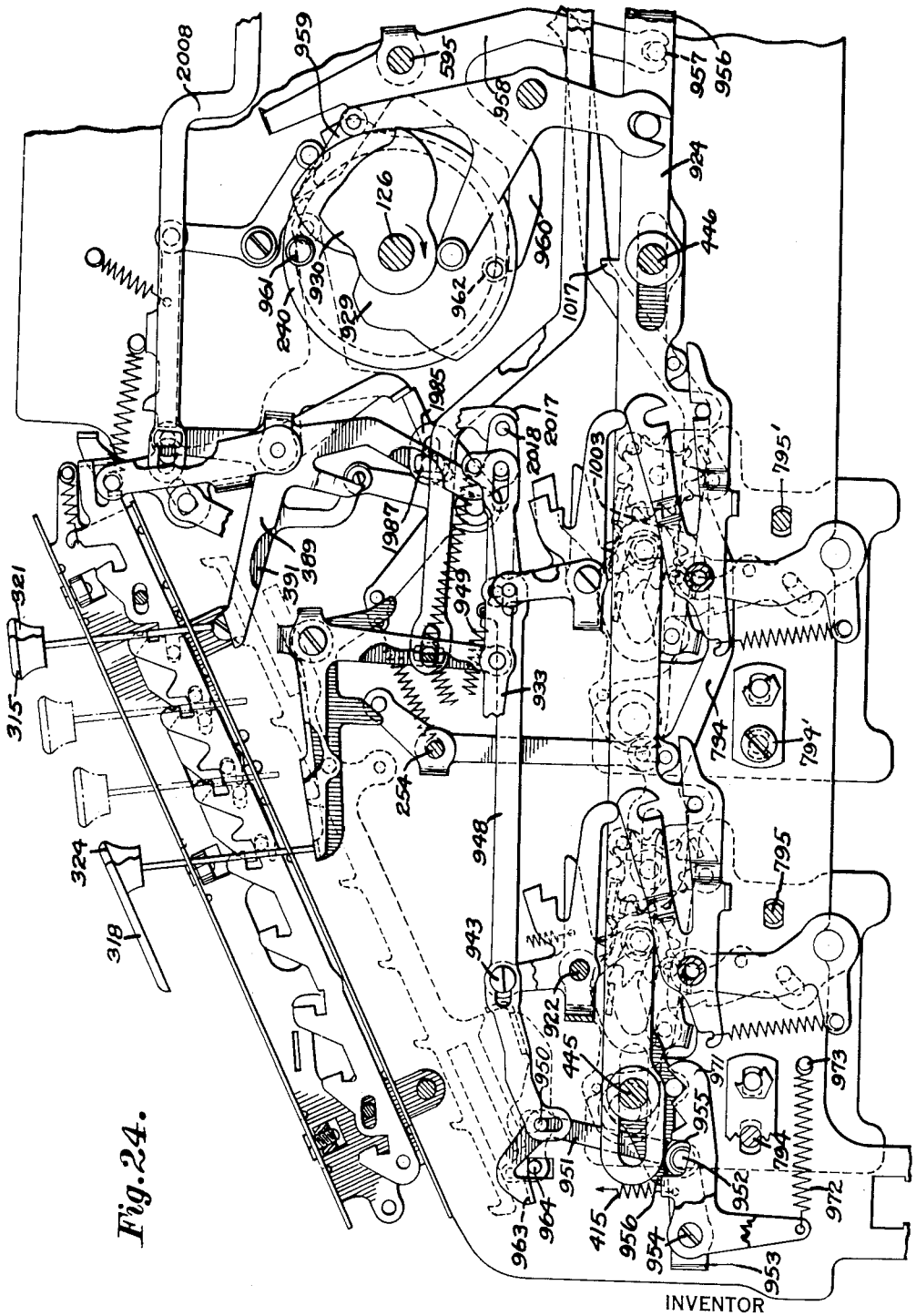
Figure 25:
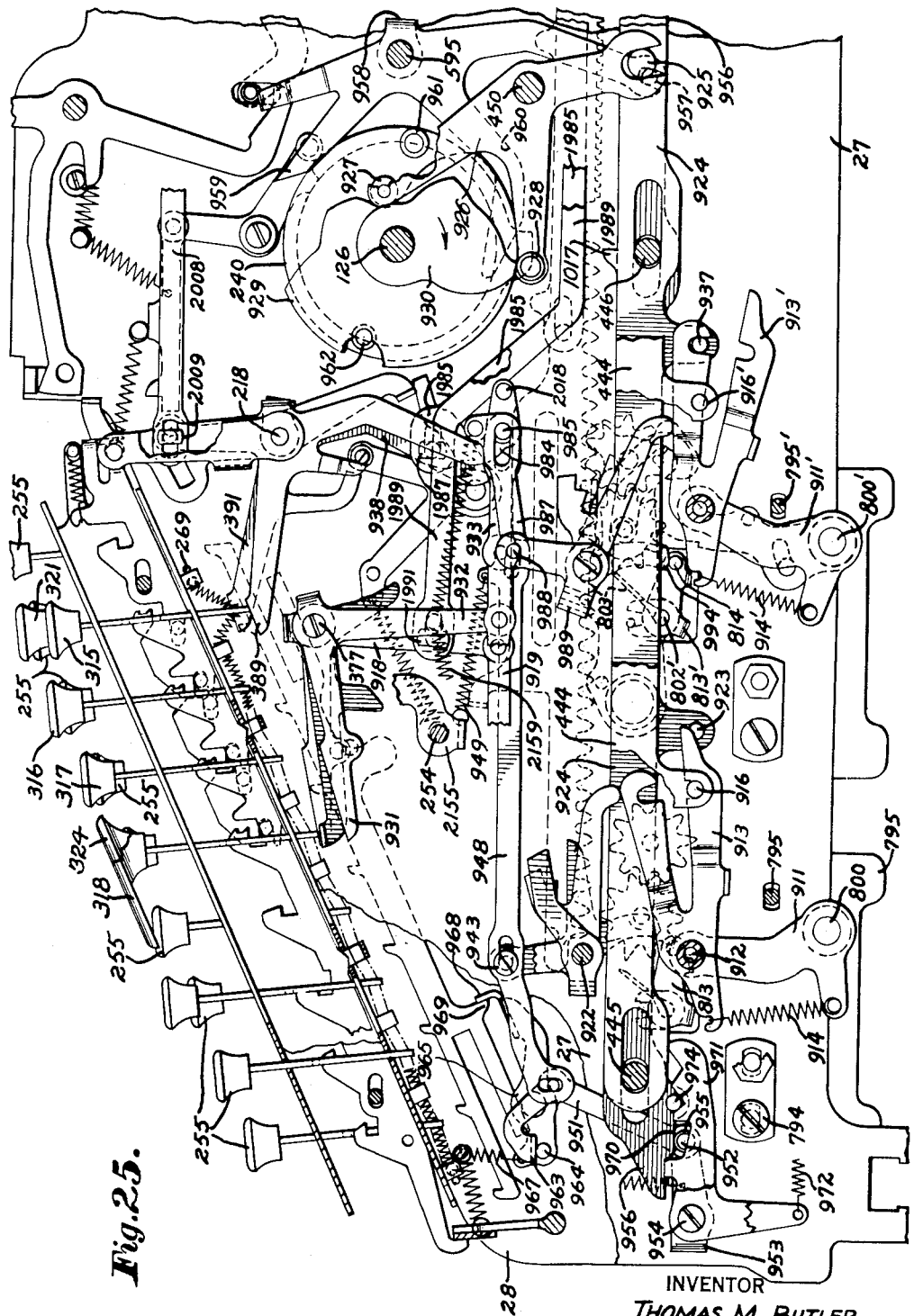
Figure 26:
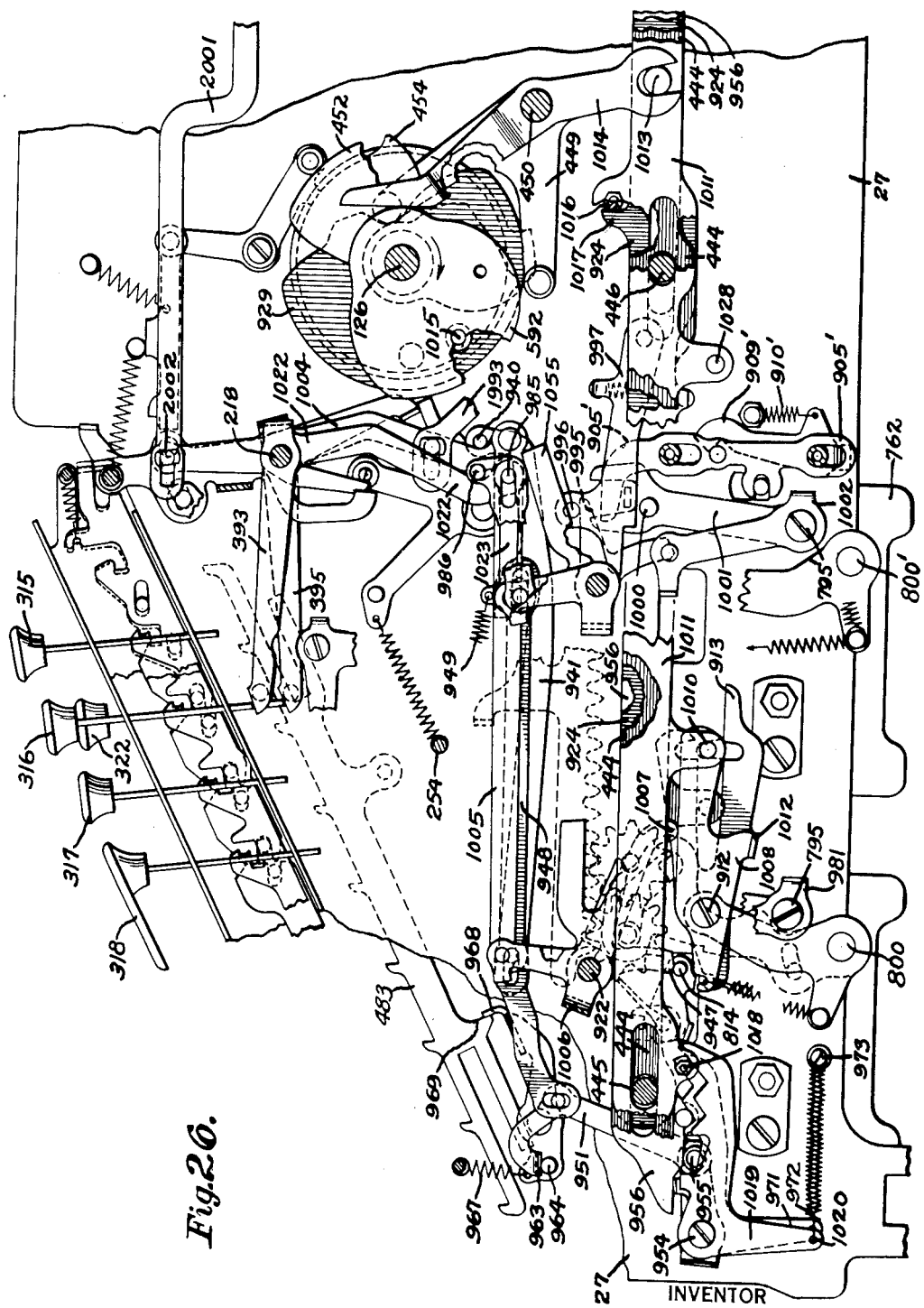
Figure 27:
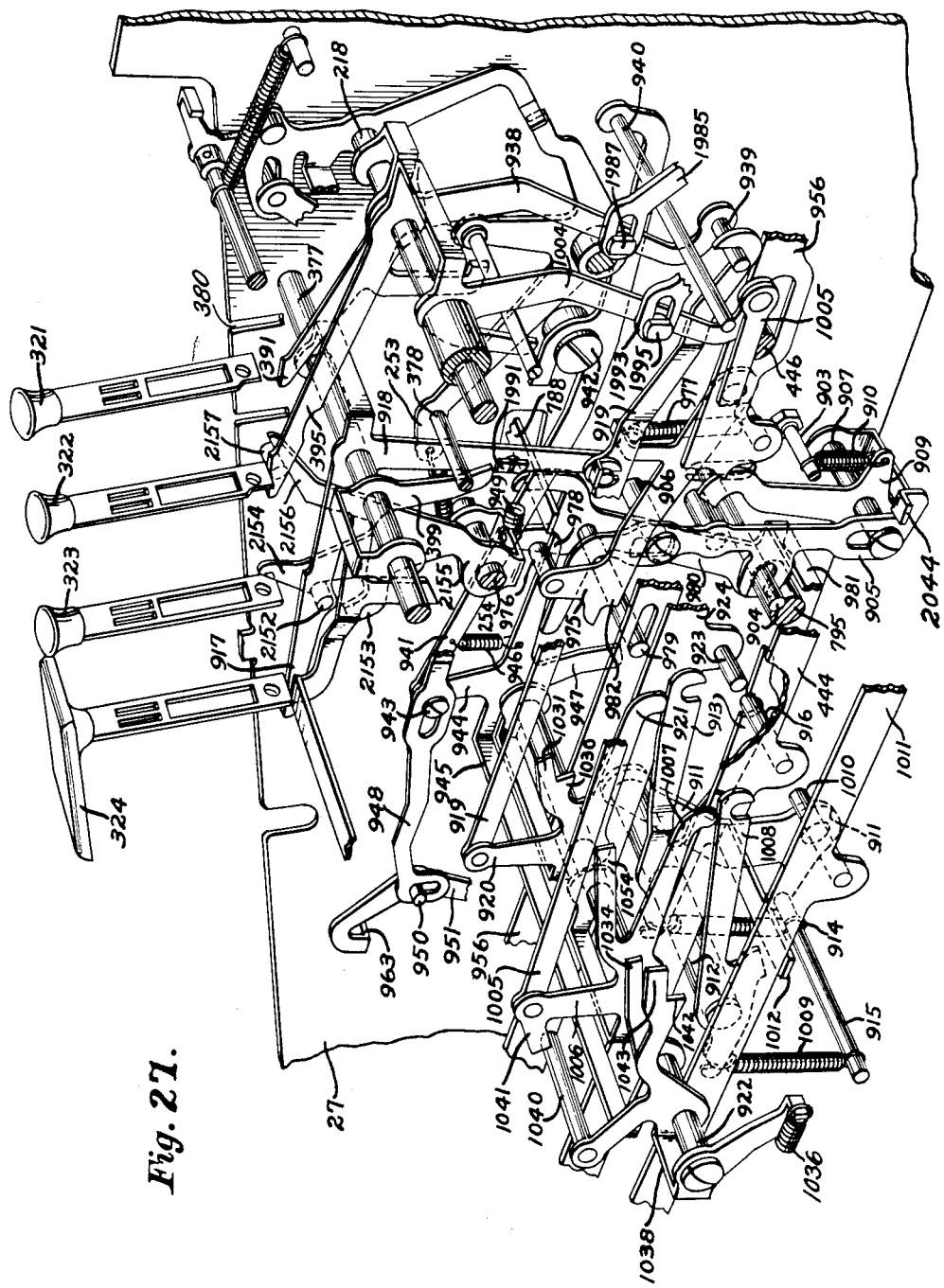
Figure 28:
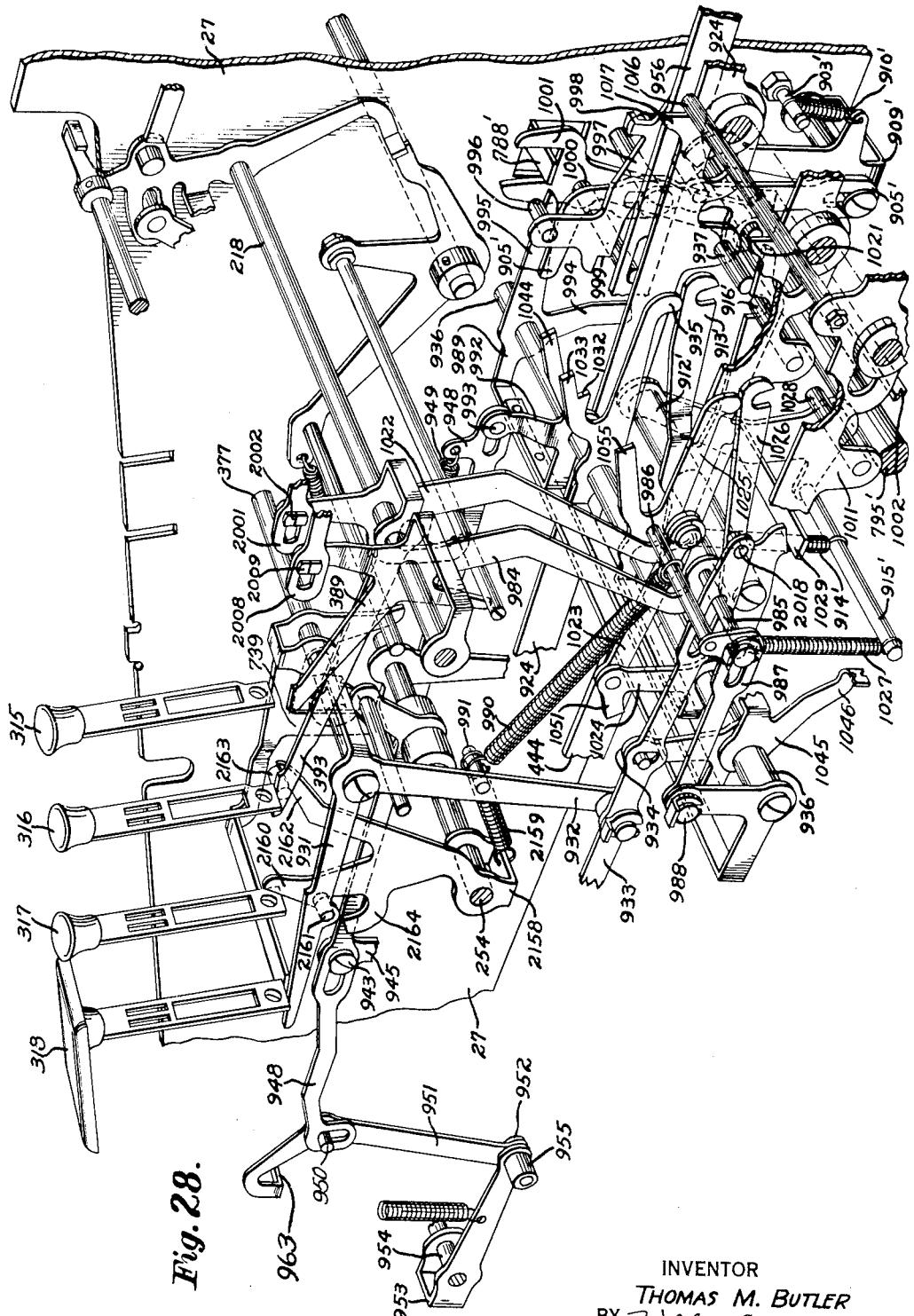
Figure 29:
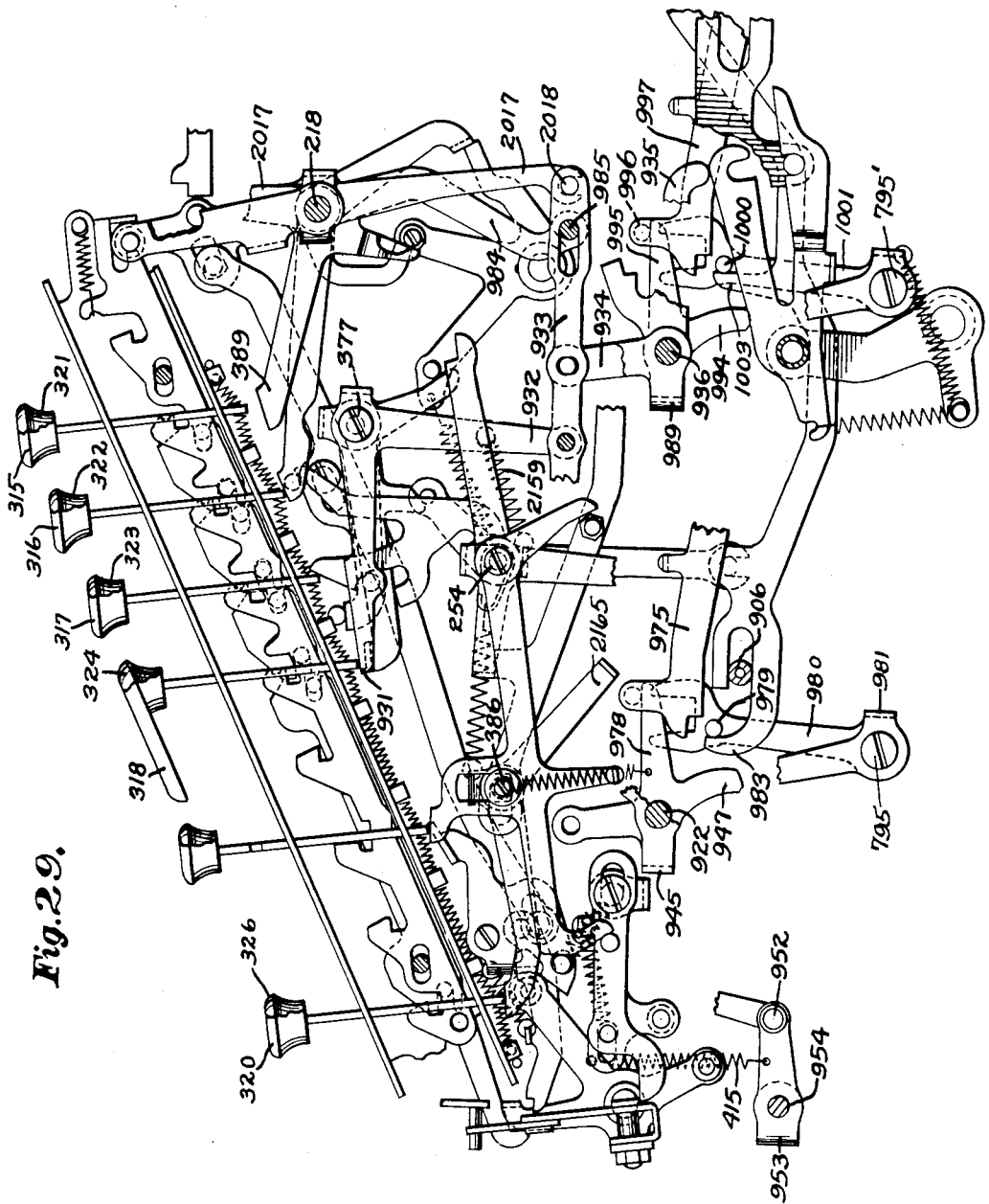
Figure 30:
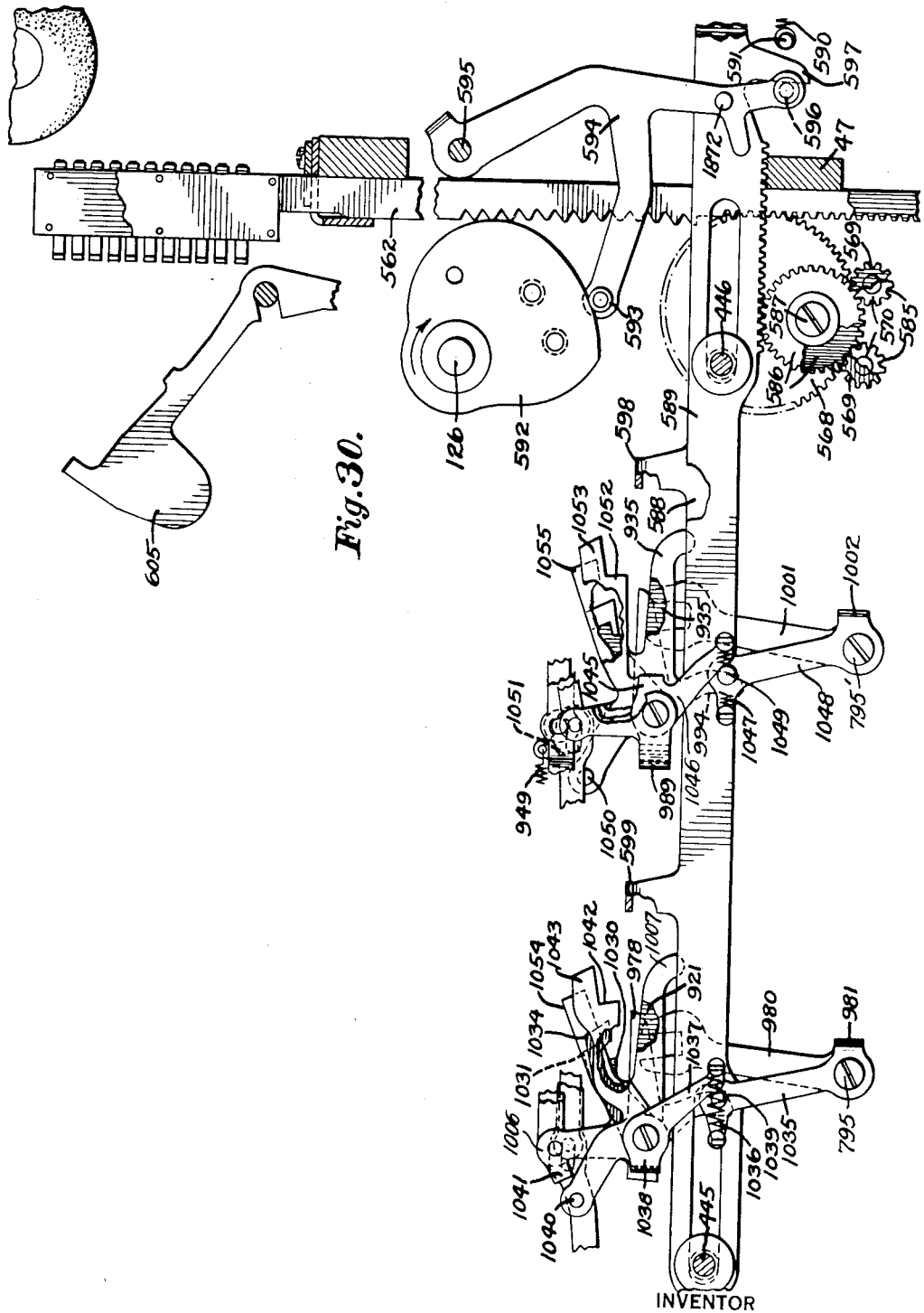
Figure 36:
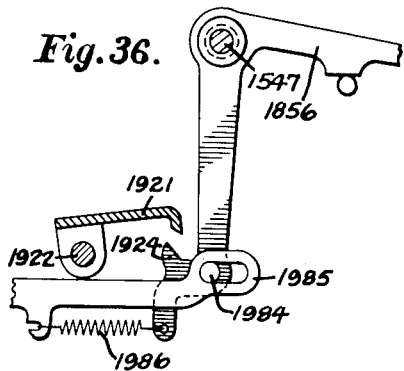
Figure 37:
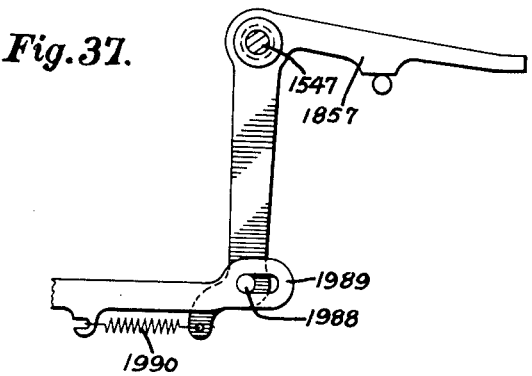
Figure 38:
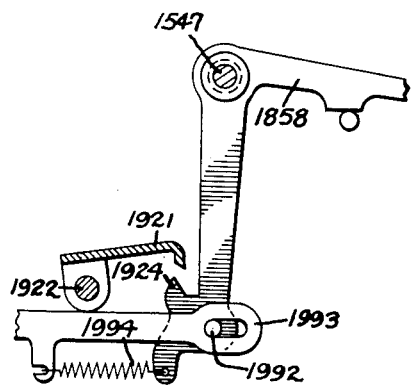
Figure 39:
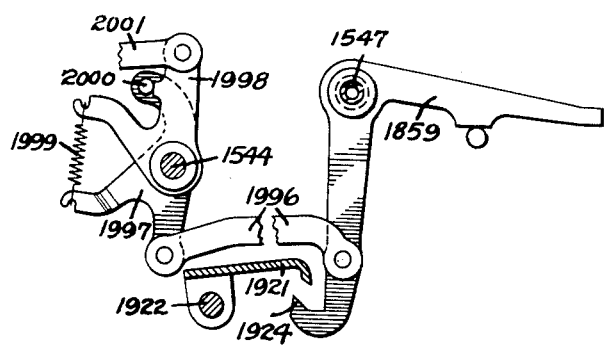
Figure 40:
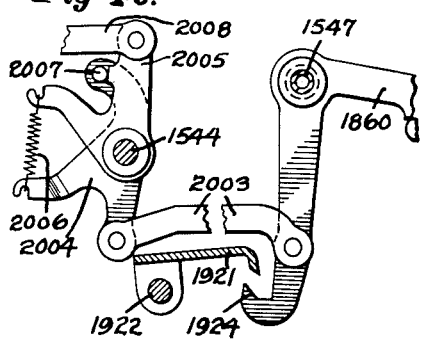
Figure 41:
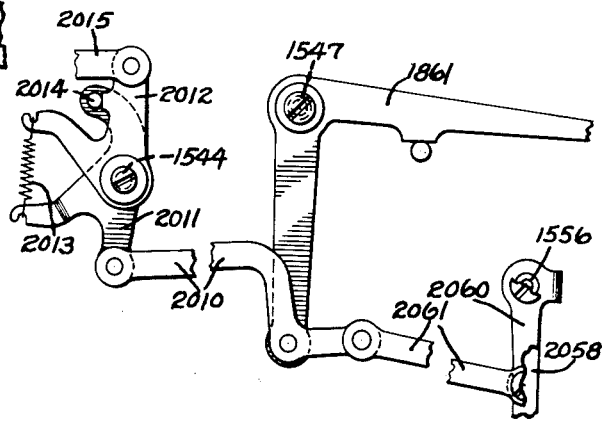

Figs. 5 and 6 are similar to Figs. 3 and 4, respectively, but show the parts in moved positions at about the 130° point in the rotation of the main shaft of the machine;

Fig. 7 is a detail of support and guide means for the differential actuators;

Fig. 8 is a perspective of the assembled frame of the transfer mechanism for one of the totalizers or crossfooters with the operating parts of the transfer mechanism omitted and as viewed from a point forwardly, rightwardly and above;

Fig. 9 is a detail of Fig. 8;

Fig. 10 is a perspective of the totalizer pinions of one of the totalizers and the supporting frame for said pinions as viewed from a point forwardly, rightwardly and above;

Fig. 11 is a detail of Fig. 10 with some of the elements shown in separated relationship;

Fig. 12 is a fore-and-aft vertical section through one of the totalizers or crossfooters looking toward the right and showing the parts in partially operated positions during an adding operation;

Fig. 13 is a view similar to Fig. 12 but showing the parts at a later time in the adding operation;

Fig. 14 is a detail;

Fig. 15 is similar to Fig. 12 but shows the parts in partially operated positions during a subtracting operation;

Fig. 16 is similar to Fig. 15 but shows the parts at a later time in the subtracting operation;

Fig. 17 is a detail in perspective;

Fig. 18 is a partial top plan of the totalizer or crossfooter;

Fig. 19 is a spread perspective of the "fugitive 1" mechanism and certain control elements associated therewith, omitting the intermediate orders of the tens-transfer mechanism;

Fig. 20 is a detail of Fig. 19;

Fig. 21 is a spread perspective of the overcapacity "fugitive 1" suppressing means and portions of the automatic negative total-taking control means;

Fig. 22 is a detail of Fig. 21 in left side elevation;

Fig. 23 is a spread perspective of a single tens-transfer train between consecutive orders of a totalizer;

Fig. 24 is a right side elevation of portions of the totalizer controlling and operating means particularly for total-taking and subtract operations, various parts being broken away or omitted for clearness;

Fig. 25 is generally similar to Fig. 24 but shows some of the parts in moved positions early in a machine operation in which a total will be taken from the rear totalizer or crossfooter and added in the front totalizer or crossfooter;

Fig. 26 is a right side elevation of portions of the crossfooter operating and controlling means particularly for subtotal-taking operations and shows the parts in moved positions early in an operation in which a subtotal will be taken from the front crossfooter;

Fig. 27 is a perspective of portions of the manually settable control means for the front crossfooter as viewed from a point rearward, rightward and above;

Fig. 28 is a perspective of portions of the manually settable control means for the rear crossfooter as viewed from a point rightwardly, rearwardly and above;

Fig. 29 is a right side elevation of portions of the crossfooter control means particularly illustrating the automatic negative total control means for the rear crossfooter;

Fig. 30 is a right side elevation of portions of the mechanism controlling the printing of symbols identifying the functions performed by the totalizer;

Fig. 31 shows in right side elevation portions of automatic function control means for the rear crossfooter;

Fig. 32 is a perspective view of an automatic function program control unit detached from the paper carriage and as viewed from a point rearwardly, rightwardly and below, some of the function control elements being removed to more clearly reveal others;

Fig. 33 illustrates control projections of various lengths adapted to be attached to the control unit of Fig. 32;

Fig. 34 is a spread perspective of the automatic sensing means mounted in the stationary frame of the machine for cooperation with the control unit of Fig. 32 and showing the connections operable by such sensing means to control various portions and mechanisms of the machine;

Fig. 35 is a detail of Fig. 34;

Figs. 36 to 41 show portions of various automatic control connections; and

Fig. 42 shows in right side elevation certain of the manually and automatically operable function control elements together with means for causing certain manual controls to disable certain automatic controls.

GENERAL

The present invention is herein disclosed as embodied in the accounting machine shown and described in detail in the above-mentioned applications Serial Nos. 85,971 and 174,696. Those elements of the machine which are described hereinafter are identified by the same reference numbers as in the last-mentioned application. Throughout the following description, as in said applications, positions and motions of elements of the machine will be described as viewed from the front of the machine when the latter is in its normal upright position, except that the words clockwise and counterclockwise will be used to describe rotary motions and positions as viewed from in front of, at the right of, or from above the machine.

The various mechanisms of the machine are supported on or within a frame comprising right and left side plates 27 and 28 (Figs. 1, 2 and 3) which are secured to and supported on a base pan 20 (Fig. 1) and which are further secured together in rigid, spaced relation by various transverse members.

Figure 1:
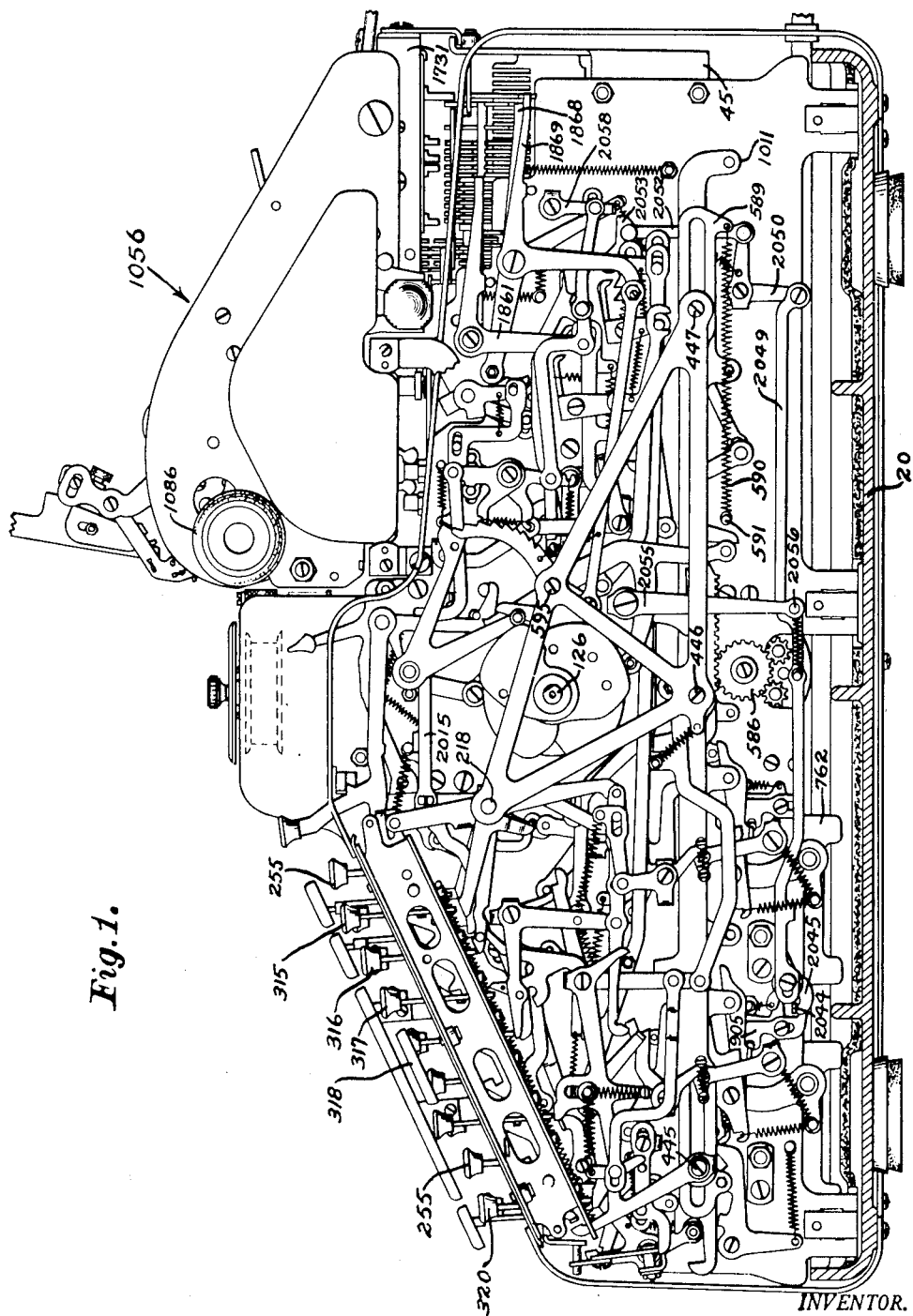
Fig. 1 is a right side elevation of the machine embodying the invention with the right side of the machine casing removed.

The machine is driven through cycles of operation by an electric motor, transmission and clutch (not shown), the main shaft 126 of the machine being driven thereby through a single full revolution in each machine cycle. The motor and clutch are controlled for cycling the machine by a number of motor bars and "live" function control keys, some of which will be referred to hereinafter, and by control means governed automatically in accordance with the columnar positions of the traveling paper carriage 1056 (Fig. 1).

The machine has eleven rows of amount keys 255 like the one row shown in Figs. 3 and 4, and each row including nine keys for the digits "1" to "9." For each row of amount keys 255, there is a differential stop slide and rear comb plates 39 and 40. Each stop slide 483 483 (Figs. 3 and 4) supported for rearward and forward sliding movement beneath the respective key-row on front carries a stud 489 engaging in a slot in an arm 490 of a stepped sector 491 pivotally mounted on a fixed transverse shaft 496 and having a series of stepped shoulders 509 to cooperate with a laterally turned lug 510 on an actuator rack 511. Each of the arms 490 is connected through a tension spring 501 to a cross rod carried by bail arms 499 secured on a shaft 500 journaled in the plates 27 and 28. The stop slides are thereby yieldingly urged rearwardly against a bail rod 498 carried by the upper ends of the arms 499. One of the arms 499 is connected through an eccentrically adjustable stud 504 with one arm of a three-armed lever 503 pivotally supported on the shaft 500. The other two arms of the lever carry roller studs 505 and 506 which, respectively, engage the edges of complementary cams 507 and 508 secured on the shaft 126. In each machine cycle the cams 507 and 508 drive the bail rods 498 and 502 rearwardly from about the 22° point to about the 90° point of the cycle and return them forwardly from about the 122° point to about the 190° point. In amount entering cycles, the springs 501 cause the stop slides 483 to follow the bail rod 498 rearwardly until the stop slides are limited by depressed keys 255 in the associated key-rows. Such rearward movements of the stop slides 483 are approximately inversely proportional to the digital values of the depressed keys, being maximum when no key is depressed and insignificant when the "9" key is depressed in the associated key-row.

The eleven actuator racks 511 and a twelfth, highest amount order actuator rack 519 for which there is no key-row and no stop slide, are forwardly and rearwardly slidably mounted on sleeves 513 (Fig. 7) on cross rods 514 and guided in laterally spaced slots in cross members 35, 36 and 38. Each of the actuator racks 511 and 519 has a normally coupled but releasable drive connection with a drive bail 531 which moves forwardly through a constant stroke from about the 90° point to about the 165° point in each machine cycle and again returns rearwardly from about the 189° point to about the 263° point. Each of such drive connections includes a pawl 525 pivotally mounted on a stud 524 on a rack slide 523 which is forwardly and rearwardly slidably mounted on studs 522 on a respective one of the actuator racks 511 and 519 and is normally yieldingly held in its rearmost position on the actuator rack by a tension spring 530 connected at its ends to the actuator rack and rack slide, respectively.

When the forward movement of an actuator rack 511 or 519 is arrested, the associated pawl 525 and rack slide 523 continue to be moved by the bail 531 a short distance further forwardly until a stud 527, secured in the actuator rack and engaging in a cam slot 526 in the pawl 525, cams the rear end of the latter upwardly, thereby uncoupling it from the bail 531 as shown in Fig. 5 and causing a stud 547 secured in the pawl to engage in one of a series of notches 548 in a respective one of a series of stationary notched plates 549 to thus lock the pawl 525, the rack slide 523 and actuator rack 511 or 519 in differential position until they are again picked up and returned to normal position by the bail 531 during the return of the latter to normal position.

The lugs 510 on the actuator racks and the stepped shoulders 509 on the sectors 491 are so arranged that, in amount entering cycles, the forward movements of the actuator racks 511 are limited to one tooth space for each unit of digital value of the depressed amount key 255 in the associated key-row, no significant forward movement of the actuator rack 511 being permitted in an amount entering cycle when no amount key in its associated key-row is depressed. In amount entering operations, a stop finger 521 on a bail member 968 is immediately in front of a stud 520 in the twelfth order actuator rack 519 and prevents the latter from moving from its normal position.

In a total-taking machine cycle, the bail 968 is rocked very early to remove the finger 521 from the path of the stud 520 and to place the rear upturned flange of the bail behind shoulders 969 on the stop slides 483 so that the actuator rack 519 is freed to move forwardly as far as permitted by the twelfth order pinion of the totalizer being zeroized and the "9" shoulders 509 of the sectors 491 remain in the paths of the lugs 510 on the actuator racks 511.

While the machine is at rest, the lugs 510 on the actuator racks 511 and 519 are engaged in the rearmost notches in the ten-toothed upper edges of ratchet arms 552 which are pivotally supported at their rear ends on the shaft 496 and urged clockwise by springs 553. In each machine cycle, before the drive bail 531 starts to move forwardly, the ratchet arms 552 are swung counterclockwise away from the lugs 510 by a bail 555 acting on upward arms 554 of the ratchets and, after the drive bail 531 has moved forwardly far enough to drive actuator racks a little past their "8" positions, the bail 555 and ratchet arms 552 are returned to their normal positions and prevent any actuator rack from being snapped forwardly by the springs 530 to strike their shoulders 532 sharply against the bail 531 when, during the return of the latter toward normal position, the studs 547 are withdrawn from the notches 548 in the plates 549. The return of the stop slides 483 and sectors 491 to their normal positions is started while the bail 531 is near the mid-point of its forward stroke and is completed when the bail 531 commences its return stroke at about the 190° point in the machine cycle.

The rack slides 523 on the actuator racks 511 and 519 drive trains of gearing 566, 567, 568, 569, 570 (Figs. 3 and 4) by which twelve amount printing type bars 562 are indexed to position types 561, representing the amount entered on the keys 255 or the total taken from a totalizer, at the printing line of the platen 1057 in the carriage 1056, and are again restored to normal in each machine cycle. The type at the printing line are struck against paper on the platen by printing hammers 605 which are fired very soon after the bail 531 reaches the end of its forward stroke.

Date and character orders of the keyboard, differential mechanism and printing mechanism need not be considered in connection with the present invention.

TOTALIZERS

The illustrated machine has two totalizers, hereinafter referred to as the front and rear crossfooters, both capable of accumulating a total of items printed in one or more lines across a plurality of columns on a record paper supported on the platen, and both capable of adding, subtracting and directly yielding true negative as well as positive totals. They are of the same construction so that a description of one will serve for both. Such elements of the rear crossfooter as are shown in the drawings or referred to hereinafter are designated by the same reference numbers, except for the addition of a prime ('), which designate the corresponding elements of the front crossfooter, which is next described to the extent necessary to a clear disclosure of the present invention.

The main frame of the front crossfooter 761 comprises a pair of side plates 762 (Fig. 8) connected in rigid spaced relation by cross rods 763, 764 and 765 and supported between the main frame side plates 27 and 28 by headed screws 794 (Fig. 18) and a shouldered stud 795. The rods 763, 764 and 765 support thirteen partition plates 821 (Figs. 8 and 9) which are held in spaced relation by notched spacing strips 822, 823 and 824 and support cross rods and shafts 838, 847, 856 and 875, which, in turn, support elements of a transfer mechanism described hereinafter. A pinion frame (Figs. 10 and 11) comprises a pair of side plates 766 which are secured at their forward end portions on collars pinned on a shaft 767, the ends of which are journaled in bushings 768 secured in the plates 762. The plates 766 are also held in rigid spaced relation by shafts 771 and 772 and spacing strips 769 and 770. The shaft 767 and spacing strip 769 support a series of small plates 817 which are held in spaced relation by the spacing strip 769 and by notched spacing strips 819 abutting collars 818 pinned on the shaft 767. The plates 766 and 817 support rods 805 and 806 which in turn support certain elements of the transfer mechanism as described hereinafter.

Twelve pairs of meshing pinions 774 and 775 are arranged in two lines, the pinions 774 or 775 in each line being rotatable on small shouldered bushings 776 spaced axially between shouldered sleeves 778 and 779 which, together with a sleeve 781 at the left end of each line, are supported on a tube 777 mounted on a respective one of the shafts 771 and 772 for a short axial sliding movement thereon. The bushings 776 and sleeves 778, 779 and 781 are held tightly together in fixed position on the tubes 777 by pairs of nuts threaded on the ends of the tubes.

The two tubes 777 with their respective lines of pinions are tied together to shift simultaneously in opposite directions on their shafts 771 and 772 by a four-armed lever 786, pivoted on a stud 785 secured in a leftwardly turned lug of the right side plate 766. The forward and rearward arms of the lever 786 carry studs 787 projecting downwardly into bores in the right end sleeves 779, and the rightward arm of the lever 786 is adjustably secured by a headed screw 789 to a lever 788 which is also pivoted on the stud 785 and may be rocked to shift the two lines of pinions 774 and 775 in opposite directions. The leftward arm of the lever 786 carries a square stud 793 cooperating with the nose of a spring urged detent lever 790 yieldingly holding the sleeves 777 with their lines of pinions in either of their oppositely shifted positions. The pinions 774 and 775 are of such width as to remain meshed in pairs while the pinions 774 and 775 alternately are positioned in vertical alignment with the actuator racks 511 and 519. The pinions 775 of the forward line are in alignment with the actuator racks 511 and 519 at all times except during negative total-taking.

The pinions are normally lowered out of mesh with the actuator racks 511 and 519, but the pinion frame may, in a cycle of operation of the machine, be rocked upwardly and again downwardly about the axis of the shaft 767 to bring the pinions 774 or 775, whichever are in vertical alignment with the actuator racks, into and again out of mesh with the latter. Such rocking of the pinion frame is effected by a pair of cam arms 799 secured on collars pinned on a shaft 800 and each having a cam slot 798 embracing a roller 773 rotatable on a respective end of the shaft 772. The shaft 800 is journaled in bushings secured in the plates 762 and is rockable by means described hereinafter to mesh the crossfooter pinions with the actuator racks and again unmesh them at the proper times in machine cycles.

In adding operations, the pinion frame is rocked upwardly to mesh the pinions 775 with the actuator racks 511 and 519 prior to movement of the latter forwardly from their normal positions and downwardly to unmesh the pinions from the actuator racks prior to movement of the latter rearwardly to their normal positions. In subtracting operations as well as in positive total-taking operations, the pinion frame is rocked upwardly to mesh the pinions 775 with the actuator racks prior to their movement forwardly and is again rocked downwardly to unmesh the pinions from the actuator racks prior to the return movement of the latter. In negative total-taking operations, the timing of the rocking of the pinion frame is the same as in positive total-taking and subtracting operations but the lever 788 is rocked forwardly to shift the pinions 775 leftwardly out of alignment with the actuator racks 511 and 519 and the pinions 774 rightwardly into alignment with the actuator racks prior to the upward rocking of the pinion frame so that the pinions 774 instead of the pinions 775 will be meshed with actuator racks. Near the end of a negative total-taking operation, and considerably after the pinion frame has been lowered to normal position, the lever 788 is again rocked rearwardly to return the pinions 774 and 775 leftwardly and rightwardly, respectively, to their normal positions.

Each pinion has ten teeth, one of which is longer than the remaining nine. In positive total-taking, the pinions are arrested in their "0" positions by engagement of the long teeth of the pinions 775 against the edge of a zero stop blade 803 (Figs. 11–16) formed on a shaft 802 which is journaled in the pinion frame end plates 766. An arm 804 (Figs. 10, 12 and 19) secured on the shaft 802 between the rightward end of the blade 803 and the right-hand plate 766 has, in its upper end, a notch forming two fingers on opposite sides of the rod 805. A tension spring 808 (Fig. 11) connected between the upper edge of the blade 803 and the rod 806 normally holds the blade 803 with its upper edge forwardly clear of the long teeth of the pinions 775 and with the rear finger of the arm 804 engaged against the rod 805. An arm 809 (Figs. 10 and 19) is secured to and extends rearwardly from a collar pinned on the rightward end of the shaft 802. A tension spring 812 connected between a stud 811 in the arm 809 and a yoke member 813 pivotally supported on the shaft 802, normally holds a lug 815 on a rearward arm of the yoke 813 engaged against the underside of the arm 809.

As the pinion frame is elevated in total-taking operations, a means described hereinafter blocks upward movement of a stud 814 secured in the rearward arm of the yoke 813 and so rocks the shaft 802 clockwise until the front finger on the arm 804 limits on the rod 805, thereby positioning the upper edge of the blade 803 in the path of the long teeth of the pinions 775. In negative total-taking, the pinions are arrested by engagement of the long teeth of the pinions 774 against teeth 816 on the strip 770. The teeth 816 (Figs. 11 and 12) are clear of the paths of the long teeth of the pinions 774 except when the pinions are in their negative total-taking positions. The pinions 774 and 775 are meshed in such relation that when the long teeth of the pinions are arrested by the teeth 816 in negative total-taking, the pinions are in their positive "9" positions in relation to the positive "0" positions in which the pinions are arrested by the blade 803 in positive total-taking. In other words, the negative "0" positions of the pinions coincide with their positive "9" positions, and their positive "0" positions coincide with their negative "9" positions.

While the pinions are in their lowered positions and shifted laterally to their negative total-taking positions, tooth-like projections 879 (Figs. 8, 9 and 13) on the upper edges of the plates 821 engage between teeth of the pinions 775 to prevent rotation of the pinions. At all other times while the pinions are in their normal lowered positions, the lowest order pinion 775 meshes with a "fugitive 1" segment 897 and the other eleven pinions 775 mesh with transfer segments 850 of a transfer mechanism. To prevent accidental rotation of the pinions while they are being raised and lowered to mesh them alternately with the racks 511 and 519 and the "fugitive 1" and transfer segments or the teeth 879, a bail rod 880 (Figs. 10–13 and 18) is provided. The bail rod 880 is supported at its ends in the rear arms of a pair of three-armed levers 881 pivotally mounted on studs 882 which are secured in the rear ends of the end plates 766 and project outwardly therefrom. The bail rod 880 is urged toward the pinions 774 by two tension springs 883 each connected with a respective end of the bail rod 880 and with a stud secured in the respective end plate 766.

The bail rod 880 is normally, that is, while the pinion frame is in its lower position, held rearwardly of the pinions 774 by engagement of the forward arms of the levers 881 against the upper sides of the ends of the rod 763, but when the pinion frame carrying the levers 881 is elevated the springs 883 rock the levers 881 to engage the rod 880 between teeth of the pinions 774 before the pinions 775 are unmeshed from the transfer segments 850 or teeth 879. The rod 880 remains in position between teeth of the pinions 774 until after the pinions 775 or 774 are well meshed with the actuator racks 511 and 519, at which time, rearwardly directed cam ends of the lower arms of the levers 881 engage against the undersides of a pair of studs 884 secured in the side plates 762 and projecting inwardly therefrom. During the final portion of the upward movement of the pinions, the studs 884 cam the levers 881 clockwise to disengage the rod 880 from between the teeth of the pinions 774.

When the pinions are again lowered to normal position the reverse action takes place, that is, as the rear ends of the end plates 766 carrying the levers 881 are lowered, the studs 884 permit the springs 883 to re-engage the rod 880 between the teeth of the pinions 774 and then, after the pinions 775 are again well meshed with the transfer segments 850 or the teeth 879, rear arms of the levers 881 re-engage the rod 763 and are thereby rocked to retract the rod 880 from the pinions 774. The studs 882 are so positioned that the rod 880, while engaged between the teeth of the pinions 774, holds the pinions in position for accurate meshing with the actuator racks 511 and 519 and with the transfer segments 850.

TENS-TRANSFER MECHANISM

The transfer mechanism comprises for the pinion 775 of each order except the highest order, a set of parts controlled by a respective one of those pinions and controlling a transfer segment 850 to act upon the next higher order pinion 775. As all eleven orders of the transfer mechanism are alike, a description of one will suffice for all.

The transfer pawl controlled by the pinion 775 of the lower order is formed as a yoke 827 (Figs. 12, 15 and 23) having its two side arms pivotally supported on the rod 805 closely adjacent the facing sides of two adjacent partition plates 817. The right-hand side arm of the yoke 827 carries a stud 828 having a deep annular groove through which pass the two normally parallel end portions of a centering spring 829 coiled around the rod 806. The ends of the spring 829 normally press against opposite sides of the rod 805 and so normally yieldingly hold the axis of the stud 828 in the plane containing the axes of both of the rods 805 and 806. With the yoke 827 thus normally positioned, the rear end of a pawl finger 830 extending rearwardly from the right-hand side arm of the yoke 827 is normally positioned in the path of the long tooth of the pinion 775 and midway between the positive "0" position and the positive "9" position of that tooth while the pinion is in the normal rightward position which it occupies in all adding and subtracting operations as well as in positive total-taking operations.

A forward and downward extension 831 of the right-hand side arm of the yoke 827 carries a leftwardly projecting headed stud 832 which pivotally supports a small yoke 833. The right-hand side arm of the yoke 833 abuts against the downward extension 831 of the yoke 827 to space leftwardly a link 834 which extends downwardly from the left-hand side of the yoke 833 and a little to the left of a partition plate 821. The lower end of the link 834 has a longitudinally elongated slot embracing a stud 835 carried by a forwardly extending arm 836 of the right-hand side arm of a yoke 837 pivoted on the shaft 838 close to the left face of the last-mentioned partition plate 821 and the right-hand face of the next partition plate 821 to the left. The left-hand side of the yoke 837 has an upwardly extending director arm 840 and a somewhat Y-shaped arm 841 in which is a slot 842 of inverted L-shape with its legs extending downwardly and forwardly, respectively, from their juncture. In the bend of the slot 842, there is normally positioned a stud 843 which has a diameter substantially less than the width of the slot 842 and which is carried by a downward branch 844 of a rearward arm 845 on the left end of a yoke 846 which is pivotally supported on the shaft 847.

The rearward end of the arm 845 carries a stud 848 which extends through a somewhat pear-shaped slot 849 in the transfer segment 850 which meshes with the higher order pinion 775 while the pinions are in normal position. The transfer segment 850 extends upwardly integrally from the left side of a yoke 851 pivotally supported on the shaft 838 so that the transfer segment 850 is immediately to the right of the arm 840. The arm 845 is urged clockwise by a tension spring 852 (Fig. 12) connected between the arm 845 and the spacing strip 824. A latch 853, engaging under a downwardly extending and leftwardly bent lug 854 on the arm 845, normally holds the latter in a position such that the stud 848 is in a narrow upper part of the slot 849 and the stud 843 is in the elbow of the slot 842. The latch arm 853 extends downwardly from the left side of a yoke 855 which is pivoted on the shaft 856.

Extending downwardly from the right-hand side of the yoke 855 is an arm 858 having in its lower end portion a forwardly open wide V-shaped notch forming two forwardly diverging cam edges 859 and 860. The yoke 855 and its arms 853 and 858 are urged clockwise by a tension spring 861 connected between a lateral lug on the arm 858 and the spacing strip 824, so that a stud 862, carried by the lower end portion of the link 834 forwardly of the slot therein and normally located in the apex of the V-notch in the arm 858, is engaged by both cam edges 859 and 860.

It should be noted that the pivotal connection between the yoke 827 and the link 834 is normally centered close to a line between the centers of the shaft 767 and of the stud 835 so that the rocking of the pinion frame, in which the yoke 827 is carried, about the shaft 767 to move the pinions into and out of mesh with the actuators 511 and 519 merely rocks the link 834 about the stud 835 through a small angle without significantly raising or lowering the link 834 and stud 862 relative to the stud 835 and arm 858.

*Additive tens-transfers*

In adding, the actuators rotate in the pinions 775 clockwise as previously explained and, if a pinion 775 for any order lower than the highest order is rotated clockwise through the interval between its "9" and "0" positions, so that an additive tens-transfer to the next higher order pinion 775 is required, the long tooth of the lower order pinion 775 will engage and move past the pawl finger 830, lifting the latter and rocking the yoke 827 counterclockwise to the position shown in Fig. 12 and then releasing the finger 830 and permitting the spring 829 to return the yoke 827 and finger 830 to normal. The yoke 827, rocking counterclockwise on the rod 805, lowers the link 834, depressing the stud 862 while taking up the play of the stud 835 in the slot in the link 834 and then rocking the yoke 837 counterclockwise to move the upper end of the arm 840 slightly forward of the stud 848.

As the stud 862 is depressed, it acts on the lower cam edge 860 on the arm 858 and, as the link 834 and stud 862 are guided by the stud 835, the stud 862 cams the arm 858 rearwardly and rocks the yoke 855 to retract the latch 853 from under the lug 854, thereby releasing the yoke 846 for movement clockwise by the spring 852. However, until the pinions 775 are lowered and re-engaged with the transfer segments 850, the clockwise movement of the transfer actuator yoke 846 is limited by engagement of the forward edge of an arm 863 extending downwardly from the left-hand end of the yoke 846 against a bail rod 864 supported in the lower ends of three links 865 (Fig. 8) each secured to a collar pinned to a shaft 866 journaled at its ends in bushings 867 secured in the side plates 762.

The right and left links 865 have rearwardly extending and outwardly bent lugs 868, which, while the pinions are in their upper positions where they are meshed with the actuators, are engaged behind latch shoulders on the forward portions of latch bell cranks 869 (Figs. 12 and 19) secured on hubs rotatably supported on the shaft 838, the end portions of which pass through arcuate slots, formed in the arms 799, and into the end plates 762. The latch bell cranks 869 are urged clockwise to latching position by springs 872 connected between the forward arms of the latch bell cranks and the shaft 856.

While the pinions are upward and meshed with the actuators, the latches permit only a slight forward movement of the bail 864 and the arm 863 which is sufficient to permit the lug 854 on the transfer actuator yoke 846 to move down in front of the latch projection on the latch 853 and prevent the latter from relatching the yoke 846 as the link 834 and yoke 827 are returned to normal by the spring 829 when the long tooth of the pinion 775 releases the pawl finger 830. The initial movement of the yoke 846 moves the stud 843 slightly out of the elbow of the slot 842 and into the forward branch thereof and also moves the stud 848 to the lower end of the narrow upper part of the slot 849 in the transfer segment 850 and into engagement with the rear upper corner of the arm 840 so that the yoke 837 is retained in its set position but the transfer segment 850 is not rocked from its normal position for accurate meshing with the higher order pinion 775 when the latter is again lowered to normal position.

As the cam arms 799 approach the end of their counterclockwise return movement and the pinions 775 have been again meshed with the transfer segments 850, each of the arms 799 engages a stud 873 (Figs. 12 and 13) secured in the upper arm of the respective latch bell crank 869 and rocks the latch counterclockwise to release the arms 865 and bail rod 864 to permit the transfer actuator yoke 846 to be swung by its spring 852 to the limit of its clockwise movement. In the initial portion of such movement of the yoke 846, the stud 848, acting on the rear edge of the director arm 840, cams the latter forwardly toward a stud 874 secured in the transfer segment 850 forwardly of the upper end of the arm 840. Still early in the clockwise movement of the yoke 846, the stud 843 acts upon the lower edge of the forward branch of the slot 842 to continue the counterclockwise movement of the yoke 837 so that the arm 840, acting on the stud 874, rocks the transfer segment 850 forwardly one tooth space and rotates the higher order pinion 775 clockwise one tooth space to add a unit on that pinion.

The additive transfer movement of the segment 850 and the driving movement of the yoke 846 are limited by engagement of the upper forward edge of the segment against the rod 875 (Figs. 8 and 13). The parts remain in such position until, in a following adding, subtracting, total-taking or subtotal-taking operation, the crossfooter pinions are again raised out of mesh with the transfer segments 850 and into mesh with the actuator racks 511 and 519.

Two links 876 (Figs. 12, 13, 15 and 16) are pivoted at their rear ends on studs secured in the two arms 799 respectively. Each link 876 has in its forward portion a longitudinally elongated slot through which the bail rod 864 passes. Each link 876 carries a screw 877 which passes through the forward end of the link just forwardly of the end of the slot in which the rod 864 is located and has a large eccentric head on one side of the link. A nut is threaded on the screw 877 on the other side of the link 876 whereby the screw may be secured in the link with the eccentric head in the desired position of rotary adjustment such that, when the arms 799 have swung clockwise far enough to lift the pinions 775 out of mesh with the transfer segments 850, the heads of the screws 877 swing the bail rod 864 against the arm 863 of the released transfer actuator yoke 846 and, in the remaining part of the clockwise movement of the arms 799, pull the bail rod 864 rearwardly far enough to return the yoke 846 sufficiently past its normal position to permit the shouldered end of the latch 853 to engage under the lug 854 to relatch the yoke 846. In such return movement of the yoke 846, the stud 848 is elevated into the narrow top portion of the slot 849 and thus restores the transfer segment 850 to normal position. The stud 843 also is returned to the elbow of the slot 842 and thus restores the yoke 837 and director arm 840 to normal position.

During the counterclockwise swinging of the bail 864 and links 865, the lugs 868 are carried over and a short distance beyond the latch shoulders on the latch bell cranks 869. As soon as the arms 799 reach the end of their clockwise movement, they are, as will be explained in detail hereinafter, returned a short distance counterclockwise to permit the bail rod 864 and links 865 to move forwardly far enough to engage the lugs 868 against the latch shoulders of the latches 869. The parts are then again in normal condition and ready for another tens-transfer operation. Such restoring of the parts is completed prior to any rotation of the crossfooter pinions by the actuator racks so that a transfer cannot be lost by reason of the transfer pawl finger 830 being rocked and released by the long tooth of the lower order pinion 775 passing it before the bail rod 864 is positioned, as in Fig. 12, to permit the lug 854 of the transfer actuator yoke to move and remain downwardly far enough to prevent relatching by the latch 853.

*Subtractive tens-transfer*

When an amount is subtracted on the crossfooter, the pinions 775, as previously explained, are rotated counterclockwise during the forward movement of the actuator racks. While considering the same single set of tens-transfer parts hereinabove discussed, it will be assumed that the lower order one of the pinions 775 of the same two adjacent orders is rotated subtractively through the interval between its "0" and "9" positions while the pinions are in their elevated positions meshing with the actuator racks so that a subtractive tens-transfer to the higher order pinion 775 should be effected.

The long tooth of the lower order pinion 775, in passing from its positive "0" to its positive "9" position, depresses the pawl finger 830 rocking the yoke 827 to elevate the link 834. The raising of the link 834 first takes up the play of the stud 835 in the slot in the lower end of link 834 and then rocks the yoke 837 clockwise to move the upper end of the director arm 840 rearwardly of the stud 848 as illustrated in Fig. 15. In the upward movement of the link 834 on the stud 835, the stud 862 acts on the upper cam surface 859 of the arm 858 and cams the latter rearwardly, rocking the yoke 855 counterclockwise to withdraw the latch 853 from under the lug 854, thereby permitting the transfer actuator yoke 846 to rock clockwise a short distance until the lower end of the arm 863 presses against the bail rod 864 and lugs 868 press against the shoulders of the latches 869. Such rocking of the yoke 846 lowers the lug 854 sufficiently to prevent relatching of the yoke 846 by the latch 853. The stud 848 moves downwardly to the lower end of the upper narrow portion of the slot 849 and in front of the forward upper corner of the director arm 840 while the stud 843 moves a short distance into the downward branch of the slot 842.

As the long tooth of the lower order pinion 775 moves to its positive "9" position, it releases the pawl finger 830 and permits the spring 829 to return the yoke 827 and link 834 to normal position, but the transfer actuator yoke 846 remains stationary in its unlatched position with its lug 854 blocking restoration of the latch 853. The transfer parts remain in such position until, after the forward movement of the actuator racks has been completed, the arms 799, swinging forwardly, lower the crossfooter pinions toward their normal positions. During their forward movement, the arms 799 engage the stud 873 and, after the pinions 775 have meshed with the transfer segment 850, the latches 869 are rocked sufficiently to release the lugs 868 on the links 865 to free the bail rod 864 for forward movement. At this point, the spring 852 rocks the transfer actuator yoke 846 clockwise. In the initial portion of such movement, the stud 848 acts on the forward edge of the upper end of the director arm 840 to cam the latter toward a stud 878 secured in the transfer segment 850 rearward of the arm 840. After a very small movement, the stud 843 acts on the forward edge of the downward branch of the slot 842 in the arm 841 and continues the clockwise movement of the yoke 837 so that the director arm 840, acting against the stud 878, rocks the transfer segment 850 rearwardly until arrested by engagement against the cross rod 763 when the transfer segment 850 has moved through exactly one tooth space and has rotated the higher order pinion 775 one tooth space counterclockwise, that is, in the subtractive direction, and has thus entered a subtractive tens-transfer on the higher order pinion 775.

The parts remain in such position until, in the next adding, subtracting, total-taking or subtotal-taking operation, the crossfooter pinions are again elevated into mesh with the actuator racks at which time the parts are restored to normal in precisely the same manner as following an additive tens-transfer, except, of course, that the yoke 837 and the transfer segment 850 are returned in the reverse direction to their normal positions.

*Run-through transfers*

Only a single set of tens-transfer parts to effect additive and subtractive tens-transfers from the lower order pinion 775 to the higher order pinion 775 of a single pair of adjacent pinions 775 has been described above. However, a duplicate of such set of tens-transfer parts is provided between each two adjacent pinions 775 so that the number of sets of parts provided for effecting tens-transfer from order to order in the crossfooter is one less than the number of pinions 775, disregarding the "fugitive 1" mechanism, to be described hereinafter, which includes some parts which are the same as, or similar to, parts of the tens-transfer mechanism proper. The tens-transfer mechanism is thus capable of effecting an additive or subtractive tens-transfer to the next higher order from any order where the relation of the added or subtracted digit to the digit previously standing on the pinion 775 for that order requires an additive or a subtractive tens-transfer to the next higher order.

The foregoing discussions of additive and subtractive tens-transfers has mentioned only transfers resulting from rotation of pinions 775 by and during their engagement with the actuator racks. It may, however, occur in adding operations that a pinion 775 standing at its positive "9" position as it is unmeshed from its actuator rack 511 or 519 and remeshed with its transfer segment 850 is rotated from its positive "9" position to its positive "0" position by the transfer segment 850 as a tens-transfer is transmitted to it. In subtracting operations, it may happen that a pinion 775 which stands at its positive "0" position as it is unmeshed from its actuator rack and lowered into mesh with its transfer segment 850, is rotated from its positive "0" position to its positive "9" position by its transfer segment as a subtractive tens-transfer is transmitted to it.

In either case, the long tooth of the pinion 775 so rotated through the interval between its "0" and "9" positions in either direction by its transfer segment 850 after it has meshed with the latter, will act upon the associated transfer pawl finger 830 to rock the yoke 827 and move the link 834 to set the director yoke 837 with its arms 840 and 841 to the proper position and trip the latch 853 to release the transfer actuator yoke 846 to rock the transfer segment 850 meshing with the next higher order pinion 775. Such actions of the parts are just as hereinabove described except that as the latches 869 have already been tripped by the arms 799, the bail rod 864 will not arrest the transfer actuator yokes 846 in the initial transfer position as previously described, but will permit them immediately to complete their full movement and immediately rock the associated transfer segment 850 to immediately enter an additive or a subtractive tens-transfer as required upon the pinion 775 on the next higher order. In this manner, whenever required, tens-transfers may be effected progressively from order to order through as many orders as required.

It will be apparent that when "1" is subtracted on the crossfooter at a time when the crossfooter pinions stand in the positions in which they were left by a positive total-taking operation (that is, with all of the pinions 775 in their positive "0" positions), the units order pinion 775, rotating from its positive "0" to its positive "9" position, will rock the associated transfer pawl finger 830 downwardly to set up an initial transfer condition in the set of transfer parts controlling the transfer segment 850 for the tens order pinion 775 while the pinions 775 remain meshed with the actuator racks. Then, when the pinions 775 are lowered and remeshed with their transfer segments 850, the tens order pinion will be rotated from its positive "0" position to its positive "9" position by its transfer segment 850 and will act upon the associated transfer pawl finger 830 to cause, immediately, a full subtractive tens-transfer operation of the next higher order set of transfer parts whereby the hundreds order pinion 775 will be rotated by its transfer segment from its positive "0" to its positive "9" position. The same action will be repeated from order to order all the way to the highest order and all of the pinions 775 from the tens order to the highest order will be successively rotated by their transfer segments 850 from their positive "0" to their positive "9" positions.

Similarly, when "1" is added in the units order at a time when the crossfooter pinions stand in the position in which they were left by a negative total-taking operation, that is, when the pinions 775 stand in their negative "0" or positive "9" positions, a run-through additive carry from order to order to the highest order will similarly be effected, excepting that the pinions will be rotated in the subtractive direction.

"FUGITIVE 1" MECHANSIM

The long tooth of the highest order pinion 775 (Figs. 18, 19 and 21) cooperates with a "fugitive 1" pawl finger 830 of a yoke 827 which is identical with the previously described yokes 827 and is supported on the rod 805 between the last two partition plates 817 at the left side of the crossfooter. This last-mentioned "fugitive 1" yoke 827 is also biased to normal position by a spring 829 like the other springs 829 and similarly arranged. However, the stud 832 on the extension 831 of the "fugitive 1" yoke 827 pivotally supports the upper yoke-formed end of a short link 885 which extends downwardly on the left side of the last partition plate 821 at the left side of the crossfooter. The lower end of the link 885 pivotally embraces a stud secured in the rear end of an arm 886 which is secured to a hub pinned to a shaft 887 which passes through and is supported in all of the partition plates 821.

At the left side of the rightmost partition plate 821, a hub pinned on the shaft 887 is secured to an arm 888 which, at its rear end, pivotally connects with a link 889. The link 889 has in its lower portion a slot receiving the stud 835 secured in the right-hand side arm of a "fugitive 1" director yoke 837 which is in all respects like the previously described yokes 837. The lower portion of the link 889 forwardly of the stud 835 also carries a stud 862 which cooperates with cam edges 859 and 860 of the right-hand arm 858 of a "fugitive 1" latch yoke 855 which is in all respects like the previously described latch yokes 855. The latch arm 853 at the left-hand end of the "fugitive 1" latch yoke 855 cooperates with a lug 854 on a "fugitive 1" actuator yoke 890 (Fig. 21) which is like the previously described yokes 846 except that the yoke portion thereof is somewhat differently arranged and proportioned so that the right-hand side portion thereof is rockably mounted on the shaft 847 rightwardly of and close to the rightmost partition plate 821 and has a rearwardly extending arm 891. On the rearward end of the arm 891 is a leftwardly turned lug 892 which is of a shallow inverted V-shaped fore-and-aft vertical cross section and is positioned between the upper arms of a pair of latch members 893 and 894 secured to hubs rotatable on the shaft 838. A tension spring 895, connected between downward arms of the latch members 893 and 894, urges the upper arms of the latch members toward the lug 892 and toward each other.

A stud 896 extends rightwardly from the arm 888 and between forward arms of the latches 893 and 894, the latter arms being also urged toward each other and toward the stud 896 by the spring 895. While the "fugitive 1" actuator yoke 890 is in its normal latched position, the lower front and rear edges of the lug 892 are located slightly higher than the upper edges of latch shoulders formed on the adjacent sides of the upper arms of the two latch members 893 and 894.

The lowest order pinion 775 normally meshes with the "fugitive 1" segment 897 which is like the previously described transfer segments 850 except that the right side of its yoke portion has an upwardly extending arm 898 having in its upper end a stud 899 extending rightwardly through a forwardly and rearwardly elongated slot in a link 900 which is normally freely slidable forwardly and rearwardly on the stud 899 but laterally confined thereon between the arm 898 and a spring clip (not shown) engaged in an annular groove in the stud on the right-hand side of the link 900. The link 900 has on its front upper portion a lug 901 extending rightwardly between the upper ends of the upper arms of the latch members 893 and 894 above the lug 892.

The rearward end of the link 900 is pivotally connected with a downward arm on the left end of a yoke 902 pivoted on the inward portion of a stud 903 passing through and secured to the right side main frame plate 27. The yoke 902 has at its right-hand end a forward arm carrying a stud 904 extending through the plate 27 and engaged in a notch is a forward portion of a slide 905 slidable vertically on a reduced end portion of a stud 906 and on a stud 907. The slide 905 is retained on the studs 906 and 907 by headed screws threaded into the latter which are in turn secured in the side plate 27. The slide 905 carries a leftwardly projecting stud 908 which is engaged by a forwardly pointed bluntly V-shaped nose of a detent pawl 909 pivoted on the stud 907 (Fig. 27) between the slide 905 and the frame plate 27. A spring 910 connected between a rearward arm of the pawl 909 and the outward portion of the stud 903 urges the V-nose of the pawl against the stud 908.

The stud 896 is normally in a middle position such that it does not block either of the latch members 893 and 894 from positioning its latch shoulder under the lug 892. However, because of the action of the detent pawl 909 on the stud 908, the lug 901 is normally yieldingly held at one or the other of its forward and rearward limits so that it holds either the latch member 894 or the latch member 893 from positioning its latch shoulder under the lug 892.

As is well understood by those skilled in this art, each time the sign of the total obtained in an adding and subtracting totalizer mechanism changes from positive to negative, the highest order registered pinion moves in the subtracting direction through the interval between its positive "0" and positive "9" position, and every time the sign of the total changes from negative to positive, the highest order pinion moves in the adding direction through the interval between its positive "9" and positive "0" positions.

As the highest order pinion 775 rotates in the subtractive direction through the interval between its positive "0" and positive "9" positions, the long tooth thereof engages and depresses "fugitive 1" pawl finger 830 cooperating therewith thereby elevating the link 885 and rocking the arm 886, shaft 887 and arm 888 counterclockwise thereby elevating both the "fugitive 1" stud 862 and the stud 896. The rising link 889 also acts upon the stud 835 of the "fugitive 1" yoke 837 and positions the latter in the same manner that the other yokes 837 are positioned for subtractive tens-transfers.

The upwardly moving stud 862 rocks the "fugitive 1" latch 853 to release the lug 854 of the "fugitive 1" actuator yoke 890 for the "fugitive 1" segment 897 and the upwardly moving stud 896 rocks the latch member 893 clockwise, moving its shoulder rearwardly clear of the lug 892. At this time, because of the crossfooter having previously contained a positive total, the lug 901 is in its forward position holding the latch member 894 forwardly with its latch shoulder clear of the lug 892 so that the yoke 890 is then free to be moved clockwise by its spring 852, at least sufficiently to prevent relatching thereof by either the latch 853 or the latch 894. The yoke 890 is controlled by the bail 864 in the same manner as are the yokes 846.

With the "fugitive 1" director yoke 837 in the subtractive position as above-mentioned, the studs 848 and 843 of the "fugitive 1" actuator 890, when they move downwardly, will rock rearwardly the "fugitive 1" segment 897 meshing with the lowest order pinion 775, whereby the latter is rotated one tooth space in the subtractive direction, thereby correcting the "fugitive 1" error which would otherwise be present in the negative total contained in the crossfooter. The arm 898 rocking rearwardly with the "fugitive 1" segment 897 moves the link 900 rearwardly, thereby depressing the stud 904 and the slide 905 which moves the stud 903 downwardly past the V-nose of the detent pawl 909 which thereafter yieldingly holds the slide 905 in its lowermost position and the link 900 in its rearward position where the lug 901 engages and holds the latch member 893 rearwardly with its latch shoulder clear of the lug 892.

The "fugitive 1" actuator yoke 890 and segment 897 for the units order pinion 775 are restored by the bail rod 864 in the same manner and at the same time the latter restores the transfer actuator yokes 846 and transfer segments 850. As the "fugitive 1" actuator yoke 890 is restored to normal, the lug 892 is elevated to its normal position and permits the latch shoulder on the latch member 894 to move to latching position under it.

If, before the highest order pinion 775 is rotated in the adding direction through the interval between its positive "9" and positive "0" positions, it should again be rotated in the subtractive direction through the interval between its "0" and "9" positions in consequence of accumulation of a negative total greater than the capacity of the crossfooter, the long tooth of the highest order pinion 775 will again depress the pawl finger 830 cooperating therewith and again elevate the link 885, rotate the arm 886, shaft 887 and arm 888 counterclockwise and again elevate the stud 896, link 889 and stud 862. The rising link 889 will again set the director yoke 837 for the "fugitive 1" segment 897 in subtractive position and the rising stud 862 will again rock the latch 853 to release the lug 854. However, the rising stud 896 will not release the lug 892 because the latch 893 is already held in its rearward position by the lug 901, but the latch shoulder of the latch member 894 is under the lug 892 to prevent an erroneous entry of a subtractive "fugitive 1" correction into the crossfooter when the sign of the total contained therein has not changed.

If there is now added into the crossfooter an amount greater than the negative total contained therein so that the sign of the total in the crossfooter is changed, the long tooth of the highest order pinion 775, moving in the adding direction, will engage and elevate the pawl finger 830 cooperating therewith, thereby depressing the link 885, rocking the arm 886, shaft 887 and arm 888 clockwise and depressing the link 889, stud 862 and stud 896. The downwardly moving link 889 acts on the stud 835 of the "fugitive 1" director yoke 837 to position the latter in the additive position. The downwardly moving stud 862 rocks the "fugitive 1" latch 853 to release the lug 854 of the "fugitive 1" actuator yoke 890 and the downwardly moving stud 896 engages the forward arm of the latch member 894 rocking the latter counterclockwise and moving its latch shoulder forwardly clear of the lug 892. When the yoke 890 moves clockwise, the downwardly moving studs 848 and 843 rock the "fugitive 1" segment 897 forwardly to rotate the lowest order pinion 775 one tooth space in the adding direction to thereby correct the "fugitive 1" error which otherwise would be present in the positive total contained in the crossfooter.

As the "fugitive 1" segment 897 rocks forwardly, the arm 898 pulls the link 900 forwardly, thereby elevating the stud 904 and the slide 905 which moves its stud 903 upwardly across the V-nose of the detent pawl 909 which thereafter yieldingly holds the stud 903 and the slide 905 in their upper positive total positions. The lug 901 on the link 900 moving forwardly engages the upper end of the latch member 894 and, until the total in the crossfooter again becomes negative, holds the latch member 894 forwardly with its latch shoulder clear of the lug 892. However, as the "fugitive 1" actuator yoke 890 and segment 897 are restored to normal as previously mentioned, the lug 892 is again moved upwardly to its normal position and the latch shoulder on the latch member 893, now no longer engaged by the lug 901, moves under the lug 892.

If further additions in the crossfooter result in the accumulation of a positive total exceeding the capacity of the crossfooter, the highest order pinion 775 will again move in the adding direction through the interval between its "9" and "0" positions, again elevating the link 889, the "fugitive 1" pawl finger 830 and depressing the link 889, stud 862 and stud 896. However, the downwardly moving stud 896 will not act upon the latch member 893 which now holds the lug 892 of the "fugitive 1" actuator yoke 890 elevated so that a "fugitive 1" correction will not erroneously be entered into the crossfooter when the sign of the total therein is not changed.

It will be seen that the above-described "fugitive 1" mechanism is effective to enter a "fugitive 1" correction into the crossfooter each time the sign of the total accumulated therein changes from positive to negative or from negative to positive, the additive or subtractive character of the correction being controlled and determined solely by the direction of movement of the long tooth on the highest order pinion as it acts upon the "fugitive 1" pawl finger 830. It will also be seen that the "fugitive 1" mechanism has provisions which prevent the erroneous entry of a "fugitive 1" correction into the crossfooter at any time, as when the capacity of the crossfooter is exceeded.

It will further be noted that the parts designated 900 to 908, inclusive, are automatically moved from one to the other of two positions upon each change of sign of the total in the crossfooter and that the slide 905 always occupies its upper position when the crossfooter contains a positive total and always occupies its lower position when the crossfooter contains a negative total. Such positioning of the slide 905 in accordance with the sign of the total contained in the crossfooter is utilized for an automatic control which will be described fully hereinafter.

*Normal adding operation—front crossfooter*

A stud 912 is eccentrically adjustably mounted in the upper end of an arm 911 secured on a hub pinned on the rightward end of the shaft 800, rightward of the right side frame plate 27. The stud 912 pivotally supports a connecting link 913 having two rearward arms, the lower one of which is offset rightwardly and formed with a notch in the rearward portion of its upper edge, and the upper one of which is offset leftwardly and formed with a notch in the rearward portion of its lower edge. A tension spring 914 is connected between a forward projection of the link 913 and a stud secured in a forward projection of the arm 911 and urges the link 913 counterclockwise so as normally to connect its lower notched arm to a stud 916 secured in a slide 444 slidably mounted on studs 445, 446 and 447 secured in the plate 27. The slide 444 carries a stud 448 engaged in a notch in a lower arm of a three-armed lever 449 pivoted on a stud 450 secured in the plate 27. Upper and forward arms of the lever 449 carry rollers 451 and 453, respectively, which bear on the edges of cam disks 452 and 454, respectively, both secured on the shaft 126. The cam disks are complementarily shaped so that the slide is stationary in its normal position during about the first 138° of each machine cycle, is then moved rearwardly until at about the 193° point of the cycle, it reaches its rearmost position where it remains until about the 200° point. During the next five degrees of the machine cycle the cam disks rapidly move the slide 444 a short distance forwardly to a partially returned position and later, from about the 270° point to about the 288° point, complete the return of the slide 444 forwardly to normal position.

In any machine cycle in which the link 913 is in its normal position, the slide 444 will rock the arm 911, shaft 800 and cam arms 799 clockwise to elevate the pinion frame and mesh the pinions 775 with the actuator racks 511 and 519 after the actuator racks have completed their movements forwardly to differential positions and before they commence their return movements rearwardly to their normal "0" positions. The final portion of the clockwise rocking of the shaft 800 and arms 799, after the meshing of the pinions 775 with the actuator racks has been completed, the bail rod 864 is carried forwardly of its initial transfer position to reset previously tripped transfer mechanism parts as previously described. Then, as the slide 444 is moved a short distance rearwardly before the actuator racks commence their return movement from their differential positions toward their normal "0" positions, the bail rod 864 is being moved past its initial transfer position to its full restoring position and forwardly again to its initial transfer position, the rollers 773 are in the forward dwell portions of the cam slots in the arms 799 and the pinion frame remains stationary in its elevated position. The pinions 775 remain meshed with actuator racks while the latter return to their normal "0" positions so that the amount corresponding to the differential positions to which the actuator racks were moved prior to the meshing of the pinions 775 therewith is entered additively on the pinions. After the actuator racks are restored to "0," the completion of the return of the slide 444, arm 911, shaft 800 and cam arms 799 to normal position lowers the pinion frame to unmesh the pinions 775 from the actuator racks and then releases the bail rod 864 for movement to full transfer position.

*Rear crossfooter*

The rear crossfooter has the same construction as the above described front crossfooter and parts identical in structure and operation with those described above for the front crossfooter are provided to produce the normal adding operation of the rear crossfooter.

MANUAL TOTALIZER FUNCTION CONTROLS

Function control keys 315, 316, 317, 318, 320, 321, 322, 323, 324 and 326 operate control means to cause the crossfooters to perform calculating functions other than addition or to be non-added. Depression of any of the total, subtotal, or subtract keys 315, 316, 318, 321, 322 and 324 will initiate a cycle of operation of the machine in the manner disclosed in detail in my applications Serial Nos. 174,696 and 196,844.

*Subtraction—front crossfooter*

The lower end of the stem of the front crossfooter subtract bar 324 is immediately above the forward arm 917 of a bell crank 917, 918 (Figs. 2, 25 and 27) having a yoke portion rockably supported on a stud 377 secured in the frame plate 27. The downward arm 918 of the bell crank carries a stud rotatably secured in a link 919, the forward end of which is pivotally connected with the upper arm 920 of a bell crank 920, 921 having a yoke portion rockably mounted on a long stud 922 extending rightwardly from and secured in the frame plate 27. The rearwardly extending arm 921 of the bell crank, 920, 921 has a slightly downwardly turned rear end portion immediately above and in vertical alignment with the rear end portion of the upper rear arm of the link 913.

When the subtract bar 324 is depressed, the arm 917 is depressed, the arm 918, link 919 and arm 920 are swung rearwardly and the arm 921 is depressed to lower the rearward arms of the link 913 to disengage the lower arm from the stud 916 and connect the notched rear end of the upper arm of the link 913 to a stud 923 (Fig. 27) secured in a downward projection of a slide 924. The slide 924 is supported for forward and rearward movement on the studs 445, 446 and 447 which extend through forwardly and rearwardly elongated slots in the slide 924. The slide 924 carries a stud 925 (Fig. 25) engaged in the slotted end of the lower arm of a three-armed lever 926 rockably supported on the stud 450. The lever 926 has two forwardly and upwardly extending arms which carry roller studs 927 and 928 bearing respectively on the peripheries of cam disks 929 and 930 secured to collars pinned on the shaft 126.

Figure 2:
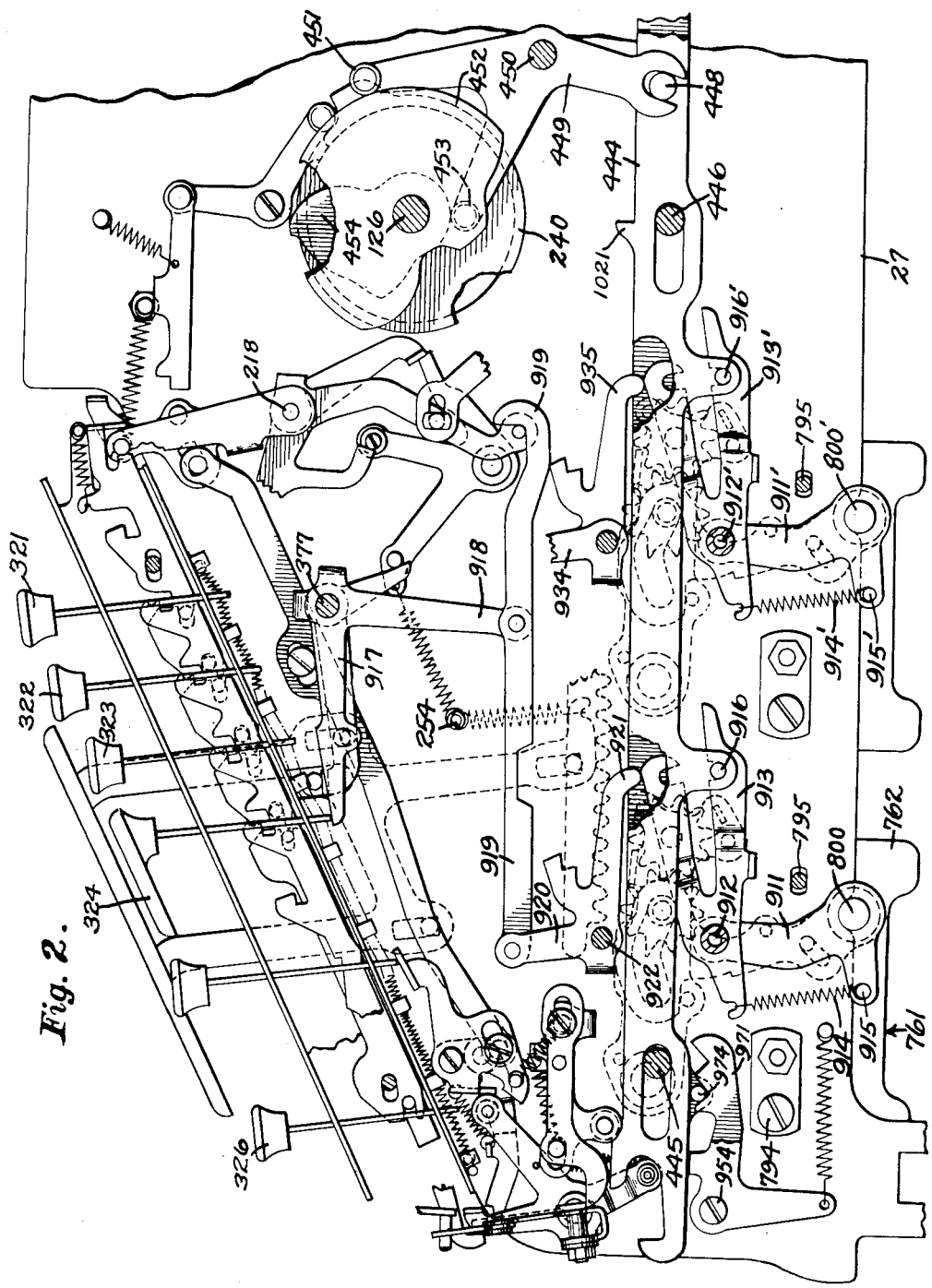
Fig. 2 is a partial right side elevation of the machine with certain parts removed to show more clearly certain totalizer function control means.

As shown in Figs. 2 and 25, the cams 929 and 930 have shapes like those of the cams 452 and 454, respectively, but the cam 929 is to the left of the cam 930 and both cams 929 and 930 are advanced about the shaft 126 about 107° clockwise relative to the cams 452 and 454, respectively. Thus the movements of the slide 924 are like the movements of the slide 444 but are about 107° ahead of the latter. Thus, in a machine cycle in which the subtract bar 324 is depressed so that the connecting link 913 is connected to the slide 926, the front crossfooter pinions 775 are engaged with the actuators 511 and 519 before the actuators commence to move forwardly, remain meshed with the actuators until after the forward movements of the latter are completed and are then unmeshed from the actuators and lowered to normal position in mesh with the transfer segments 850 before the actuators 511 and 519 commence their rearward return movements, whereby the amount corresponding to the differential positions to which the actuators move forwardly is substracted in the front crossfooter.

While the connecting link 913 is in its lowered position with its upper rearward arm connectd to the stud 923, the upper edge of its upper arm is parallel to the line of motion of the slide 924 so that the arm 921, being held in depressed position by the latched down subtract bar 324, holds the connecting link 913 connected with the stud 923 throughout the rearward and forward movements of the slide 924. When the subtract bar 324 is unlatched and restored to normal, the spring 914 restores the connecting link 913, the bell crank 920, 921, the link 919 and the bell crank 917, 918 to normal.

*Subtraction—rear crossfooter*

The lower end of the stem of the rear crossfooter subtract bar 318 (Figs. 28 and 29) is immediately above the forward arm 931 of a bell crank 931, 932 having a small yoke portion rockably supported on the rightward end portion of the stud 377. The downward arm 932 of the bell crank carries a stud rotatably secured in a link 933 having an upwardly and downwardly elongated slot receiving a stud secured in an upward arm 934 on the right-hand side of a small yoke which has a rearward arm 935 on its left side and is rockably mounted on a long stud 936 extending rightwardly from and secured in the frame plate 27. The rearward arm 935 has a slightly downwardly turned rear end portion immediately above and in vertical alignment with the rear end portion of the upper rear arm of the link 913'. When the subtract bar 318 is depressed, the arm 931 is depressed, the arm 932, link 933 and arm 934 are swung rearwardly and the arm 935 is depressed to lower the rearward arms of the link 913' to disengage the lower arm from the stud 916' and connect the notched rear end of the upper arm of the link to a stud 937 (Fig. 25) secured in a downward projection of the slide 924. Thus, in a machine cycle performed while the rear crossfooter subtract bar 318 is depressed, the rear crossfooter is operated in the same manner as the front crossfooter is operated in a machine cycle performed while the subtract bar 324 is depressed.

The parts 931 to 935 and 913' are returned to normal by the spring 914' when the subtract bar 318 is unlatched and restored.

*Subtraction—both crossfooters*

If both subtract bars are depressed simultaneously, the machine will perform a cycle of operation in which an amount set on the keyboard will be subtracted from both the front and rear crossfooter.

*Non-adding—front crossfooter*

When the front crossfooter non-add key 323 (Fig. 27) is depressed, the lower end of its stem engages and depresses the arm 917 but only about half as far as that arm is depressed by depression of the subtract bar 324. Such depression of the arm 917 by the non-add key 323 effects, through the above-described connections 918 to 921, a clockwise rocking of the connecting link 913 sufficient to disconnect the lower arm of the latter from the stud 916 but insufficient to connect the upper arm of the link 913 to the stud 923. With the parts so positioned as the macine is given a cycle of operation, the movements of the slides 444 and 924 are without effect on the front crossfooter which remains idle during such machine cycle. The parts 917 to 921 are again restored by the spring 914 upon release and restoration of the key 323.

*Non-adding—rear crossfooter*

When the rear crossfooter non-add key 317 (Fig. 28) is depressed, the lower end of its stem engages and depresses the arm 931 but only about half as far as that arm is depressed by depression of the subtract bar 318. Such depression of the arm 931 by the non-add key 317 effects, through the above-described connections 931 to 935, a clockwise rocking of the connecting link 913' sufficient to disconnect the lower arm of the latter from the stud 916' but insufficient to connect the upper arm of the link 913' to the stud 937. With the parts so positioned as the machine is given a cycle of operation, the movements of the slides 444 and 924 are without effect on the rear crossfooter which remains idle during such machine cycle. The parts 931 to 935 are again returned to normal by the spring 914' upon release and restoration of the key 317.

*Total-taking—front crossfooter*

The lower end of the stem of the front crossfooter total key 321 is located above the forward end of a forward arm of a lever 391 (Figs. 24 and 27) having a small yoke portion pivotally supported on a shaft 218 supported in the machine frame plates 27 and 28. The lever 391 has a downward arm 938 carrying, in its lower end, a stud 939 located in front of a hook on the rear end of the link 919. When the key 321 is depressed, it rocks the lever 391, 938 so that the stud 939 pulls the link 919 rearwardly sufficiently to disconnect the lower arm of the link 913 from the stud 916 and connect the upper arm of the link 913 to the stud 923 so that, during the machine cycle, the front crossfooter pinions will mesh with and unmesh from the actuator racks 511 and 519 in the same manner and at the same times as though the subtract bar 324 were depressed.

For taking a positive total from the front crossfooter, it is necessary to rock the blade 803 (Fig. 12) rearwardly to place its upper edge in the path of the long teeth of the pinions 775 to stop the pinions in their positive "0" positions. For that purpose, the arm 938, when it moves rearwardly, engages and moves rearwardly a stud 940 secured in and extending rightwardly from the rear end of a link 941 guided in the lower portion of an annular groove formed in a stud 942 secured in the frame plate 27. A branch of the link 941 extends upwardly behind the stud 942 and then forwardly parallel to the main portion of the link and through the upper portion of the groove in the stud 942 to keep the link engaged in the groove in the stud. The forward end of the link 941 is pivotally connected by a stud 943 to an upper arm 944 on the left side of a yoke 945 which is rockably mounted on the stud 922. A tension spring 946 connected between the link 941 and a rearward arm 978, described hereinafter, on the left side of the yoke 942 urges the latter counterclockwise and the link 941 forward to yieldingly hold the stud 940 normally engaged against the rear edge of the arm 938.

Rearward movement of the link 941 by depression of the front crossfooter total key 321 rocks the yoke 944 clockwise against the tension of the spring 946 so that the lower end edge of a downward finger 947 on the left side of the yoke moves to a position directly above and engages the stud 814 (Figs. 26 and 19) to prevent it from moving upward as the crossfooter pinion frame carrying the shaft 802 is elevated early in the total-taking machine cycle to engage the pinions with the actuator racks 511 and 519. Thus the shaft 802 is rocked clockwise as the pinions are elevated toward the actuator racks, and the upper edge of the blade 803 is placed in the path of the long teeth of the pinions 775.

It has been explained that, in amount entering cycles, the stop bars 483 for all of the amount key-rows 1 to 11 move rearwardly, those for key-rows in which no key is in depressed position moving farthest and rocking the connected stop sector 491 (Fig. 3) far enough to place the "0" (rearmost) stop shoulder of the latter in position to prevent forward movement of the associated actuator racks 511. In total-taking, the actuator racks, while the crossfooter pinions are in mesh with them, must be free to move forwardly to the full extent necessary to run the total out of the pinions and it is, therefore, necessary to hold the stop slides 483 and stop sectors 491 for the amount key-rows 1 to 11 in their normal positions. It is also necessary to free the actuator rack 519 of order 12 from the previously-mentioned stop 521.

For those purposes, the stud 943 (Fig. 27) extends through the rear end of a slot in a link 948 (Figs. 24–28) urged forwardly by a tension spring 949 (Figs. 25, 26 and 28) connected between a lug on the rear end of the link 948 and a yoke member 2155 (described hereinafter). The rearward end of the link 948 is guided on a stud 993 (Fig. 28) described hereinafter, projecting through a forwardly elongated slot in the rear end of the link. In its forward end, the link 948 has a vertically elongated slot embracing a stud 950 carried in a link 951, the lower end of which is pivotally mounted on a stud 952 (Figs. 24 and 25) carried by the rearward arm of a yoke 953 pivotally supported on a stud 954 secured in the side plate 27.

The lower end of a spring 415 is connected to the rearward arm of the yoke 953 to urge the latter counterclockwise and the link 951 upwardly so as normally to maintain a roller 955, which is rotatably carried by the stud 952, in engagement with the lower edge of the forward end of a slide 956 which is supported for forward and rearwardly sliding movement on the studs 445, 446 and 447 which pass through slots in the slide. The slide 956 carries a stud 957 (Fig. 24) engaged in the slotted lower end of a downward arm of a three-armed yoke 958 rockably mounted on a stud 595 secured in the plate 27. The yoke has upper and lower forward arms 959 and 960 positioned to cooperate respectively with a roller stud 961 carried on the right-hand face of a cam disk 240 secured on a hub pinned on the shaft 126 and with a roller 962 carried on the left face of the cam disk 929, whereby, in each machine cycle, the slide 956 is moved forwardly between about the 30° and 45° points and is returned rearwardly between about the 342° and 354° points of the cycle.

The upper portion of the link 951 has a leftwardly turned lug 963 which, when the link 948 is rearwardly in its total-taking and subtotal-taking position, is positioned above a stud 964 (Figs. 24 and 35) extending rightwardly through an aperture in the frame plate 27 from a forward extension of the right-hand side arm of a bail 965 (Figs. 25 and 3) the right and left side arms of which carry studs 966 journaled in the side plates 27 and 28. A tension spring 967 (Fig. 25) connected at its lower end in an eye in the forward end of the right side arm of the bail 965 and at its upper end to a stud 414 secured in the plate 27, normally holds the bail in a clockwise position where the stud 964 limits against the upper edge of the slot in the frame plate 27. At the rear ends of the side arms, the bail 965 has a cross piece which carries the stop member 521 and has the previously mentioned upturned rear edge 968 normally positioned just below and rearward of projections 969 on each of the stop slides 483.

As the shaft 126 rotates clockwise from the normal position shown in Fig. 24, in the machine cycle initiated by depresssion of the total key 321, the stud 961 engages the arm 959, rocking the yoke 958 clockwise and moving the slide 956 forwardly to the position of Fig. 25 so that a cam portion 970 of the lower edge of the latter moves over and depresses the roller 955 to lower the link 951 which in turn depresses the stud 964 to raise the stop 521 above the stud 520 on the actuator rack 519 for the order 12 and raise the upturned rear edge 968 of the bail 965 in back of the projections 969 prior to the 22° point in the machine cycle whereby the stop slides 483 are prevented from moving rearwardly during that machine cycle. Consequently, the stop sectors 491 are held in their normal positions during that machine cycle and the actuator racks 511 and 519 are permitted to move as far forwardly as required for and permitted by the rotation of the crossfooter pinions to their "0" positions.

Through the gear trains previously mentioned, the type bars 562 for the orders 1 to 12 are moved to place at the printing line the type corresponding to the total thus taken from the crossfooter pinions by the actuator racks 511 and 519.

Near the end of the rotation of the shaft 126, the stud 962 engages the arm 960 rocking the yoke 958 counterclockwise and returning the slide 956 rearwardly and permitting the bail 965 to be returned to its normal position by the spring 967. The link 948 is returned forwardly to normal by the spring 949 when the total key 321 is released and restored to normal whereby the link 951 is also fully restored to normal position.

A detent bell crank 971 pivotally mounted on the stud 954 has a lower arm connected with the front end of a spring 972 which has its rear end connected to a stud 973 secured in the side plate 27, and urges the detent counterclockwise. A rearward arm of the detent 971 has in its upper edge two notches which have an inverted V-shaped projection between them to cooperate with a stud 974 secured in the slide 956 to yieldingly maintain the slide alternately in its forward and rearward positions to which it is moved by the studs 961 and 962.

If, when the total key 321 is depressed, the total contained in the front crossfooter is a positive total, the pinions 774 and 775 remain in their normal positions within the pinion frame 766, 767, 769-772 so that the pinions 775 are meshed with the actuator racks 511 and 519 which, as they move forward, rotate the pinions 775 counterclockwise unless or until the pinions are stopped in their positive "0" positions by engagement of the long teeth of the pinions 775 against the upper edge of the zeroizing blade 803. Thus the actuator racks withdraw from the pinions the positive total previously accumulated on them and index the printing type bars 562 to print that positive total.

If, however, when the total key 321 is depressed, the total standing on the front crossfooter pinions is negative, the pinions must be shifted in the pinion frame before the pinions are elevated so that the pinions 774 and not the pinions 775 will mesh with the actuator racks 511 and 519. For that purpose a pawl 975 (Figs. 27 and 29), having a leftwardly projecting stud 976 secured in its upper forward portion, is pivotally mounted at its rear end on a stud secured in the slide 956. A light tension spring 977 is connected at its upper end to a lug on the pawl and at its lower end to a stud secured in the slide 956, and, assisted by gravity, normally maintains the stud 976 in contact against the upper edge of a rearwardly extending arm 978 on the left side of the yoke 945, whereby the forward portion of the pawl is normally held in an upper inactive position. When the total key 321 is depressed, the yoke 945 is rocked clockwise, as described above, so that the arm 978 is moved downward sufficiently that it will not prevent the forward end of the pawl 975 from moving downward to active position. However, the stud 976 is also located above the upper forwardly extending portion of the slide 905 which, being in its upper position at all times while the front crossfooter contains a positive total, holds the forward portion of the pawl 975 upward in inactive position when the total key 321 is depressed while a positive total is in the front crossfooter.

When the front crossfooter accumulates a negative total, the slide 905 is lowered as previously described, so that, if the total key 321 is depressed while a negative total stands in the front crossfooter, the pawl 975 is permitted to drop to engage a forward projection thereof upon a stud 979, one end of which is received in a forwardly and rearwardly elongated slot in the slide 956 and the other end of which is secured in the right-hand arm 980 of a yoke 981 which is pivotally mounted on the stud 795. A shoulder 982 of the pawl 975 is then immediately behind the stud 979.

The stud 979 is normally engaged by the edge of the slide 956 at the forward end of the slot through which the stud passes, the slot being of such length that, while the pawl 975 is in its normal upper position, the forward and rearward reciprocation of the slide 956 is without effect on the stud 979 and arm 980. When the pawl 975 is in its lowered position as the slide 956 moves forwardly, the shoulder 982 of the pawl 975 moves the stud 979 forwardly with the slide 956 and rocks the arm 980 counterclockwise. The forked upper end of the arm 980 straddles the right-hand end of the lever 788 and rocks the latter clockwise to shift the pinion 775 leftwardly out of and the pinions 774 rightwardly into the planes of the actuator racks 511 and 519, as hereinabove described, before the pinions are elevated toward the actuator racks.

Thus, during the machine cycle initiated by depression of the key 321 while a negative total is contained in the front crossfooter, the actuator racks 511 and 519 will mesh with the pinions 774 and rotate the latter counterclockwise and the pinions 775 clockwise unless and until they are stopped in their negative "0" (positive "9") positions by engagement of the long teeth of the pinions 774 against the ends of the teeth 816 of the strip 770. Thus, the actuators 511 and 519 withdraw the true negative total from the crossfooter pinions and correspondingly index the type bars 562 for printing the actual negative total.

When the slide 956 returns rearwardly to normal position, it returns the stud 979 and the arm 980 clockwise and the lever 788 counterclockwise to normal, thereby shifting the pinions 774 leftwardly and the pinions 775 rightwardly to their normal positions. When the total key 321 is restored to normal, the parts 917, 918, 920, 921 and 913 are restored by the spring 914 and the parts 945, 951, 948, 941, 938 and 391 are restored by the spring 949.

Negative totals are printed in red as disclosed in detail in my prior application Serial No. 174,696.

Total-taking—rear crossfooter

The lower end of the stem of the rear crossfooter total key 315 is located above the forward arm of a yoke member 389 (Figs. 25 and 28) pivotally supported on the rightward end portion of the shaft 218. The yoke member 389 has a rear downward arm 984 carrying, in its lower end, a stud 985 engaging in a forwardly and rearwardly elongated slot in the rear end of the link 933, and normally in the rear end of the slot. When the yoke 389 is rocked by depression of the total key 315, the stud 985 pulls the link 933 rearwardly sufficiently to disconnect the lower arm of the link 913' from the stud 916' and to connect the upper arm of that link to the stud 937 so that, during the machine cycle, the rear crossfooter pinions will mesh with and unmesh from the actuator racks 511 and 519 in the same manner and at the same times as though the subtract bar 318 were depressed.

The arm 984, when it moves rearwardly, engages and moves rearwardly a stud 986 secured in and extending leftwardly from the rear end of a link 987, the rear end of which is supported by the stud 985 passing through and normally positioned in the rear end of a forwardly and rearwardly elongated slot in the link, the forward end of which is pivoted on a stud 988 secured in an upward arm on the right-hand side of a yoke 989 pivotally mounted on the stud 936. A tension spring 990 connected between the stud 986 and a stud 991 in the arm 932 normally yieldingly holds the stud 986 in engagement with the rear edge of the arm 984 and thus normally holds the yoke 989 in its counterclockwise normal position. The effect of the spring 990 on the arm 932 is approximately counterbalanced by a tension spring 2159 referred to later. The transverse portion of the yoke 989 is secured to a forward arm of a bell crank 992 also pivotally mounted on the stud 936 and having an upward arm carrying the previously mentioned stud 993 engaging in a forwardly and rearwardly elongated slot in the rear end of the link 948, the stud 993 being normally in the rear end of the slot.

The rearward movement of the link 987, by depression of the rear crossfooter total key 315, rocks the yoke 989 clockwise so that the lower end edge of a downward finger 994 on the left side of the yoke moves to a position directly above and engages the stud 814' to prevent it from moving upward as the rear crossfooter pinion frame is elevated in the total-taking machine cycle to engage the rear crossfooter pinions with the actuator racks 511 and 519. Thus, as the rear crossfooter pinions are elevated toward the actuator racks, the upper edge of the zeroizing blade 803' (corresponding to the blade 803 of Fig. 19) is placed in the path of the long teeth of the pinions 775'.

The yoke 989, rocking clockwise when the total key 315 is depressed, also pulls the link 948 rearwardly which, as previously described, conditions the link 951 to rock the bail 965 to block the stop sectors 491 and permit the actuators 511 and 519 to move as far forwardly as permitted by the rotation of the rear crossfooter pinions to "0."

If, when the total key 315 is depressed, the total contained in the rear crossfooter is a positive total, the pinions 774' and 775' remain in their normal positions within the pinion frame so that the pinions 775' are meshed with the actuator racks 511 and 519 which, as they move forward, rotate the pinions 775' counterclockwise unless and until the pinions are stopped in their positive "0" positions by engagement of the long teeth of the pinions 775' against the upper edge of the zeroizing blade 803', whereby the actuator racks withdraw from the pinions the positive total previously accumulated on them and index the printing type bars 562 to print that positive total.

If, however, the total standing in the rear crossfooter is negative when the total key 315 is depressed, a mechanism, corresponding to that described for the front crossfooter, causes the pinions 774' and 775' of the rear crossfooter to be shifted so that the pinions 774' instead of the pinions 775' will mesh with the actuators 511 and 519. When the total in the rear crossfooter is negative, the slide 905' is in its lower position so that, as the yoke 989 is rocked clockwise, as described above, and a rearward arm 995 on its left end is moved downward, the forward end of a pawl 997, pivotally mounted at its rear end on a stud secured in the slide 956, is moved downwardly by its spring 998 without interference from the slide 905'. A forward shoulder 999 of the pawl 997 is thereby placed behind a stud 1000 secured in the right-hand arm 1001 of the yoke 1002 which is pivotally mounted on the stud 795'. Then, when the slide 956 moves forwardly, the shoulder 999 of the pawl 997 moves the stud 1000 forwardly with the slide 956 and rocks the arm 1001 counterclockwise to rock the lever 788' clockwise to shift the pinions 775' leftwardly out of and the pinions 774' rightwardly into the planes of the actuator racks 511 and 519 before the pinions are elevated toward the actuator racks.

Thus, during the machine cycle initiated by depression of the key 315 while a negative total is contained in the rear crossfooter, the actuator racks 511 and 519 will mesh with the pinions 774' and rotate the latter counterclockwise and the pinions 775' clockwise unless and until they are stopped in their negative "0" (positive "9") positions by engagement of the long teeth of the pinions 774' against the ends of the teeth of a spacing strip corresponding to the strip 770 of the front crossfooter. Thus, the actuators 511 and 519 withdraw the actual negative total from the rear crossfooter pinions and correspondingly index the type bars 562 for printing the negative total.

When the slide 956 returns rearwardly to normal position, it returns the stud 1000 and the arm 1001 clockwise and the lever 788' counterclockwise to normal, shifting the pinions 774' leftwardly and the pinions 775' rightwardly to their normal positions. Upon restoration of the total key 315, the parts 931, 932, 934, 935 and 913' are restored by the spring 914' and the parts 389, 984, 987, 989, 948 and 951 are restored by the springs 990, 949 and 2159.

Negative totals from the rear crossfooter also are printed in red as disclosed in my prior application Serial No. 174,696.

Subtotal-taking—front crossfooter

The lower end of the stem of the front crossfooter subtotal key 322 is located above the forward end of a forward arm 395 (Figs. 26 and 27) of a yoke member which is pivotally supported on the shaft 218 rightwardly of the yoke portion of the lever 391 and has another arm 1004 extending downwardly in front of the stud 940.

When the lever 395, 1004 is rocked by depression of the key 322, the arm 1004 moves the stud 940 rearwardly so that it conditions the same parts of the machine in the same way as does the arm 938 in total-taking, but with one exception. The arm 1004 does not pull the link 919 rearwardly to cause the link 913 to connect the arm 911 to the slide 924. Instead, the lower end of the arm 1004 is pivotally connected with the rear end of a link 1005, the forward end of which is pivotally connected with an upward arm 1006 of a bell crank 1006, 1007 having a small yoke portion pivotally mounted on the stud 922 rightwardly of the bell crank 920, 921 and within the sides of the yoke 945.

The rearward arm 1007 of the bell crank has a downwardly turned rear end which, when the link 1005 is pulled rearwardly by depression of the subtotal key 322, engages and depresses the rear end of a connecting link 1008, which is pivotally mounted on the rightward end of the stud 912 and urged counterclockwise by a tension spring 1009 connected between the stud 915 and a forward projection on the link 1008. The clockwise movement of the link 1008 causes its rearward notched end to become connected to a stud 1010 secured in a slide 1011 forwardly and rearwardly slidably mounted on the studs 445, 446 and 447 which extend through elongated slots in the slide. At the same time, a downward projection on the connecting link 1008 engages a rightwardly bent lug 1012 on the lower arm of the connecting link 913 and rocks the latter clockwise sufficiently to disconnect it from the stud 916 on the slide 444 without connecting the upper arm of the link 913 to the stud 923 on the slide 924.

The slide 1011 carries a stud 1013 (Fig. 26) engaged in the notched lower end of a lever 1014 which is pivotally mounted on the stud 459 and has its upper end in the path of the left end portion of a long roller 1015 mounted on a stud secured in and extending leftwardly from a cam disk 592 secured on a hub pinned on the shaft 126. The slide 1011 also has, on its upper side, an ear in which is an adjustably eccentrically mounted stud 1016 normally positioned immediately behind an upward projection 1017 of the slide 924 so that in every machine cycle, when the slide 924 moves rearwardly, it also moves the slide 1011 rearwardly and to the same distance. A stud 1018 adjustably eccentrically mounted in the forward portion of the slide 1011 cooperates with a detent 1019 which is similar to the detent 971 and similarly pivotally mounted on the stud 954 and is urged counterclockwise by a tension spring 1020 connected between it and the stud 973. The detent 1019 likewise has two V-notches in the upper edge of its rearward arm. The stud 1018 is normally engaged in the forward notch of the detent 1019 which normally yieldingly holds the slide 1011 in its forward position.

The rearward notch in the detent 1019 is so positioned and proportioned that, during the final portion of the rearward movement of the slides 924 and 1011, after the crossfooter pinions have been meshed with the actuator racks 511 and 519, the stud 1018 traverses a portion of the upwardly inclined rear edge of the rear notch and rocks the detent 1019 clockwise. It will be remembered that, when the slide 924 completes its rearward movement, it immediately returns a short distance forward to permit a small forward movement of the transfer mechanism restoring bail 864 before the actuator racks 511 and 519 commence their forward movement. As the slide 924 performs that short partial return movement forwardly, the rear edge of the rear notch of the spring-urged detent 1019 acting on the stud 1018 cams the slide 1011 forwardly maintaining the stud 1016 engaged against the projection 1017 of the slide 924. Such action of the detent is assisted by the spring 801 (Figs. 18 and 19) when the link 1008 is connected to the stud 1010. The detent 1019 then holds the slide 1011 in such partially returned position where the slide, through the stud 1010 and the link 1008, maintains the crossfooter pinions meshed with the actuator racks 511 and 519.

While the actuator racks move forward, if and as far as required to rotate the crossfooter pinions to their "0" positions, the type bars are indexed, as previously described, in accordance with the amount drawn from the crossfooter to effect printing of that amount.

The detent 1019 continues to hold the slide 1011 in the last-mentioned position while and after the slide 924 is returned forwardly to its normal position. As the actuator racks 511 and 519 are returned rearwardly to their normal "0" position, the amount withdrawn from the crossfooter pinions is re-entered upon them. Subsequently, from about the 270° point to about the 296° point in the cycle, the roller 1015 rocks the lever 1014 clockwise to return the slide 1011 forwardly to its normal position whereby, through the link 1008, the crossfooter pinions are unmeshed from the actuator racks and returned to their normal lowered positions. To insure that the slide 1011 cannot return to normal and unmesh the crossfooter from the actuators 511 and 519 during the return movement of the latter, an upward projection 1021 (Figs. 26 and 28) is formed on the upper edge of the slide 444 in such position forwardly of the stud 1016 that while the slide 444 is rearward from about the 180° point to about the 270° point of the cycle, it prevents the slide 1011 from moving forwardly of the position in which the latter should be held by the rear notch in the detent 1019.

When the link 1008 is lowered by depression of the subtotal key 322, its upper edge is parallel to the line of motion of the slide 1011 so that the link 1008 is held in depressed position by the finger 1007 during the reciprocation of the slide 1011 while the subtotal key 322 remains in depressed position. When the key 322 is released and restored, the parts 395, 938, 941, 943 and 951 are restored by the spring 949, the parts 1005, 1006 and 1008 are restored by the spring 1009 and the link 913 is restored by the spring 914.

The parts controlled by the slide 905 act in machine cycles initiated by depression of the front crossfooter subtotal key 322 in the same manner as in cycles initiated by depression of the total key 321 so that the true subtotal, whether positive or negative, is drawn from the crossfooter, printed and re-entered into the crossfooter, the subtotal being printed black when it is positive but red when negative.

*Subtotal-taking—rear crossfooter*

The lower end of the stem of the rear crossfooter subtotal key 316 is located above the forward end of a forward arm 393 (Figs. 26 and 28) of a lever having a yoke portion which is pivotally supported on the shaft 218 between the yoke portions of the levers 389, 984 and 395, 1004 and has another arm 1022 extending downwardly in front of the stud 986. When the lever 393, 1022 is rocked by depression of the key 316, the arm 1022 engages and moves the stud 986 rearwardly so that it conditions the same parts of the machine in the same way as does the arm 984 in total-taking but with one exception. The arm 1022 does not pull the link 933 rearwardly to cause the link 913' to connect the arm 911' to the slide 924. Instead, the lower end of the arm 1022 is pivotally connected with the rear end of a link 1023, the forward end of which is pivotally connected with an upward arm on the right-hand side of a yoke 1024 pivotally mounted on the stud 936. The yoke 1024 also has, on its left-hand side, a rearward arm 1025 with a downwardly turned rear end which, when the link 1023 is pulled rearwardly and the yoke 1024 is rocked clockwise by depression of the subtotal key 316, engages and depresses the rear end of a connecting link 1026, which is pivotally mounted on the stud 912' and urged counterclockwise by a spring 1027 connected to the stud 915'.

The depression of the notched rear end of the link 1026 causes it to become connected to a stud 1028 secured in the slide 1011. At the same time, a downward projection on the connecting link 1026 engages a rightwardly bent lug 1029 on the lower arm of the connecting link 913' and rocks the latter clockwise sufficiently to disconnect it from the stud 916' on the slide 444 without connecting the upper arm of the link 913' to the stud 937 on the slide 924. Consequently, the rear crossfooter pinions are meshed with the actuator racks 511 and 519 before the latter move forward if and as far as required to rotate the rear crossfooter pinions to their "0" positions as in total-taking, the actuator racks indexing the type bars in accordance with the amount drawn from the crossfooter to effect printing thereof. Also, the detent 1019 continues to hold the rear crossfooter pinions meshed with the actuator racks 511 and 519 until after the latter are returned rearwardly to their normal "0" positions, whereby the amount withdrawn from the rear crossfooter pinions is re-entered upon them, after which, the rear crossfooter pinions are unmeshed from the actuator racks and returned to their normal lowered positions late in the machine cycle. Upon release of the subtotal key 316, the parts 989, 948, 951, 1022–1026 and 393 are restored to normal by the springs 1027, 990 and 949.

The parts controlled by the slide 905' act in machine cycles initiated by depression of the rear crossfooter subtotal key 316 in the same manner as in cycles initiated by depression of the total key 315 so that the true subtotal, whether positive or negative, is drawn from the rear crossfooter, printed and re-entered into the crossfooter, the subtotal being printed black when it is positive but red when negative.

Printing of function identifying symbols

The printing mechanism includes two type bars 562 located at the right of the lowest order amount printing type bar and carrying, in the second to the eighth type positions, counting down from the top, seven types for the symbols "CR," "S," "CR," "*," "—," "—//—" and "+" which, respectively, identify negative subtotal, positive subtotal, negative total, positive total, subtract, non-add and adding operations of the crossfooters. Of these two symbol printing type bars 562, the left one prints the symbols identifying the functions performed by the front crossfooter and the right one prints the symbols identifying the functions performed by the rear crossfooter. These front and rear crossfooter symbol printing type bars are indexed through individual trains of gearing 568, 569, 570, 585 and 586 (Fig. 30) by two rack slides 589 and 588, respectively, which are forwardly and rearwardly slidably mounted on the studs 445, 446 and 447. (See also Fig. 1.) Each of the slides 588 and 589 is urged forwardly by a tension spring 590 secured at its forward end to a stud 591 secured in the plate 27 and at its rear end to an eye in the rear end of the respective slide. Each slide 588 and 589 has a downward projection 597 behind a stud 596 secured in the lower end of a lever 594 pivotally supported at its upper end on the stud 595. The lever 594 has a forwardly extending arm carrying a stud supporting a roller 593 normally bearing against the periphery of the cam disk 592. The cam 592 normally positions the lever 594 and stud 596 so as to hold the slides 588 and 589 in their normal rearward positions so that both symbol printing type bars are in their lowermost positions. In each machine cycle, the cam 592 permits the lever 594 and the slides 588 and 589 to be moved forward by the springs 590 after about the 30° point and prior to about the 150° point of the cycle, i. e., after the crossfooter automatic function controls have been conditioned and prior to the firing of the printing hammers 605. From about the 290° point until near the end of the machine cycle, the cam 592 restores the lever 594 and thus also the slides 588 and 589 and symbol printing type bars to normal. The forward movements of the rack slides 588 and 589, and thus also the upward symbol type selecting movements of the function identifying symbol type bars, are controllably variably limited, as will now be described, by elements of the previously-described means for conditioning the machine manually for the performance of the various calculating functions by the two crossfooters.

Addition

In machine cycles in which adding operations are performed on the front and rear crossfooters, the rack slides 589 and 588 are removed forwardly by their springs 590 as far as the cam 592, through the parts 593–597, will permit. The movement of the rack slides 588 and 589 is not limited by any of the calculating function control elements when addition is performed on the associated crossfooter. By the full movement of the rack slides 588 and 589 permitted by the cam 592, the symbol type bars 562 for the orders 17 and 18 are raised to the extent that the "+" types in the eighth type positions are at the printing line when the printing hammers operate to drive the types toward the platen.

Non-addition

When the bell crank 920, 921 (Fig. 27) is rocked to disconnect the lower branch of the link 913 from the stud 916 without connecting the upper branch of the link 913 to the stud 923, whereby, as explained above, the front crossfooter operating controls are placed in non-adding condition, a shoulder 1030 of an intermediate third arm 1031 on the bell crank 920, 921 is lowered into the path of a lateral projection 599 (Fig. 30) on the rack slide 589 to arrest forward movement of that rack slide at the point at which it has raised the "—//—" type in the seventh type position on the symbol type bar 562 for the front crossfooter to the printing line. Thus, the symbol "—//—" will be printed next rightward of an amount printed in a machine cycle in which the front crossfooter is non-added.

When the yoke 934, 935 (Fig. 28) is rocked to disconnect the lower branch of the link 913' from the stud 916' without connecting the upper branch of the link 913' to the stud 937, whereby, as previously mentioned, the rear crossfooter operating controls are placed in non-adding condition, a shoulder 1032 of an upper rearwardly inclined arm 1033 on the left side of the yoke 934, 935 is lowered into the path of a lateral projection 598 of the rack slide 588 to arrest forward movement of that rack slide when it has raised the "—//—" type in the seventh position on the symbol type bar 562 for the rear crossfooter to the printing line. Thus, the "—//—" symbol will be printed in the rightward one of the two symbol positions at the right of any amount printed in a machine cycle in which the rear crossfooter is non-added.

Subtraction

When the bell crank 920, 921 is rocked far enough to connect the upper branch of the link 913 to the stud 923, as it is when the front crossfooter operating controls are conditioned for subtracting operation of the front crossfooter, the rearmost end of the arm 1031 is lowered into the path of the projection 599 so that the forward movement of the rack slide 589 is stopped when it has raised the "—" type in the sixth type position on the front crossfooter symbol type bar to the printing line.

When the yoke 934, 935 is rocked far enough to connect the upper branch of the link 913' to the stud 937, as it is when the rear crossfooter operating controls are conditioned for subtracting operation of the rear crossfooter, the rearmost end of the arm 1033 is lowered into the path of the projection 598 to arrest forward movement of the rack slide 588 when the "—" type in the sixth type position on the rear crossfooter symbol type bar is at the printing line.

Total-taking

When the yoke 945 (Fig. 27), as previously explained, is rocked as the front crossfooter operating controls are placed in total-taking condition, the rearward end of a rearward arm 1034 on the rightward side of the yoke 945 is placed in the path of the projection 599 to arrest forward movement of the rack slide 589 when the "*" type in the fifth type position on the front crossfooter symbol type bar is at the printing line. The "*" symbol is printed if the total is positive.

If the front crossfooter contains a negative total as the yoke 945 is rocked clockwise, the yoke 981 (Figs. 29 and 30) is rocked counterclockwise as previously explained. A forward extension of an upward arm 1035 on the rightward side of the yoke 981 is connected to the forward end of a tension spring 1036 which, at its rearward end, is connected to the end of a downwardly and rearwardly inclined arm 1037 on the rightward side of a yoke 1038 (Fig. 30) pivotally mounted on the right end portion of the stud 922. The spring 1036 normally yieldingly holds the forward edge of the arm 1037 engaged against the rear side of a stud 1039 secured in the upper end portion of the arm 1035. Thus, when the yoke 981 is rocked counterclockwise, the yoke 1038 is rocked clockwise, but, in a front crossfooter total-taking operation, a stud 1040, secured in an upwardly and forwardly inclined arm on the left side of the yoke 1038 (Fig. 27) is arrested by a forward projection 1041 on the upward arm of the bell crank 1006, 1007 when the yoke 1038 has rocked only far enough to place a shoulder 1042 of a rearward arm 1043 on the left side of the yoke 1038 in the path of the projection 599. Thus, in front crossfooter total-taking operation performed when the total in the front crossfooter total is negative, the shoulder 1042 arrests forward movement of the rack slide 589 when the "CR" type in the fourth type position of the front crossfooter symbol type bar is at the printing line.

When the yoke 989 (Fig. 28) and bell crank 992 are rocked as the rear crossfooter operating controls, as previously explained, are conditioned for total-taking operation of the rear crossfooter, the rearward end of a rearward arm 1044 of the bell crank 992 is lowered into the path of the projection 598 to arrest forward movement of the rack slide 588 when the "*" type in the fifth type position of the rear crossfooter symbol type bar is at the printing line. The "*" symbol for the rear crossfooter is printed if the total taken from the rear crossfooter is positive.

If the rear crossfooter total is negative as the yoke 989 is rocked clockwise, the yoke 1002 will be rocked counterclockwise as previously explained. A yoke 1045 (Fig. 30), pivotally mounted on the stud 936 in embracing relation to the right sides of the yokes 934 and 1024, has a downwardly and rearwardly inclined arm 1046 on its rightward side. The lower end of the arm 1046 is connected to the rear end of a tension spring 1047, the forward end of which is connected to a forward extension of an upward arm 1048 on the rightward side of the yoke 1002. The spring 1047 normally yieldingly holds the forward edge of the arm 1046 engaged against the rear side of a stud 1049 secured in the upper portion of the arm 1048. Thus, when the yoke 1002 rocks counterclockwise, the yoke 1045 is rocked clockwise. In a total-taking operation of the rear crossfooter, the rocking of the yoke 1045 is limited by reason of a stud 1050 in an upwardly and forwardly extending arm on the leftward side of the yoke 1045 being stopped by a forward projection 1051 (Fig. 28) of the upward arm of the yoke 1024 when a shoulder 1052 of a rearward arm 1053 on the left side of the yoke 1045 is positioned in the path of the projection 598 to arrest forward movement of the rack slide 588 when the "CR" type in the fourth type position on the rear crossfooter symbol type bar is at the printing line.

From the previous description of the operation of the slides 905 and 905', it should be apparent that when ".00" is printed in a total-taking operation of either crossfooter, the print will also include a "*" symbol for the totalized crossfooter if the last entry of a "fugitive 1" therein was additive but a "CR" symbol for that crossfooter if the last "fugitive 1" entry therein was subtractive.

*Subtotal-taking*

When the bell crank 1006, 1007 (Fig. 27) is rocked as the front crossfooter operating controls are placed in subtotal-taking condition, the end of an upper rearward third arm 1054 thereof is placed in the path of the projection 599 to arrest forward movement of the rack slide 589 when the "S" type in the third type position of the front crossfooter symbol type bar is at the printing line. The "S" symbol will be printed if the subtotal taken from the front crossfooter is positive.

If the front crossfooter subtotal is negative when the yoke 1006 is rocked, as explained above, the yokes 981 and 1038 will be rocked, and, as the projection 1041 of the upward arm of the yoke 1006 is in its rearward position, it will permit the yoke 1038 to rock far enough to place the rearmost end of its arm 1043 in the path of the projection 599 to arrest the rack slide 589 when the "CR" type in the second type position on the front crossfooter symbol type bar is at the printing line.

When the yoke 1024 (Fig. 28) is rocked as the rear crossfooter operating controls are placed in subtotal-taking condition, the rear end of an upper rearward arm 1055 on the rightward side of the yoke 1024 is placed in the path of the projection 598 to arrest the rack slide 588 when the "S" type in the third type position of the rear crossfooter symbol type bar is at the printing line. The "S" symbol will be printed if the subtotal is positive.

If the rear crossfooter subtotal is negative as the yoke 1024 is rocked, the yokes 1002 and 1045 will be rocked as previously explained and, as the projection 1051 is in its rearward position, it will permit the yoke 1045 to rock far enough to place the rearmost end of its arm 1053 in the path of the projection 598 to arrest the rack slide 588 when the "CR" type in the second type position of the rear crossfooter symbol type bar is positioned at the printing line.

It will be apparent from the foregoing that when ".00" is printed in a subtotal-taking operation of either crossfooter, the "S" symbol for the subtotaled crossfooter will be printed if the last "fugitive 1" entry into that crossfooter was additive but the "CR" symbol for the subtotaled crossfooter will be printed if the last "fugitive 1" entry therein was subtractive.

AUTOMATIC TOTALIZER FUNCTION CONTROLS

The calculating functions of the two crossfooters as well as the functioning of other mechanisms of the machine are controllable automatically in accordance with columnar positions of the traveling paper carriage. The carriage governed control means comprises a pan-like support 1731 (Figs. 1, 32 and 34) which is removably and adjustably mounted substantially horizontally on and below the rearward portions of the paper carriage. The support 1731 carries shafts 1740 and 1781 carrying column stops 1323 and control elements 1784 of a carriage movement and position control means. The support also carries an array of control projections 1767 formed on members 1765 secured in channels between ribs 1764 on bars 1750 having lugs 1751 and 1752 seated in notches 1749 in mounting strips 1747 and 1748 secured at their ends to downward end flanges on the pan 1731. The projections 1784 may be located in any of the foremost five, and the projections 1767 may be located in any of the remaining twenty of twenty-five parallel lines or control lanes extending lengthwise of the carriage. Sensing pins 1811 to 1827 (Fig. 34) arranged in a forwardly and rearwardly extending row beneath the pair 1731 are vertically slidably mounted in apertures in strips 1805, 1806, 1808 and 1809 secured to a bar 1804 supported on the stationary frame. The parts are so arranged that, in each of the columnar positions of the paper carriage, the control projections 1767 of the members 1765 carried by a respective one of the bars 1750, and certain of the projections 1784, may be directly above the row of sensing pins 1811 to 1827.

Each of the sensing pins 1811 to 1827 are formed with pairs of rightwardly projecting vertically spaced lugs 1830 embracing between them the leftward ends of respective ones of a series of control levers 1831 to 1847, the rightward portions of which are guided in vertical slots in a comb plate 1554 secured to the stationary frame. The control levers 1831 to 1847, and thus also the sensing pins are normally held in their lower positions by tension springs 1873 connected to the control levers a short distance leftward of the comb plate 1554. A cam shaft 1874 extending forwardly and rearwardly under the row of control levers 1831 to 1847 leftwardly of the springs 1873 is journaled in the machine frame back plate 45 and in a bracket 1553. Through disconnectible gearing 1503, 1875, 1876 and 1878 and a shaft 1879, the cam shaft normally is driven through one full revolution clockwise in each machine cycle. Secured on the shaft 1874 to rotate therewith are a crank 1893 carrying a roller 1894 to actuate the lanes 3, 4 and 5 control levers 1831, 1832 and 1833, a crank 1907 carrying roller 1914 to actuate the lane 15 control lever 1843, and a series of cam disks 1898 to 1906 and 1908 to 1911 engaging rollers 1913 mounted on studs in respective ones of the control levers 1834 to 1842 and 1844 to 1847. The arrangement is such that at various times, all very early in each machine cycle, the cams and cranks on the shaft 1874 lift the mid-portions of the control levers 1831 to 1847 so that, while the springs 1873 hold the rightward ends of the control levers downward, the leftward ends of the control levers and the sensing pins 1811 to 1827 coupled therewith are elevated. When and if any sensing pin encounters a control projection 1784 or 1767 above it and its upward movement is thereby limited, the rightward end of the coupled control lever is then elevated to an extent related to the length of the encountered control projection 1784 or 1767. At various later times, all prior to the time in the machine cycle at which lateral movement of the paper carriage can occur, the cams and cranks on the shaft 1874 permit the control levers and sensing pins to return downwardly to their normal positions where the sensing pins are below the paths of the control projections 1784 and 1767 during lateral movement of the carriage. The control projections are of various lengths, there being nine different lengths of control projections 1767 designated #1 to #9 as shown in Fig. 33.

The rightward end of each of the control levers 1831 to 1847 is coupled with or projects under the rearward end portion of a rearward arm of a respective one of a series of bell cranks 1853 to 1869 arranged in two groups and pivotally mounted on the reduced ends of spacing sleeves on a respective one of two long studs 1547 and 1870 secured in and projecting rightwardly from the plate 27. The lower arms of the bell cranks are coupled with various function control devices of the machine.

Certain ones of the automatic controls resulting from the raising of the rightward ends of the control levers 1831 to 1846 when upward movements of the sensing pins 1811 to 1826 are limited by control projections 1784 or 1767, must be maintained beyond that time in the machine cycle at which the sensing pins must be restored to normal prior to movement of the paper carriage to another columnar position. For that purpose, means are provided to latch certain ones of the bell cranks 1853 to 1868 in the positions to which they are rocked by their control levers 1831 to 1847 until a time in the machine cycle subsequent to the restoration of the sensing pins 1811 to 1827. For an understanding of the present invention, detailed consideration of the carriage-governed automatic control means may be limited to the mechanisms associated with control lanes 6 to 11 and 16.

Forwardly of the lower ends of the downward arms of the bell cranks 1590 and 1853 to 1861 is a wide latch bail 1921 (Fig. 31) having at each side near its front edge a down-turned portion by which it is pivotally mounted on a headed screw stud 1922 threaded into the frame side plate 27. The rear edge of the latch bail 1921 has across its full width, a down-turned flange 1923 which is beveled on its forward side to a sharp lower edge and cooperates with complementarily beveled projections 1924 on each of the bell cranks 1853, 1854, 1855, 1856, 1858, 1859 and 1860. The bell cranks 1857 and 1861 are without such projections 1924. The bail 1921 is urged clockwise by a tension spring 1925 connected between the rearward portion of the bail and a stud 1926 secured in the plate 27. A downward arm on the right side of the latching bail 1921 carries a stud 1935 pivotally engaged in an upward projection on a link 1933 which is pivotally connected at its forward end to the downward arm 1936 of a bell crank which is pivotally mounted on a stud 595 and has a forward arm 1937 normally engaged against the underside of the roller 1015.

Early in each cycle of operation of the machine, as the roller 1015 leaves the arm 1937, the spring 1925 rocks the bail 1921 clockwise, moves the link 1933 forward and rocks the bail 1928 and the bell crank 1936, 1937 clockwise so that the rear latching flange of the bail 1921 is moved downward into cooperation with the projections 1924. This occurs after the control arms 1834 to 1841, inclusive, have been fully raised but before the other control arms have risen. This permits the rear flange of the latching bail 1921 to move down in front of the latching projections 1924 on any of the bell cranks 1856, 1858, 1859 and 1860 which may have been rocked. If any of the sensing pins 1811, 1812 and 1813, when they are subsequently elevated, are blocked by control projections 1784 so that the rearward arms of any of the bell cranks 1853, 1854 and 1855 are raised, the bevel on the rear latch flange on the bail 1921 and the complementary bevels on the projections 1924 on the downward arms of the last-mentioned bell cranks can cam the latching bail 1921 counterclockwise sufficiently to permit those projections to pass to the rear of the flange on the latching bail which then snaps down in front of the projections to latch the rocked bell cranks in their rocked positions. None of the bell cranks 1856, 1858, 1859 or 1860 is released at that time as their control levers 1834, 1836, 1837 and 1838 are still held elevated by the cams 1898, 1900, 1901 and 1902 on the shaft 1874.

The clockwise movements of the bell crank 1936, 1937 and of the latching bail 1921 are limited by mutual engagement of stop projections 1938 and 1939 on adjacent portions of the arm 1936 and link 1933.

Shortly before the end of the rotation of the shaft 126, a second roller 1941 supported on a stud in the cam disk 592 engages and depresses the arm 1937, thereby restoring the bell crank 1936, 1937, the link 1933 and the latching bail 1921 to normal and releasing any bell cranks held in their rocked positions by the latching bail. The roller 1941 holds the arm 1937 depressed until, just before the completion of the rotation of the shaft 126, the roller 1015 again holds the arm 1937 in its normal position.

Lane 6.—Automatic total-taking: Front crossfooter

In a machine cycle in which upward movement of the sensing pin 1814 is limited by a #5 control projection 1767 in lane 6, a total is taken automatically from the front crossfooter unless the front crossfooter subtotal key 322, the front crossfooter non-add key 323 or the front crossfooter add key 326 is depressed, in which three cases the front crossfooter will perform the function selected by the depressed key as explained hereinafter.

The downward arm of the bell crank 1856 has a latching projection 1924 to cooperate with the latching bail 1921 and carries a stud 1984 (Fig. 36) projecting through the forward end of an elongated slot in the rear end of a link 1985 which is normally held rearwardly against the stud 1984 by a tension spring 1986 connected at its forward end to a downward ear on the link 1985 and at its rear end to the lower end of the downward arm of the bell crank 1856. The forward end of the link 1985 (Figs. 25 and 27) has an elongated slot, through the forward end of which a stud 1987 secured in the arm 938 projects. Thus, when the upward movement of the sensing pin 1814 is stopped by a #5 control projection 1767 in lane 6, the control lever 1834, through the bell crank 1856, the spring 1986 and link 1985 rocks the lever 391, 938 to condition the front crossfooter controls for total-taking prior to rearward movement of the slide 924 and in the same manner as when the lever 391, 938 is rocked by depression of the front crossfooter total key 321 as previously described. The latching of the bell crank 1856 by the latching bail 1921 holds the bell crank 1856 and the parts controlled thereby in total-taking position until after the slide 444 has been returned to its normal position. Upon restoration of the latching bail 1921, the bell crank 1856 and link 1985 are returned to normal by the spring 1986. At the same time, the lever 391, 938 and parts operated thereby are returned to normal in the same manner as upon restoration of the key 321 as previously described.

*Lane 7.—Automatic subtract and non-add: Front crossfooter*

In a machine cycle in which upward movement of the sensing pin 1815 is limited by a #5 control projection 1767 in lane 7, the front crossfooter is automatically conditioned to perform subtraction unless the front crossfooter total key 321, the front crossfooter subtotal key 322, the front crossfooter non-add key 323 or the front crossfooter add key 326 is depressed. If, however, the control projection 1767 is a #9 control projection, the front crossfooter is automatically non-added unless the total key 321, the subtotal key 322, the subtract bar 324 or the add key 326 is depressed. In any of the excepted circumstances, the front crossfooter will perform the function selected by the depressed key as will be explained hereinafter.

The downward arm of the bell crank 1857 has no latching projection 1924 to cooperate with the latching bail 1921 but carries a stud 1988 (Fig. 37) projecting through the forward end of an elongated slot in the rear end of a link 1989 which is normally held rearwardly against the stud 1988 by a tension spring 1990 connected at its forward end to a downward ear on the link 1989 and at its rear end to the lower end of the downward arm of the bell crank 1857. The forward end of the link 1989 (Fig. 25) has an elongated slot, through the forward end of which a stud 1991 (see also Fig. 27) secured in the arm 918 projects. When the upward movement of the sensing pin 1815 is stopped by a #5 control projection 1767 in lane 7, the control lever 1835, through the bell crank 1857, the spring 1990 and link 1989, rocks the arm 918 prior to rearward movement of the slide 924 and to the same extent as it is rocked by depression of the subtract bar 324 to condition the front crossfooter controls for subtraction as previously described. The cam 1899 is shaped to maintain the control lever 1835 in elevated position until after the actuator racks 511 have completed their forward movement and the slide 924 has substantially completed its return to normal so that latching of the bell crank 1857 by the latching bail 1921 is unnecessary. The bell crank 1857 and link 1989 are returned to normal by the spring 1990 when permitted by the cam 1899, whereupon the arm 918 and parts operated thereby are restored as upon restoration of the bar 324 as previously described except that, because such restoration occurs while the slide 444 is rearward, the edge of the lower branch of the pawl 913, rearward of the notch therein, engages the underside of the stud 916 until the slide 444 returns to normal, whereupon the spring 914 completes the restoration of the pawl 913 so that the notch in the lower arm thereof embraces the stud 916.

When the sensing pin 1815 is limited by a #9 control projection 1767 in lane 7, the above-described connections rock the arm 918 only as far as it is rocked by depression of the non-add key 323 so that the front crossfooter controls are placed in non-add condition as previously described. The parts are restored to normal as after automatic subtraction as described above.

*Lane 8.—Automatic subtotal-taking: Front crossfooter*

In a machine cycle in which upward movement of the sensing pin 1816 is limited by a #5 control projection 1767 in lane 8, a subtotal is taken automatically from the front crossfooter unless either the front crossfooter total key 321 or the front crossfooter subtract bar 324 is depressed, in each of which cases, the operation selected by the depressed key will be performed on the front crossfooter as will be explained hereinafter.

The downward arm of the bell crank 1858 has a latching projection 1924 to cooperate with the latching bail 1921 and carries a stud 1992 (Fig. 38) projecting through the forward end of an elongated slot in a link 1993 which is normally held rearwardly against the stud 1992 by a tension spring 1994 connected at its forward end to a downward ear on the link 1993 and at its rear end to the lower end of the downward arm of the bell crank 1858. The forward end of the link 1993 (Figs. 26 and 27) has an elongated slot, through the forward end of which a stud 1995 secured in the arm 1004 of the lever 395 projects. Thus, when upward movement of the sensing pin 1816 is stopped by a #5 control projection 1767 in lane 8, the control lever 1836, through the bell crank 1858, the spring 1994 and link 1993, rocks the lever 395, prior to rearward movement of the slide 924, to condition the front crossfooter controls for subtotal-taking in the same manner as when the lever 395 is rocked by depression of the key 322 as previously described. The latching of the bell crank 1858 by the latching bail 1921 holds the parts in subtotal-taking position until after the slides 444 and 1011 have returned to normal. Upon return of the latch bail 1921 to normal, the spring 1994 restores the bell crank 1858 and link 1993 to normal. At the same time, the lever 395 and the parts operated thereby are returned to normal as upon restoration of the key 322 as previously described.

*Lane 9.—Automatic subtotal-taking: Rear crossfooter*

In a machine cycle in which upward movement of the sensing pin 1817 is limited by a #5 control projection 1767 in lane 9, a subtotal is taken automatically from the rear crossfooter unless the rear crossfooter total key 315 or the rear crossfooter subtract bar 318 is depressed, in each of which cases the operation selected by the depressed key will be performed on the rear crossfooter as will be explained hereinafter.

The downward arm of the bell crank 1859 (Fig. 39) has a latching projection 1924 to cooperate with the latching bail 1921 and is pivotally connected to the rear end of the link 1996 which, at its forward end, is pivotally connected to the downward arm of a three-armed lever 1997 pivotally mounted on a stud 1544 secured in the plate 27. A bell crank 1998, also pivotally mounted on the stud 1544 has an upwardly and forwardly inclined arm connected to the upper end of a tension spring 1999 which has its lower end connected to a downwardly and forwardly inclined arm of the lever 1997 and normally holds an upward arm of the bell crank 1998 in contact with a stud 2000 carried in an upward arm of the lever 1997. The upward arm of the bell crank 1998 is pivotally connected to the rear end of a link 2001, the forward end of which has an elongated slot in which is a stud 2002 (Figs. 26 and 28) secured in an upward arm of the lever 393. The stud 2002 is normally in the rear end of the slot in the link 2001.

Thus, when the upward movement of the sensing pin 1817 is stopped by a #5 control projection 1767 in lane 9, the control lever 1837, through the bell crank 1859, the link 1996, the lever 1997, the spring 1999, the bell crank 1998 and the link 2001, rocks the lever 393, prior to rearward movement of the slide 924, to condition the rear crossfooter controls for subtotal-taking in the same manner as when the lever 393 is rocked by depression of the key 316 as previously described. The latching of the bell crank 1859 by the latching bail 1921 holds the parts in subtotal-taking position until after the slides 444 and 1011 have returned to their normal positions. Upon return of the latching bail 1921 to normal, the lever 393 and the parts operated through it are restored to normal in the same manners as upon restoration of the key 316 as previously described. The lever 393, returning to normal, also restores the linkage 1996—2001 and the bell crank 1859 to normal.

*Lane 10.—Automatic total-taking: Rear crossfooter*

In a machine cycle in which upward movement of the sensing pin 1818 is limited by a #5 control projection 1767 in lane 10, a total is taken automatically from the rear crossfooter unless the rear crossfooter subtotal key 316, the rear crossfooter non-add key 317, or the rear crossfooter add key 320 is depressed, in which three cases, the function selected by the depressed key is performed as will be explained hereinafter.

The downward arm of the bell crank 1806 (Fig. 40) has a latching projection 1924 to cooperate with the latching bail 1921 and is pivotally connected to the rear end of a link 2003 which, at its forward end, is pivotally connected to the downward arm of a three-armed lever 2004 pivotally mounted on the stud 1544. A bell crank 2005, also pivotally mounted on the stud 1544 has an upwardly and forwardly inclined arm connected to the upper end of a tension spring 2006 which has its lower end connected to a downwardly and forwardly inclined arm of the lever 2004 and normally holds an upward arm of the bell crank 2005 in contact with a stud 2007 carried in an upward arm of the lever 2004. The upward arm of the bell crank 2005 is pivotally connected to the rear end of a link 2008, the forward end of which (Figs. 25 and 28) has an elongated slot in which is a stud 2009 secured in an upward arm of the lever 389. The stud 2009 is normally in the rear end of the slot in the link 2008.

Thus, when upward movement of the sensing pin 1818 is stopped by a #5 control projection 1767 in lane 10, the control lever 1838, through the bell crank 1860, the link 2003, the lever 2004, the spring 2006, the bell crank 2005 and link 2008, rocks the lever 389, prior to rearward movement of the link 924, to condition the rear crossfooter controls for total-taking in the same manner as when the lever 389 is rocked by depression of the key 315 as previously described. The latching of the bell crank 1860 by the latching bail 1921 holds the parts in total-taking position until after the slide 444 has returned to normal. Upon restoration of the latching bail 1921, the lever 389 and parts operated thereby are restored to normal in the same manner as upon restoration of the key 315 as previously described. The lever 389, returning to normal position, restores the linkage 2003—2009 and the bell crank 1860 to normal.

*Lane 11.—Automatic subtract and non-add: Rear crossfooter*

In a machine cycle in which upward movement of the sensing pin 1819 is limited by a #5 control projection 1767 in lane 11, the rear crossfooter is automatically conditioned to perform subtraction unless the rear crossfooter total key 315, the subtotal key 316, the non-add key 317 or the add key 320 is depressed. If, however, the control projection 1767 is a #9 control projection, the rear crossfooter is automatically non-added unless the total key 315, the subtotal key 316, the subtract bar 318 or the add key 320 is depressed. In any of the excepted circumstances, the rear crossfooter will perform the function selected by the depressed key as will be explained later.

The downward arm of the bell crank 1861 (Fig. 41) has no latching projection 1924 to cooperate with the latching bail 1921 but is pivotally connected to the rearward portion of a link 2010, the forward end of which is pivotally connected to a downward arm of a three-armed lever 2011 pivotally mounted on the stud 1544. A bell crank 2012, pivotally held on the outer end of the stud 1544 as by a washer and a headed screw, has an upwardly forwardly inclined arm connected to the upper end of a tension spring 2013 which is connected at its lower end to a downwardly forwardly inclined arm of the lever 2011 and normally holds an upward arm of the bell crank 2012 in contact with the rear of a stud 2014 secured in an upward arm of the lever 2011. The upward arm of the bell crank 2012 is pivotally connected with the rear end of a link 2015, the forward end of which (Fig. 42) has an elongated slot in which is a stud 2016 secured in an upward arm of a lever 2017 pivotally mounted on the shaft 218. The stud 2016 is normally in the rear end of the slot in the link 2015. The lower end of the downward arm of the lever 2017 is forked to closely straddle a stud 2018 (Figs. 28, 29 and 41) secured in the rear end of the link 933.

When the upward movement of the sensing pin 1819 is stopped by a #5 control projection 1767 in lane 11, the control lever 1839, through the bell crank 1861, the link 2010, lever 2011, spring 2013, bell crank 2012, link 2015 and lever 2017, moves the link 933 rearwardly prior to rearward movement of the slide 924 and to the same extent as it is moved by depression of the subtract bar 318 to condition the rear crossfooter controls for subtraction in the same manner as when the link 933 is moved rearwardly by depression of the bar 318 as previously described. The cam 1903 is shaped like the cam 1899 to maintain the control lever 1839 in elevated position until after the actuator racks 511 have completed their forward movement and the slide 924 has substantially completed its return to normal so that latching of the bell crank 1861 by the latching bail 1921 is unnecessary. When the cam 1903 permits the control lever 1839 to return to normal, the link 933 and parts operated thereby are restored to normal in the same way as upon restoration of the bar 318 as previously described. The link 933, restoring, returns the lever 2017, linkage 2010—2015 and bell crank 1861 to normal.

When the sensing pin 1819 is limited by a #9 control projection 1767 in lane 11, the above-described connections move the link 933 rearwardly only as far as it is moved by depression of the non-add key 317 so that the rear crossfooter controls are placed in non-add condition as previously described. The parts are returned to normal in the same manner as after automatic subtraction as described above.

*Lane 16.—Automatic variation of functions of rear crossfooter when front crossfooter contains negative total*

If the rise of the sensing pin 1824 is limited by a #5 control projection 1767 in lane 16 in a machine cycle initiated while the front crossfooter contains a negative total, the rear crossfooter controls will be conditioned automatically for subtraction unless the rear crossfooter total key 315, subtotal key 316, non-add key 317 or the add key 320 is depressed. If a #9 control projection 1767 in lane 16 limits the rise of the sensing pin 1824 in a machine cycle initiated while the front crossfooter contains a negative total, the rear crossfooter controls will be placed in non-add condition unless the rear crossfooter total key 315, subtotal key 316, subtract bar 318 or the add key 320 is depressed. In each of the excepted cases, the function determined by the depressed key will be performed on the rear crossfooter.

As previously explained, the slide 905 (Fig. 21, 27 and 31) is always in its upper position while the front crossfooter contains a positive amount and is always in its lower position while the front crossfooter contains a negative amount, i. e., is in overdrafted condition. A rearward projection at the lower end of the slide 905 has a rightwardly bent portion 2044 (Figs. 1 and 31) overlying a lower forward arm of a latch pawl 2045 which is pivoted on a shouldered stud 2046 secured in the frame side plate 27 and is urged clockwise by a tension spring 2047 connected at its lower end to an upper forward arm of the latch pawl 2045 and at its upper end to the rightwardly projecting portion of the stud 903. The rear arm of the latch pawl 2045 overlies and has a latch hook normally located immediately behind a leftwardly bent lug 2048 on a link 2049, the slotted forward end of which is supported for forward and rearward sliding movement on a shouldered screw threaded into the outer end of the stud 2046.

The rear end of the link 2049 is pivotally connected to the downward arm of a bell crank 2050, which is pivotally mounted on a shouldered screw 2051 secured in the frame side plate 27. The rear arm of the bell crank 2050 is pivotally connected to the lower end of a link 2052, the upper end of which is pivotally connected to the rearward portion of a short link 2053, which is pivotally supported at its front end on a stud secured in the downward arm of the bell crank 1866. A tension spring 2054 connected at its upper end to an ear on the link 2052 and at its lower end to the rearward arm of the bell crank 2050 near the stud 2051 urges the link 2052 downward, and the link 2049 forward to the positions shown in Fig. 31.

The leftward end of the roller 1015 normally bears on the rear end of an upper cam edge of a forward arm of a bell crank 2055 which is pivotally mounted on a reduced outer end of the stud 450 and has a long downward arm carrying a stud 2056 which is located behind a shoulder on the link 2049 and normally held in contact with the shoulder by a tension spring 2057 which is connected at its rear end to the stud 2056 and at its forward end to a stud in the link 2049.

When the front crossfooter contains a positive amount, the slide 905, being in its upper position, permits the latch pawl 2045 to latch the link 2049 against rearward movement, but when the front crossfooter is in overdrafted condition, the slide 905 is in its lower position of Fig. 31 and holds the latch pawl 2045 disengaged from the lug 2048 so that when the bell crank 2055 is rocked counterclockwise by the roller 1015 in each machine cycle, the spring 2057, overcoming the spring 2054, will cause the link 2049 to follow the stud 2056 and, through the bell crank 2050 and link 2052, raise the rear end of the link 2053 to a position immediately in front of the rightwardly bent end of a downward arm 2058 on the left side of a yoke member 2059 pivoted on the stud 1556. The forward cam arm of the bell crank 2055 is of such configuration that, while the latch pawl 2045 is held in releasing position, the stud 1015 will complete such lifting of the link 2053 prior to the raising of the lane 16 control lever 1844 by the cam 1908, which latter action occurs prior to rearward movement of the slide 924. The stud 1015 then holds the link 2053 in its elevated position until the control lever 1844 has been lifted by the cam 1908.

A downward arm 2060 (Fig. 41) on the right-hand side of the yoke 2059 is pivotally connected at its lower end to the rear end of a link 2061, the forward end of which is pivotally connected to the rear end of the link 2010 which, when pulled rearwardly, conditions the rear crossfooter controls for subtraction as previously explained. Thus, if the upward movement of the sensing pin 1824 is limited by a #5 control projection 1767 in lane 16 while the front crossfooter contains a negative total, the rocking of the bell crank 1866 will, through the link 2053, rock the yoke 2059 and pull the link 2061 rearwardly to substantially the same extent as that link is pulled rearwardly in a machine cycle in which the lane 11 sensing pin 1819 is limited by a #5 control projection 1767, so that the rear crossfooter controls are conditioned for subtraction unless the total key 315, the subtotal key 316, the non-add key 317 or the add key 320 is depressed. If a #9 control projection 1767 in lane 16 limits upward movement of the sensing pin 1824 while the crossfooter contains a negative total, the rocking of the bell crank 1866 will, through the link 2053 and yoke 2059, pull the link 2061 rearwardly to substantially the same extent as the last-named link is pulled rearwardly when upward movement of the lane 11 sensing pin 1819 is limited by a #9 control projection 1767 in lane 11, so that the rear crossfooter controls are placed in non-add condition unless the total key 315, the subtotal key 316, the subtract bar 318 or the add key 320 is depressed.

It will be apparent that, because the lane 16 control conditions the rear crossfooter controls for non-addition or subtraction through the lane 11 link 2061, the lane 16 control will be rendered ineffective by the same manual function controls as render the lane 11 controls ineffective as explained fully hereinafter. It will be obvious also that a control projection 1767 will not be mounted in the lane 16 position on the same bar 1750 on which a control projection 1767 is mounted in the lane 10 (rear crossfooter total) position, the lane 9 (rear crossfooter subtotal) position, or on which a #5 projection 1767 is mounted in the lane 11 (rear crossfooter subtraction) position. However, a #9 projection 1767 may be mounted in the lane 11 position on the same bar which carries a #5 projection 1767 in the lane 16 position.

The above described lane 16 automatic control increases both the utility of the rear crossfooter and the versatility of the machine, and simplifies the performance of certain kinds of accounting work on the machine. With the aid of the lane 16 control, the rear crossfooter may accumulate an algebraic grand total of both positive and negative totals or subtotals drawn from the front crossfooter, or a grand total of either the positive or the negative totals or subtotals drawn from the front crossfooter.

The bar 1750 for a new balance columnar position of the paper carriage, carrying a #5 control projection 1767 in either the lane 6 (front crossfooter total) or the lane 8 (front crossfooter subtotal) position, may be provided also with a #5 control projection 1767 in the lane 16 position so that negative balances drawn from the front crossfooter will be subtracted from the rear crossfooter. If the same bar 1750 has no control projection 1767 in the lane 11 (rear crossfooter subtract and non-add) position, positive balances from the front crossfooter will be added in the rear crossfooter and the latter will, therefore, accumulate an algebraic grand total of balances drawn from the front crossfooter, but if that bar 1750 carries a #9 control projection 1767 in the lane 11 position, the rear crossfooter will be non-added when positive balances are drawn from the front crossfooter and the latter will accumulate a grand total of negative balances drawn from the front crossfooter. If, however, the #5 control projection 1767 in lane 16 is replaced by a #9 projection and the control projection 1767 in lane 11 is omitted, the rear crossfooter will be non-added when negative balances are drawn from the front crossfooter but will add positive balances drawn from the latter and accumulate a grand total of those positive balances. To prevent amounts other than new balances drawn from the front crossfooter from being entered into the rear crossfooter, the latter can be non-added automatically by the lane 11 control in all carriage positions other than the new balance columnar position.

By utilizing the lane 16 control to accumulate both positive and negative new balances algebraically in the rear crossfooter as explained above, and by also entering old balance pick-ups in the rear crossfooter with reversed algebraic sign, an algebraic grand total of transactions or net shift of balances of accounts posted can be obtained in the rear crossfooter. Various other advantageous uses of the lane 16 control alone or in combination with others of the above described automatic function controls, to obtain either summary, proof or other useful figures, will be readily apparent to those skilled in the art. The advantages are still further increased by reason of the fact that manual selections of functions for either or both crossfooters predominate over selections of functions by the automatic controls of lanes 6 to 11 and 16, except that automatic selection of subtotal-taking for either crossfooter predominates over manual selection of either addition or non-addition for the same crossfooter and automatic selection of total-taking for either crossfooter predominates over manual selection of subtraction for the same crossfooter as next explained in detail. In this connection it should be remembered that, as the lane 16 control acts only through the lane 11 bell crank 1861, manual selection of functions for the rear crossfooter will predominate over the automatic selection of subtraction and of non-addition by the lane 16 control in the same manner as over the automatic selection of those functions by the lane 11 control.

*Manual selection of total-taking for either crossfooter prevents automatic selection of any other function for the same crossfooter*

As previously described, when the front crossfooter total key 321 (Fig. 27) is depressed, it pulls the link 919 rearwardly to disconnect the front crossfooter connecting link 913 from the stud 916 in the add slide 444 and connect it to the stud 923 in the subtract and total slide 924. Such movement of the link 919 also moves the projection 1031 to position to cause the subtraction symbol type "—" of the front crossfooter symbol type bar to be positioned at the printing line. However, the depression of the total key 321 also pulls the link 941 rearwardly to position the projection 947 to set the "0" stop blade 803 (Figs. 19, 26 and 27) of the front crossfooter and to position the projection 1034 to further restrict the rise of the front crossfooter symbol type bar to the point at which the total symbol type "*" is at the printing line. Such rearward movement of the link 941 also pulls the link 948 rearwardly to position the lug 963 (Fig. 25) to set the blocking bail 968 for the differential stop slides 483. The rearward movement of the link 919 by depression of the total key 321 also rocks the bell crank 917, 918 counterclockwise beyond its non-addition position and to the same position which it occupies also for subtraction operations on the front crossfooter. In such rocking of the bell crank 917, 918, the stud 1991 moves rearwardly in the slot in the forward end of the link 1989. Thus, if the sensing pin 1815 encounters either a #5 or a #9 control projection 1767 in lane 7 in a machine cycle during which the total key 321 is in depressed position, the resulting rearward movement of the link 1989 is an idle movement and does not consequentially alter the condition of the function controls or symbol printing controls for the front crossfooter. Thus, in a machine cycle in which the front crossfooter total key 321 is in depressed position, the lane 7 front crossfooter automatic subtract and non-add controls are ineffective.

Similarly, any forward movement of the link 2015 resulting from encounter of the sensing pin 1819 with either a #5 or a #9 control projection 1767 in lane 11 in any machine cycle in which the rear crossfooter total key 315 (Fig. 28) is in depressed position will be an idle movement and will not consequentially affect the condition of the rear crossfooter function and symbol printing controls as the stud 2016 (Fig. 42) will already have been moved forwardly to its subtract and total-taking position by the depression of the total key 315. Thus, in any machine cycle in which the rear crossfooter total key 315 is in depressed position, the lane 11 rear crossfooter automatic subtract and non-add controls are ineffective.

When the bell crank 917, 918 is rocked counterclockwise by depression of the front crossfooter total key 321, a stud 2152, secured in and projecting leftwardly from the arm 917, is moved downwardly into a narrow slot between a forward arm 2153 and a middle arm 2154 extending upwardly from the right side of a yoke member 2155 pivotally supported on the stud 254 and thus locks the member 2155 in its normal position where the middle arm 2154 normally is yieldingly held forwardly against the rear side of the stud 2152 by the tension spring 949, the front end of which is connected to the cross-piece of the yoke 2155 below the stud 254. On the right side of the yoke member 2155 is also a rear third upward arm 2156 having an upwardly rearwardly inclined upper edge which, while the arm 2154 engages the stud 2152, is immediately beneath a stud 2157 secured in and projecting leftwardly from the forward end of the arm 395 of the front crossfooter subtotal control member 395, 1004. Thus, when the yoke member 2155 is locked in its normal position by depression of the total key, rearward movement of the arm 1004 and link 1993 is blocked so that if the sensing pin 1816 should encounter a control projection 1767 in lane 8 during the ensuing machine cycle, the spring 1994 (Fig. 38) will yield as the stud 1992 moves rearwardly in the slot in the rear end of the link 1993 without moving the latter and without consequentially influencing the front crossfooter symbol printing and function controls. Thus, the lane 8 automatic subtotal-taking control for the front crossfooter is rendered ineffective while the front crossfooter total key 321 is in depressed position.

A yoke member 2158 (Fig. 28) for the rear crossfooter, similar to the yoke member 2155 for the front crossfooter, is similarly pivotally mounted on the stud 254 and urged counterclockwise by a tension spring 2159 connected at its forward end to the cross portion of the yoke 2158 below the stud 254 and at its rear end to the stud 991 whereby the middle upward arm 2160 of the member 2158 is normally yieldingly pressed forward against the rear side of a stud 2161 secured in and extending leftwardly from the arm 931. While the member 2158 is in its normal position, the rear upward arm 2162 thereof is positioned with its upwardly rearwardly inclined end immediately beneath a stud 2163 secured in and projecting leftwardly from the arm 393 of the rear crossfooter subtotal control member 393, 1022. When the bell crank 931, 932 is rocked counterclockwise by depression of the rear crossfooter total key 315, the stud 2161 is moved downwardly into the narrow slot between the middle arm 2160 and the front upward arm 2164 of the member 2158 thus locking the latter as well as the member 393, 1022 in their normal positions. Thus, if the sensing pin 1817 should encounter a projection 1767 in lane 9 in the ensuing machine cycle, the spring 1999 (Fig. 39) will yield without moving forwardly either the link 2001 or the arm 1022 and, so, without consequentially affecting the condition of the rear crossfooter symbol printing and function controls. Thus, the lane 9 automatic subtotal-taking control for the rear crossfooter is disabled in any machine cycle in which the rear crossfooter total key 315 is in depressed position.

*Manual selection of subtotal-taking for either crossfooter prevents automatic selection of any other function for the same crossfooter*

When the arm 395 is lowered by depression of the front crossfooter subtotal key 322, the downwardly moving stud 2157, acting on the inclined upper end of the arm 2156, cams the member 2155 clockwise sufficiently to place the upper end of the arm 2153 in the path of the stud 2152 so that the bell crank 917, 918 and, thus, also the link 919, though still free for movement to non-addition position, cannot be moved beyond the non-addition position to the subtract and total-taking positions by either of the links 1983 and 1989 and cannot move the front crossfooter connecting link 913 beyond the disconnected position to which it is moved by the connecting link 1008 as the latter is moved by depression of the key 322 to connect to the stud 1010 in the subtotal slide 1011. Also, depression of the subtotal key 322 places the symbol printing control projection 1054 in the path of the lug 599 (Fig. 30) and moves the links 941 and 948 rearwardly to their effective positions. Thus, such limited rearward movements as either of the links 1985 and 1989 can execute when the sensing pin 1814 or 1815 encounters a control projection 1767 in lane 6 or lane 7 in a machine cycle in which the front crossfooter subtotal key 322 is in depressed position cannot consequentially alter the condition of the front crossfooter symbol printing and function controls and the lane 6 and lane 7 automatic controls are, then, ineffective.

Similarly, when the arm 393 (Fig. 28) is depressed by depression of the rear crossfooter subtotal key 316, the downwardly moving stud 2163 acting on the upwardly rearwardly inclined end of the arm 2162 will cam the member 2158 clockwise sufficiently to place the upper end of the arm 2164 immediately beneath the stud 2161 and lock the bell crank 931, 932 and the link 933 from being moved beyond their non-addition positions by either of the links 2008 and 2015 (Fig. 42), the rearward movements of which are thereby so limited as to prevent them from consequentially altering the condition of the rear crossfooter symbol printing and function controls. Thus, in any machine cycle in which the rear crossfooter subtotal key 316 is in depressed position, the lane 10 and lane 11 rear crossfooter automatic total, subtract and non-add controls are ineffective.

*Manual selection of non-addition for either crossfooter prevents automatic selection of either total-taking or subtraction for the same crossfooter*

Depression of the front crossfooter non-add key 323 not only rocks the bell crank 917, 918 to its non-add position, but also, by the action of the lower end of the stem of the key 323 upon the upwardly rearwardly inclined upper end of the arm 2154, cams the member 2155 clockwise sufficiently to place the end of the arm 2153 immediately beneath the stud 2152 to block movement of the bell crank 917, 918 and of the links 919 and 1989 beyond their non-addition positions, and, through the stud 939, limits rearward movement of the arm 938 and link 1985 to a point where the links 941 and 948 are not moved rearwardly sufficiently to place the projection 1034 in the path of the projection 599 (Fig. 30) or to position the lug 963 (Fig. 26) effectively over the stud 964 to set the stop blade 968 for the differential stop slides 483. Consequently, such limited rearward movement of the link 1989 or of the links 1985, 941 and 948 which is possible while the front crossfooter non-add key 323 is in depressed position will not consequentially alter the condition of the front crossfooter symbol printing and function controls and will not interfere in any way with the printing of an amount set up on the keys 255. Thus, while the front crossfooter non-add key 323 is in depressed position, the lane 6 and lane 7 front crossfooter automatic total and subtract controls are ineffective.

Similarly, when the rear crossfooter non-add key 317 is depressed, the lower end of its stem acting on the upwardly rearwardly inclined end of the arm 2160 rocks the member 2158 sufficiently clockwise to place the upper end of the arm 2164 under the stud 2161 and thus prevent counterclockwise movement of the member 931, 932 and rearward movement of the link 933 beyond their non-add positions. Consequently, while the key 317 is in depressed position, the links 2008 and 2015 (Fig. 42) are prevented from moving the links 933 and 987 rearwardly sufficiently to consequentially alter the condition of the rear crossfooter symbol printing and function controls. Thus, in any machine cycle in which the rear crossfooter non-add key 317 is in depressed position, the lane 10 and lane 11 rear crossfooter automatic total-taking and subtraction controls are ineffective.

*Automatic selection of subtotal-taking for either crossfooter prevents manual selection of non-addition for the same crossfooter*

The rocking of the member 2155 by depression of the front crossfooter non-add key 323 to position the arm 2153 under the stud 2152 both moves the arm 2156 away from the stud 2157 and leaves the member 2155 free to be rocked further. Consequently, the member 395, 1004 is free so that if the sensing pin 1816 should encounter a #5 control projection 1767 in lane 8 in the ensuing machine cycle, the link 1993 will be pulled rearwardly and will move the arm 1004 rearwardly to condition the front crossfooter function controls for subtotal-taking as previously explained in connection with the lane 8 automatic controls. The fact that depression of the non-add key 323 rocks the bell crank 920, 921 to place the projection 1030 in the path of the lug 599 and to depress the front crossfooter connecting link 913 to its intermediate position where it is connected to neither the add slide 444 nor the subtract and total slide 924 is of no consequence because the rocking of the yoke 1006 by movement of the arm 1004 and link 1005 rearwardly to subtotal position places projection 1054 in the path of the lug 599 and the link 913 would in any event be moved to the same disconnected intermediate position by the action of the front crossfooter subtotal connecting link 1008 on the lug 1012 when the arm 1007 moves the link 1008 to connect it to the stud 1010 in the slide 1011. Thus, a #5 control projection 1767 in lane 8 above the sensing pin 1816 is effective to place the front crossfooter function controls in subtotal-taking condition and to cause the proper subtotal symbol to be indexed for printing regardless of the position of the non-add key 317 during the machine cycle.

Likewise, the positioning of the member 2158 by depression of the rear crossfooter non-add key 317 leaves the rear crossfooter subtotal-taking control member 393, 1022 free to be rocked by forward movement of the lane 9 automatic subtotal-taking control link 2001 to place the rear crossfooter symbol printing and function controls in proper subtotal-taking position in a machine cycle in which the sensing pin 1817 encounters a #5 control projection 1767 in lane 9.

*Manual selection of subtraction for either crossfooter prevents automatic selection of either subtotal-taking or non-addition for the same crossfooter*

When the front crossfooter subtract bar 324 (Fig. 27) is depressed and the bell crank 917, 918 is thereby rocked to its subtraction position, the stud 2152 is lowered into the slot between the arms 2153 and 2154 so that the arm 2156 and thus also the front crossfooter subtotal-taking member 395, 1004 is locked in normal position against counterclockwise movement by the link 1933 regardless of whether or not the sensing pin 1816 encounters a control projection 1767 in lane 8. Thus, in any machine cycle in which the subtract bar 324 is in depressed position, the lane 8 front crossfooter automatic subtotal-taking control is disabled.

As the rocking of the bell crank 917, 918 by depression of the front crossfooter subtract bar 324 is greater than would result from the rearward movement of the link 1989 which could be caused by encounter of the sensing pin 1815 with a #9 projection 1767 in lane 7, such a movement of the link 1989 will be an idle movement in any machine cycle in which the subtract bar 324 is in depressed position and will not consequentially affect the condition of the front crossfooter function controls. Thus, in any machine cycle in which the front crossfooter subtract bar 324 is in depressed position, the lane 7 front crossfooter automatic non-add control is ineffective.

Similarly, the rocking of the bell crank 931, 932 and rearward movement of the link 933 by depression of the rear crossfooter subtract bar 318 is greater than would result from the forward movement of the link 2015 which could be caused by encounter of the sensing pin 1819 with a #9 projection 1767 in lane 11, and also locks the members 2158 and 393, 1022 in their normal positions so that the lane 9 rear crossfooter automatic subtotal-taking control is disabled and the lane 11 rear crossfooter non-addition control is rendered ineffective in any machine cycle in which the rear crossfooter subtract bar 318 is in depressed position.

*Automatic selection of total-taking for either crossfooter prevents manual selection of subtraction for the same crossfooter*

As already explained, depression of the front crossfooter subtract bar 324 results in the uncoupling of the front crossfooter connecting link 913 from the stud 916 in the add slide 444 and the coupling of that link to the stud 923 in the subtract and total slide 924. The same movement of the link 913 is required for conditioning the controls for total-taking operation of the front crossfooter. Also while the front crossfooter subtract bar 324 is in depressed position, the arm 938 is free for rearward movement by the link 1985 to total-taking position, in which movement it acts through the stud 940 to pull the links 941 and 948 rearwardly to total-taking position where the projection 1034 is positioned for selection of the total symbol type, the projection 947 is positioned to set the "0" stop blade 803 for the front crossfooter and the ledge 963 is positioned to operate the stop bail 968 for the differential stop slides 483. Consequently, if the sensing pin 1814 encounters a #5 control projection 1767 in lane 6 in a machine cycle during which the front crossfooter subtract bar 324 is in depressed position, the link 1985 will move the arm 938 rearwardly to place the front crossfooter symbol printing and function controls in total-taking position as previously described.

Similarly, if the sensing pin 1818 should encounter a #5 projection 1767 in lane 10 in a machine cycle in which the rear crossfooter subtract bar 318 is in depressed position, the link 2008 will rock the arm 984 rearwardly to condition the rear crossfooter symbol printing and function controls for total-taking.

*Manipulative means to prevent automatic selection of total-taking, non-addition or subtraction for either or both of the crossfooters*

Immediately under the stem of the rear crossfooter addition key 320 (Fig. 42) is the forward end of the forward arm of a lever 2165 having, intermediate its ends, a small leftwardly extending yoke portion pivotally supported on the stud 386 secured in the plate 27. Pivotally supported on the stud 386 immediately leftward of the yoke portion of the lever 2165 is the rightwardly extending small yoke portion of a similar lever 2166, the forward end of the forward arm of which is immediately under the lower end of the stem of the front crossfooter addition key 326. Tension springs 2167 anchored at their rear ends on hooks supported on the stud 254 are connected at their forward ends to the yoke portions of the levers 2165 and 2166, respectively, and urge the levers clockwise to hold their forward arms yieldingly in contact with the stems of the keys 320 and 322.

When the rear crossfooter addition key 320 is depressed, the lever 2165 is rocked counterclockwise so that a rightwardly turned lug 2168 on the end of its rearward arm is placed immediately behind a shoulder 2169 on the forward portion of the link 933 which, thereby, is prevented from being moved rearwardly. That prevents the link 2008 (Figs. 25 and 28) from moving forwardly to condition the rear crossfooter controls for total-taking when a control projection 1767 in lane 10 limits the rise of the sensing pin 1818, and also prevents the link 2015 (Fig. 42) from moving forwardly to condition the rear crossfooter controls for non-addition or for subtraction when a #9 or a #5 control stud 1767 in lane 11 limits the rise of the sensing pin 1819 or when a control projection 1767 in lane 16 limits the rise of the sensing pin 1824 while there is a negative total in the front crossfooter.

When the front crossfooter addition key 326 is depressed, the lever 2166 is rocked counterclockwise and positions a leftwardly turned lug 2170 on the end of its rearward arm immediately behind a shoulder 2171 on the link 919 to prevent the latter from moving rearwardly. This, in turn, prevents the link 1989 from being moved rearwardly to condition the front crossfooter controls for non-addition or for subtraction when a #9 or a #5 control projection 1767 in lane 7 limits the rise of the sensing pin 1815 and also prevents rearward movement of the link 1985 to condition the front crossfooter controls for total-taking when a control projection 1767 in lane 6 limits the rise of the sensing pin 1814.

The addition keys 320 and 326 and the levers 2165 and 2166 operated by them do not interfere with the automatic conditioning of the rear and front crossfooter controls for subtotal-taking when a control projection 1767 in lane 8 or in lane 9 limits the rise of the sensing pin 1816 or 1817.

I claim:

1. A calculating machine having columnar recording means including a portion movable to a plurality of columnar recording positions, a first totalizer, function control means for the first totalizer conditionable to cause said totalizer to perform any of a plurality of computing functions, including addition, subtraction and total-taking, a second totalizer, function control means for the second totalizer, a first means automatically controlled by said movable portion of said columnar recording means and variably presettable to condition the function control means for the second totalizer for any of a plurality of computing functions in machine operations performed with said movable portion in its several columnar positions, a second means automatically controlled by said movable portion and variably presettable independently of said first means to vary the conditioning of the function control means for the second totalizer in any of a plurality of preselectable ways in preselectable ones of the columnar positions of said movable portion, and means controlled automatically by the first totalizer in accordance with the algebraic sign of the amounts accumulated therein to render said second means effective to vary the condition of the function control means for the second totalizer in the preselected way in operations of the machine performed with said movable portion in a preselected columnar position when the first totalizer contains an amount of one algebraic sign but ineffective when said amount is of the other algebraic sign.

2. A calculating machine having columnar recording means including a portion movable to a plurality of columnar recording positions, a first totalizer, function control means for the first totalizer conditionable to cause said totalizer to perform any of a plurality of computing functions, including addition, subtraction and total-taking, a first means controlled by said movable portion of said columnar recording means and variably presettable to condition the function control means for the first totalizer for any of said plurality of functions in machine operations performed with said movable portion in any of its several columnar conditions, a second totalizer, function control means for the second totalizer, a second means automatically controlled by said movable portion of said columnar recording means and variably presettable independently of said first means to condition the function control means for the second totalizer for any of a plurality of computing functions in machine operations performed with said movable portion in its several columnar positions, a third means automatically controlled by said movable portion and variably presettable independently of said first and second means to vary the conditioning of the function control means for the second totalizer in any of a plurality of preselectable ways in preselectable ones of the columnar positions of said movable portion, and means controlled automatically by the first totalizer in accordance with the algebraic sign of the amounts accumulated therein to render said third means effective to vary the condition of the function control means for the second totalizer in the preselected way in operations of the machine performed with said movable portion in a preselected columnar position when the first totalizer contains an amount of one algebraic sign but ineffective when said amount is of the other algebraic sign.

3. A calculating machine having a columnar recording means including a portion movable to a plurality of columnar recording positions, a first totalizer, function control means for the first totalizer conditionable to cause said totalizer to perform any of a plurality of computing functions including addition, subtraction and total-taking, a second totalizer, function control means for the second totalizer, a first means automatically controlled by said movable portion of said columnar recording means and variably presettable to condition the function control means for the second totalizer for any of a plurality of computing functions in machine operations performed with said movable portion in its several columnar positions, means controlled automatically by the first totalizer in accordance with the algebraic sign of the amounts accumulated therein and thereby rendered ineffective when the accumulated amount is of one algebraic sign, but potentially effective, when the accumulated amount is of the other algebraic sign, to act on said first automatically controlled means to vary the conditioning of the function control means for said second totalizer thereby, and a second means automatically controlled by said movable portion of said columnar recording means to actuate said means controlled by the first totalizer in machine operations performed with said movable portion in predetermined ones of its columnar positions.

4. A calculating machine having a columnar recording means including a portion movable to a plurality of columnar recording positions, a first totalizer, function control means for the first totalizer conditionable to cause said totalizer to perform any of a plurality of computing functions including addition, subtraction and total-taking, a second totalizer, function control means for the second totalizer, a first means automatically controlled by said movable portion of said columnar recording means and variably presettable to condition the function control means for the second totalizer for any of a plurality of computing functions in machine operations performed with said movable portion in its several columnar positions, means controlled automatically by the first totalizer in accordance with the algebraic sign of the amounts accumulated therein and thereby rendered ineffective when the accumulated amount is of one algebraic sign, but potentially effective when the accumulated amount is of the other algebraic sign, to act on said first automatically controlled means, and a second means automatically controlled by said movable portion of said columnar recording means and variably presettable to variably actuate said means controlled by the first totalizer to a plurality of different extents in machine operations performed with said movable portion in different predetermined ones of its columnar positions to thereby cause said latter means, when in its potentially effective position, to vary the conditioning of the function control means for the second totalizer by said first automatically controlled means in a plurality of ways.

5. A calculating machine having columnar recording means including a portion movable to a plurality of columnar recording positions, a first totalizer, function control means for the first totalizer conditionable to cause said totalizer to perform any of a plurality of computing functions, including addition, subtraction and total-taking, a second totalizer, function control means for the second totalizer, a first means automatically controlled by said movable portion of said columnar recording means and including a first member movable to different extents to condition the function control means for the second totalizer for respective ones of a plurality of computing functions in machine operations performed with said movable portion in its several columnar positions, a second means automatically controlled by said movable portion and including a second member movable to different extents in machine operations performed with said movable portion in predetermined ones of its columnar positions, and means actuated by said second member and controlled automatically by the first totalizer in accordance with the algebraic sign of the amounts accumulated therein and thereby rendered ineffective, when the amount in the first totalizer is of one algebraic sign but effective, when said amount is of the other algebraic sign, to act on said first member to move it to an extent determined by said second member to thereby vary the conditioning of the function control means of the second totalizer.

6. A calculating machine having columnar recording means including a portion movable to a plurality of columnar recording positions, a first totalizer, function control means for the first totalizer conditionable to cause said totalizer to perform any of a plurality of computing functions, including addition, subtraction and total-taking, a second totalizer, function control means for the second totalizer, a first means automatically controlled by said movable portion of said columnar recording means and including a member movable to a plurality of different extents to condition the function control means for the second totalizer for respective ones of a plurality of computing functions in machine operations performed with said movable portion in its several columnar positions, means controlled automatically by the first totalizer in accordance with the algebraic sign of the amounts accumulated therein and thereby rendered ineffective when the accumulated amount is of one algebraic sign but potentially effective when the accumulated amount is of the other algebraic sign, to vary the extent of movement of said member to cause the latter to condition the function control means for said second totalizer for a different one of said computing functions of said second totalizer, and a further means automatically controlled by said movable portion to actuate said means controlled by the first totalizer to vary the extent of movement of said first member in machine operations performed with said movable portion in predetermined ones of its columnar positions while the amount accumulated in said second totalizer is of said other algebraic sign.

7. A calculating machine having columnar recording means including a portion movable to a plurality of columnar recording positions, a first totalizer, function control means for the first totalizer conditionable to cause said totalizer to perform any of a plurality of computing functions, including addition, subtraction and total-taking, a second totalizer, function control means for the second totalizer, manipulative means to condition said function control means for the second totalizer for any of a plurality of computing functions, a first means automatically controlled by said movable portion of said columnar recording means and variably presettable to condition the function control means for the second totalizer for any of a plurality of computing functions in machine operations performed with said movable portion in its several columnar positions, a second means automatically controlled by said movable portion and variably presettable independently of said first means to vary the conditioning of the function control means for the second totalizer in preselectable ones of the columnar recording positions of said movable portion, means controlled automatically by the first totalizer in accordance with the algebraic sign of the amounts accumulated therein to render said second means effective to vary the condition of the function control means for the second totalizer in operations of the machine performed with said recording means portion in the preselected columnar condition when the first totalizer contains an amount of one algebraic sign but ineffective when said amount is of the other algebraic sign, and means conditioned by said manipulative means when manipulated to condition the function control means for said second totalizer for a predetermined function to prevent alteration of the condition of said function control means for the second totalizer by either of said first or second means.

8. A calculating machine having columnar recording means including a portion movable to a plurality of columnar recording positions, a control element supporting means mounted upon said movable portion for adjustment to a plurality of positions relative thereto, a first totalizer, function control means for the first totalizer conditionable to cause said totalizer to perform any of a plurality of computing functions, including addition, subtraction and total-taking, a second totalizer, function control means for the second totalizer, a first means automatically controlled by said movable portion of said columnar recording means to condition the function control means for the second totalizer for any of a plurality of computing functions in machine operations performed with said movable portion in its several columnar positions and including a plurality of sets of control elements mounted in different arrangements on said control elements support and means for operating portions of the function control means for the first totalizer, said operating means being arranged in cooperative relation to selected ones of said sets of control elements when said supporting means is in respective ones of its adjusted positions for control of said operating means by different elements of the selected set of control elements when said movable portion of the recording means is in different ones of its columnar positions, a second means automatically controlled by said movable portion to vary the conditioning of the function control means for the second totalizer and including a plurality of sets of control elements mounted in different arrangements on said control element supporting means and means for operating portions of the function control means for the second totalizer, said last-named operating means being arranged in cooperative relation to selected ones of said last-named plurality of sets of control elements when said supporting means is in respective ones of its adjusted positions for control of said last-named operating means by different elements of the selected set of said last-named plurality of sets of control elements when said movable portion of the recording means is in different ones of its columnar positions, means controlled automatically by the first totalizer in accordance with the algebraic sign of the amounts accumulated therein to render said last-named operating means effective to vary the condition of the function control means for the second totalizer under control of control elements of said second automatically controlled means when the first totalizer contains an amount of one algebraic sign but ineffective when said amount is of the other algebraic sign, and a manipulative means to adjust said supporting means to any of said adjusted positions to place the several sets of control elements of said first means and respective ones of the sets of control elements of the second means in cooperative relation to the respective ones of said operating means to thereby select different ones of a plurality of programs of control of the functions of said second totalizer and of automatic variations of the control of functions of said second totalizer responsive to the algebraic condition of said first totalizer.

References Cited in the file of this patent

UNITED STATES PATENTS

| | | |
|---|---|---|
| 2,052,906 | Sturm | Sept. 1, 1936 |
| 2,070,785 | Crosman | Feb. 16, 1937 |
| 2,141,269 | Ewald et al. | Dec. 27, 1938 |
| 2,313,982 | Williams | Mar. 16, 1943 |
| 2,364,934 | Baldwin | Dec. 12, 1944 |
| 2,526,734 | Davidson et al. | Oct. 24, 1950 |
| 2,626,749 | Christian et al. | Jan. 27, 1953 |